United States Patent [19]
Shindo et al.

[11] Patent Number: 5,872,748
[45] Date of Patent: Feb. 16, 1999

[54] AUTO CHANGER

[75] Inventors: Satoshi Shindo, Iwate; Ryoko Nitta, Tochigi; Hitoshi Nonaka, Tochigi; Tomoki Takahashi, Tochigi, all of Japan

[73] Assignee: Aiwa Co., Ltd., Tokyo, Japan

[21] Appl. No.: 956,929

[22] Filed: Oct. 23, 1997

Related U.S. Application Data

[63] Continuation of Ser. No. 579,649, Dec. 27, 1995, abandoned.

[30] Foreign Application Priority Data

Dec. 28, 1994 [JP] Japan .................................. 6-328983
Jun. 15, 1995 [JP] Japan .................................. 7-149056

[51] Int. Cl.⁶ .................................................. G11B 17/26
[52] U.S. Cl. ............................................. 369/38; 369/178
[58] Field of Search ................................... 369/34, 36, 38, 369/178, 75.1, 75.2, 77.1, 77.2, 191–194

[56] References Cited

U.S. PATENT DOCUMENTS

| | | | |
|---|---|---|---|
| 5,123,001 | 6/1992 | Nakamichi et al. | 369/36 |
| 5,177,722 | 1/1993 | Nakamichi et al. | 369/36 |
| 5,210,728 | 5/1993 | Nouchi et al. | 369/36 |
| 5,216,645 | 6/1993 | Sakayama | 369/36 |

FOREIGN PATENT DOCUMENTS

| | | |
|---|---|---|
| 0 481 640 | 4/1992 | European Pat. Off. . |
| 0 563 927 | 10/1993 | European Pat. Off. . |
| 0 702 363 | 3/1996 | European Pat. Off. . |
| 0 709 841 | 5/1996 | European Pat. Off. . |
| 1-224969 | 7/1989 | Japan . |
| 2-201768 | 8/1990 | Japan . |
| 6-195838 | 7/1994 | Japan . |
| 2 241 819 | 9/1991 | United Kingdom . |
| 2 268 308 | 1/1994 | United Kingdom . |

*Primary Examiner*—William J. Klimowicz
*Attorney, Agent, or Firm*—Smith-Hill and Bedell

[57] ABSTRACT

An auto changer is comprised of holders, a movable stocker, a player, a tray, transfer gears, disc detection system, and other parts. A disc is placed on each of the holders, and is loaded into and removed from stocker using the tray together with the holder. The tray is movable while the player is playing back, so that other discs can be loaded and removed. The holder has two holding levers, which hold a disc onto the holder in order to prevent the disc from moving out of position or falling into the unit. When two discs are accidentally placed on the tray and are being loaded into the stocker, the disc detection system detects the two discs and stops the tray in order to prevent damage to the discs or the unit.

9 Claims, 71 Drawing Sheets

AUTO CHANGER

This is a continuation of application Ser. No. 08/579,649 filed Dec. 27, 1995 and now abandoned.

BACKGROUND OF THE INVENTION

1. Field of the Invention

The present invention relates to an auto changer which can store a number of storage media, such as discs, and play back the discs one at a time.

2. Description of the Related Art

In general, an auto changer 10, as shown in FIG. 94, which stores a plurality of storage media, for example, CDs (compact discs) and plays back the stored discs one at a time, is currently used. In the auto changer 10, a stocker 12 which can move vertically and a player 13 for playing back a disc 1 are positioned in a rectangular solid cabinet 11. The stocker 12 can store some discs 1. The player 13 is comprised of a chucking mechanism for discs 1 and an optical pickup. A tray 14 can slide through a portal 14 of the cabinet 11 in order to remove discs 1 from and load discs 1 into the unit.

FIG. 95 shows the order for disc storage and playback operations for the auto changer 10. In the disc storage and playback operations 20, a determination is made whether or not a disc number is specified (in step 421), and when a disc number is specified, a determination is made whether or not a disc 1 is placed on the tray 14 (in step 422).

When a disc 1 is placed on the tray 14, the disc 1 is transferred to a predetermined position in the stocker 12, which is the original position of the disc 1 before the disc 1 was transferred to the tray 14 (in step 423).

The stocker 12 moves so that the storage position of the specified number corresponds to the level of the tray 14 (in step 424), and the disc 1 of the specified number is transferred to the tray 14 (in step 425). In step 425, when there is no disc 1 in the storage position of the specified number in the stocker 12, the same transfer operation as described above is performed. In step 422, when there is no disc 1 in the tray 14, the stocker 12 moves so that the storage position of the specified number corresponds to the level of the tray 14, and the operation described above is performed.

After the disc 1 is transferred in step 425 or when the disc number is not specified in step 421, a determination is made whether or not a tray open/close button has been turned on (in step 426), and a determination is made whether or not a playback button has been turned on (in step 427). Because the tray open/close button and the playback button can not be simultaneously turned on, two of them are checked. For example, when the tray open/close button has been turned on in step 426, the tray 14 is opened (in step 428). A disc 1 can be placed on the opened tray 14.

A determination is made whether or not the tray open/close button has been turned on (in step 429), and when it has been turned on, the tray 14 is closed (in step 430). The presence or absence of a disc 1 on the tray 14 is determined, the determination is displayed (in step 431), and the disc 1 is clamped (in step 432), at which point the disc storage operation is completed.

When the playback button has been turned on in step 427, a determination is made whether or not there is a disc 1 on the tray 14 (in step 433). When there is a disc 1, the playback operation is performed (in step 434). A determination is made whether or not the playback operation is completed (in step 435). When there is no disc 1 on the tray 14 in step 433, the playback operation is completed.

However, with the auto changer 10 currently in use, the disc 1 on the tray 14 is clamped by the chucking mechanism for the playback operation. During the playback operation for the disc 1, the tray 14 cannot be moved, and it is inconvenient for the user who cannot store a disc 1 into the stocker 12 or take out a disc 1 in the stocker 12 during playback.

Further, when the disc 1 is transferred into the player 13 or the tray 14, a push lever which is positioned at the back of the stocker 12 pushes the disc 1 onto the player 13 or the tray 14. Accordingly, space in which the push lever and the other parts are mounted is required, making the unit large.

Moreover, the disc 1 is merely placed on a disc space which is a hollowed area on the tray 14, and when there is a shock or a vibration, the disc 1 may move out of position. In such situation, when the playback operation is performed, the player 13 may clamp the disc 1 out of the appropriate position, damaging the signal recorded area. The disc 1 may also fall inside the unit due to a great shock or vibration, damaging the unit.

Generally, the auto changer 10 plays two kinds of discs, 12 cm discs and 8 cm discs. The mechanism in the unit, for example, the disc area on the tray 14 is designed for the 12 cm disc. Accordingly, when the 8 cm disc is placed on the tray 14, it may easily move out of position and fall inside the unit.

Generally, the auto changer has a sensor which detects the size and the presence or absence of the disc 1. However, when a user accidentally place two discs 1 on the tray 14, the sensor cannot detect both discs 1 and the tray 14 is closed so that the discs 1 are transferred to the stocker 12. Because a compartment in the stocker 12 corresponds to the thickness of one disc 1, one of two discs 1 is not transferred into the stocker 12, remaining at an inappropriate position or falling inside the unit. In this situation, when the stocker 12 is moved or the playback operation is performed, the disc 1 or the unit may be damaged.

Further, when the user accidentally places an 8 cm disc 1b on a tray 14 for a 12 cm disc 1a, the sensor may detect the disc 1 which is being transferred into the unit. However, because the mechanism in the unit, for example, the disc space which is a hollowed area on the tray 14 is designed for a 12 cm disc 1a, the storage operation and the playback operation cannot be correctly performed. In such situation, the disc 1b may move out of position or fall inside the unit, and the problem described above arises.

Moreover, when the power supply to the unit is stopped during operation, the auto changer 10 cannot later recognize the positions of the disc 1, the tray 14, and the stocker 12. When a disc 1 is positioned between the tray 14 and the stocker 12 and the power is supplied again, the stocker 12 moving up or down, may collide with the disc 1 positioned between the tray 14 and the stocker 12, so that the disc 1 may be damaged or fall inside the mechanism, or the unit may damaged.

Moreover, when the data for the storage status is lost due to an electricity failure, a disc 1 on the player 13 may be transferred to a compartment in the stocker 12 where another disc 1 is already stored, during the next operation. In this situation, the disc 1 which was set on the player 13 pushes the other disc 1 stored in the stocker 12, and both of the two discs 1 may be damaged.

Moreover, when a disc 1 in the stocker 12 is played back, the stocker 12 moves up or down in order to transfer the selected disc 1 to the level of the player 13, and the disc 1 is transferred to the player 13 by an appropriate transfer means. When the disc 1 is played back or when the unit is turned off, the stocker 12 remains at that position.

However, when the stocker 12 remains in such position and there is a shock or a vibration, the stocker 12 may fall, and the stocker 12 or the discs 1 stored in the stocker 12 may be damaged.

Moreover, when there is a shock or a vibration, the disc 1 may move out of the player 13 or fall from the stocker 12 onto the player 13, and the unit may be damaged due to such disc 1.

OBJECT AND SUMMARY OF THE INVENTION

One of the objects of the present invention is to provide an improved auto changer which can load a disc into or remove a disc from the stocker during the playback operation for an other disc.

In one aspect of this invention, an auto changer is comprised of a plurality of holders (disc holders 25 shown in FIG. 1) each of which is transferred together with the storage medium (disc 1 shown in FIG. 1), a movable storage means (stocker 22 shown in FIG. 1), playback means (player 34 shown in FIG. 1), a first transfer means (tray 33 shown in FIG. 1) for transferring the holder between the storage means and an outside position, and a second transfer means (transfer gears 183 and 184 shown in FIG. 21) for transferring the holder between the storage means and the playback means. The first transfer means is able to move while the playback means is being operated.

Another object of the present invention is to provide an improved auto changer which transfers a disc between the stocker and the player without a push lever and other parts which is positioned at the back of the stocker.

In another aspect of this invention, the auto changer has a gear means (transfer gears 183 and 184 shown in FIG. 21) which gears with the rack in order to transfer the holder between the storage means and the playback means. Further, the auto changer has an engaging lever (loading lever 121 shown in FIG. 8) which is movably attached to the transfer means, engaging with the holder in order to pull and push the holder from and into the storage means.

A further object of the present invention is to provide an improved auto changer which prevents a disc from moving out of position or falling into the unit.

In a further aspect of this invention, an auto changer has holding levers (a first holding lever 252 and a second holding lever 253 shown in FIG. 34) attached to the holder. When the storage medium is stored in the storage means, the holding lever holds the storage medium in a predetermined position. When the storage medium is being transferred by the transfer means and is being played back by the playback means, the holding lever is retracted from the storage medium.

Still another object of the present invention is to provide an improved auto changer which can detect a status of a storage medium in order to prevent malfunction such as double-loading by a user.

In still another aspect of this invention, an auto changer has a detecting means (sensors 86R and 86L shown in FIG. 6 and light emitting devices 260R and 260L shown in FIG. 42) for detecting the status of the storage medium. A plurality of detection holes are formed into the transfer means and into the holder, and the detection means detects the status of the storage medium through the detection holes when the storage medium is being transferred by the transfer means. When two discs are placed on the transfer means and are being transferred into the storage means, a double-loading holding means (tapered rib 502 shown in FIG. 9) holds the upper storage medium on the lower storage medium placed on the holder.

Yet another object of the present invention is to provide an improved auto changer which prevents the mechanism from being damaged due to a disc remaining in an inappropriate position during an initializing operation.

In yet another aspect of this invention, during the initializing operation, the auto changer transfers the holder on the first transfer means into the storage means, transfers the holder on the second transfer means into the playback means, and moves the storage means to a reference position.

A further object of the present invention is to provide an improved auto changer which prevents a disc from being transferred into a compartment in the storage means where another disc is already stored.

In a further aspect of this invention, the auto changer has a stopper (stopper 47a shown in FIG. 2) built onto the holder, and the stopper stops the transfer means in order to prevent the holder from being transferred to a position in the storage means where another storage medium is already stored.

A further object of the present invention is to provide an improved auto changer which prevents the storage means from falling due to a shock or a vibration.

In a further aspect of this invention, the auto changer controls the storage means to be positioned at all times in a predetermined (lowest) position other than when the storage medium is being exchanged.

A further object of the present invention is to provide an improved auto changer which prevents a disc from falling from the storage means or the player due to a shock or a vibration.

In a further aspect of this invention, the auto changer has a position regulating means (an arc-shaped rib 510, shown in FIG. 23, which engages with an engaging portion 511 shown in FIG. 30) for regulating the position of the holder in a predetermined position after the holder is positioned in a playback position for the storage medium until the storage medium is held by the playback holding means. The auto changer has a disc stopper (stopper 512 shown in FIG. 1) means attached to the playback means, which regulates the storage medium in the storage means so as not to move to the playback means when another storage medium is held in the playback means.

Additional objects and advantages of the present invention will be apparent from the following detailed description of a preferred embodiment thereof, which is best understood with reference to the accompanying drawings.

DESCRIPTION OF THE PREFERRED EMBODIMENT

General View of Auto Changer System

An auto disc changer in a preferred embodiment according to the present invention is described below with reference to the drawings.

Figure 1:
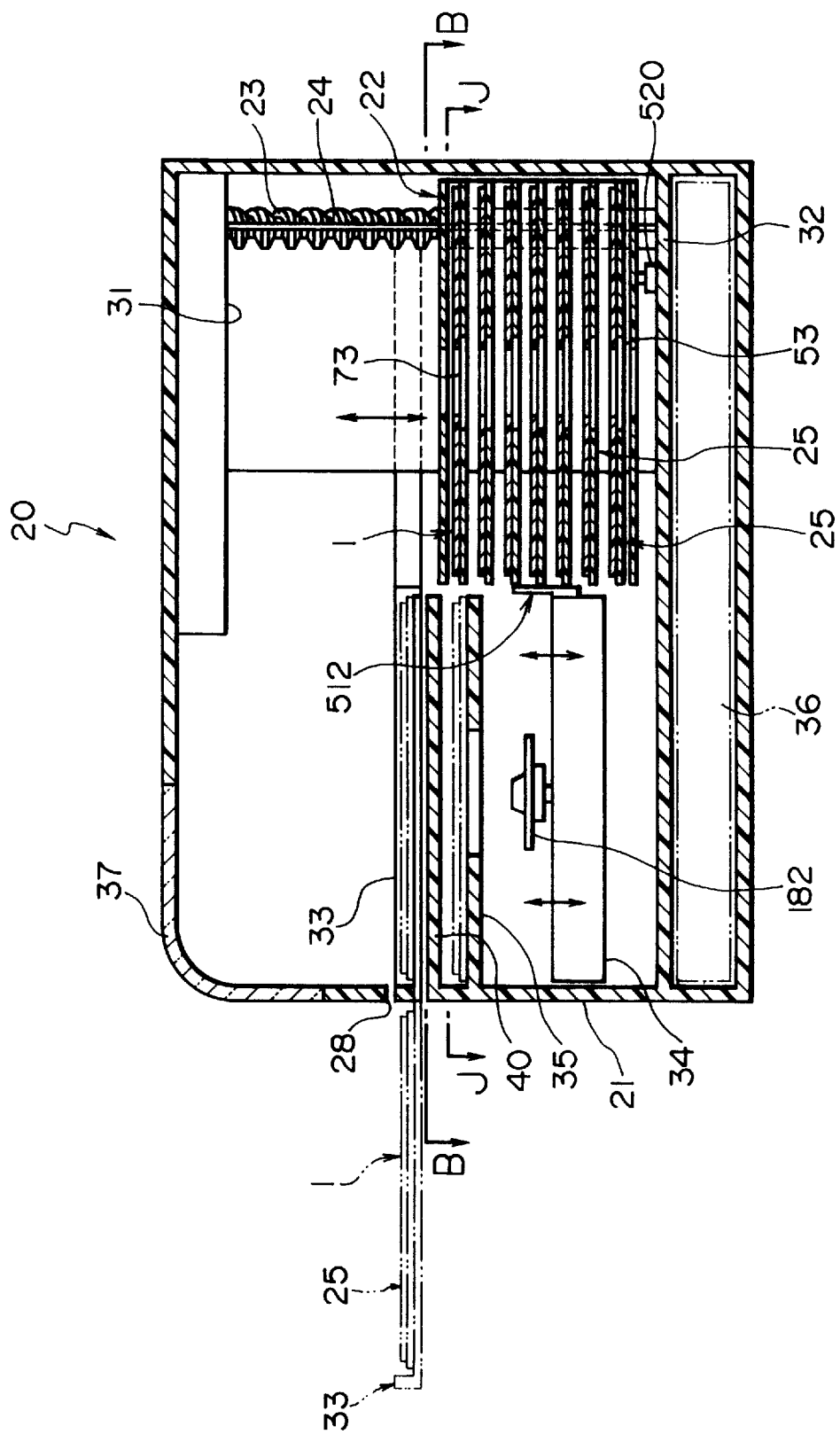
FIG. 1 is a cross-sectional view illustrating a construction of an auto disc changer 20 according to the present invention.
Figure 6:
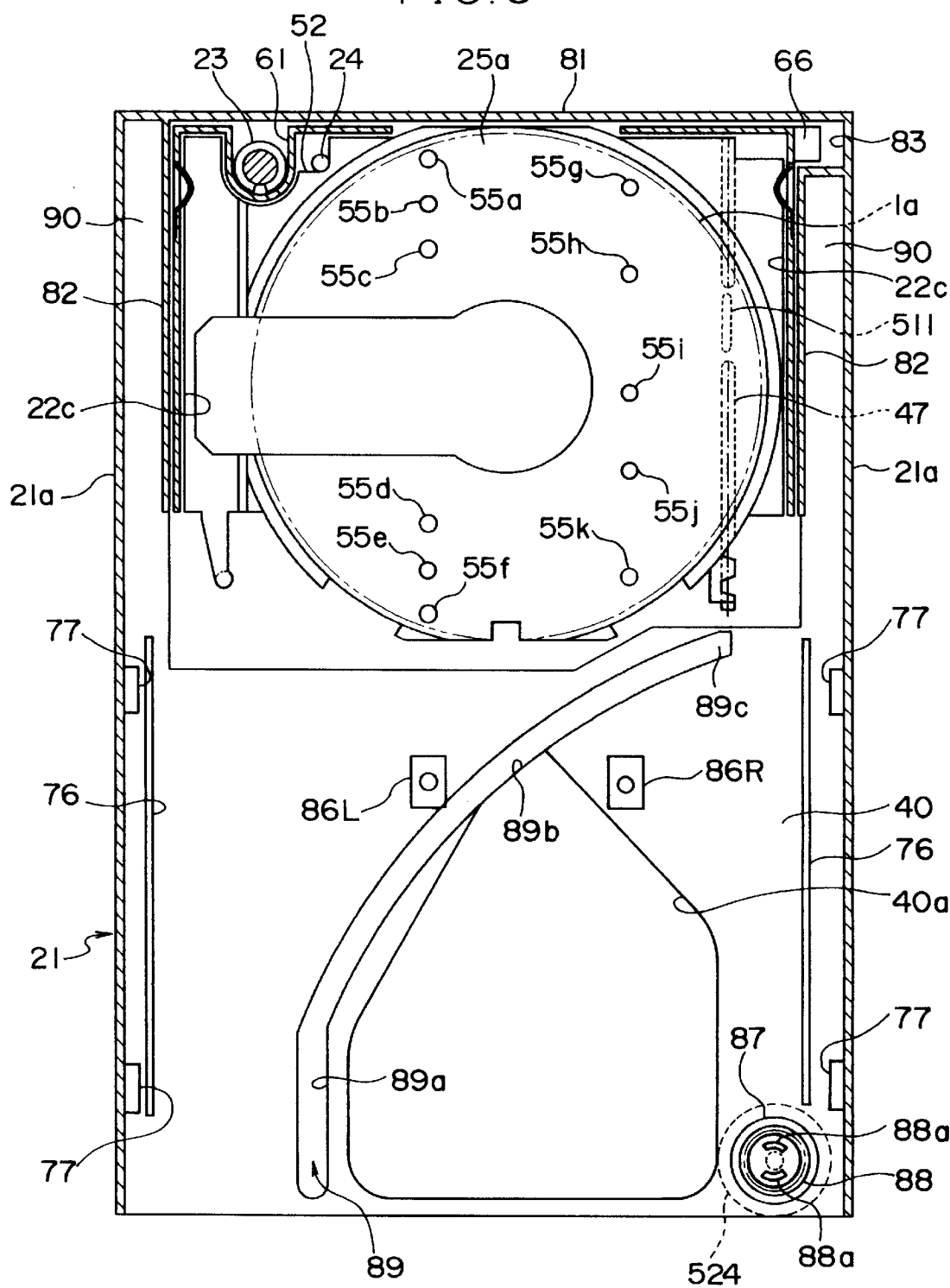
FIG. 6 is a top cut-away view from line B—B of FIG. 1 according to the present invention.

FIG. 1 illustrates an auto disc changer 20 according to the present invention. The auto disc changer 20 has a generally rectangular solid cabinet 21. A stocker 22, which is a storage means for vertically storing a number of, seven in this example, storage media such as discs 1, for example CDs (compact discs), is mounted at the rear inside the cabinet 21. A stocker drive cam 23 and a guide rod 24 are located vertically at the rear of the stocker 22 (as shown in FIG. 6). The stocker 22 is moved between upper and lower partitions due to rotations of the stocker drive cam 23. The stocker 22 is guided by the guide rod 24, so as not to slide out of position.

The stocker 22 vertically stores a number of disc holders 25. In the embodiment, the stocker 22 stores seven disc holders 25. A disc 1 is placed on each of the disc holders 25. The upper partition 31 is positioned above the stocker 22, and the lower partition 32 is positioned below the stocker 22. A stocker detection switch 520 for detecting the stocker 22 positioned at the lowermost position, is attached on the upper side of the lower partition 32.

A tray area 40 is formed horizontally at the front half of the cabinet 21, and a tray 33 which is a transfer means for transferring the disc 1 on the disc holder 25, is slidably positioned on the tray area 40. A tray portal 28 through which the tray 33 passes is formed into the front side of the cabinet 21. A player 34 which is a playback means for the disc 1 is positioned movably up and down.

In order to prevent a disc 1 in the stocker 22 from accidentally sliding out or a disc 1 on the player 34 from accidentally sliding into the stocker 22, a plate-shaped stopper 512, which is a stopper means, is positioned at the edge of the player 34 on the stocker 22 side. When the player 34 moves up, an inside front portal 22a (FIG. 2) of the compartments of the stocker 22, which compartments face the player 34, is closed by the stopper 512.

In a playback mode, a disc holder 25 in the stocker 22 and a disc 1 placed on the disc holder 25 are drawn out and clamped onto the player 34, and the compartment of the stocker 22 in which the disc holder 25 and the disc 1 were stored is empty. Another disc 1 which is stored under the empty compartment may slide through such empty compartment onto the player 34. The stopper 512 prevents the disc 1 in the stocker 22 from accidentally sliding out from the stocker 22.

Figure 25:
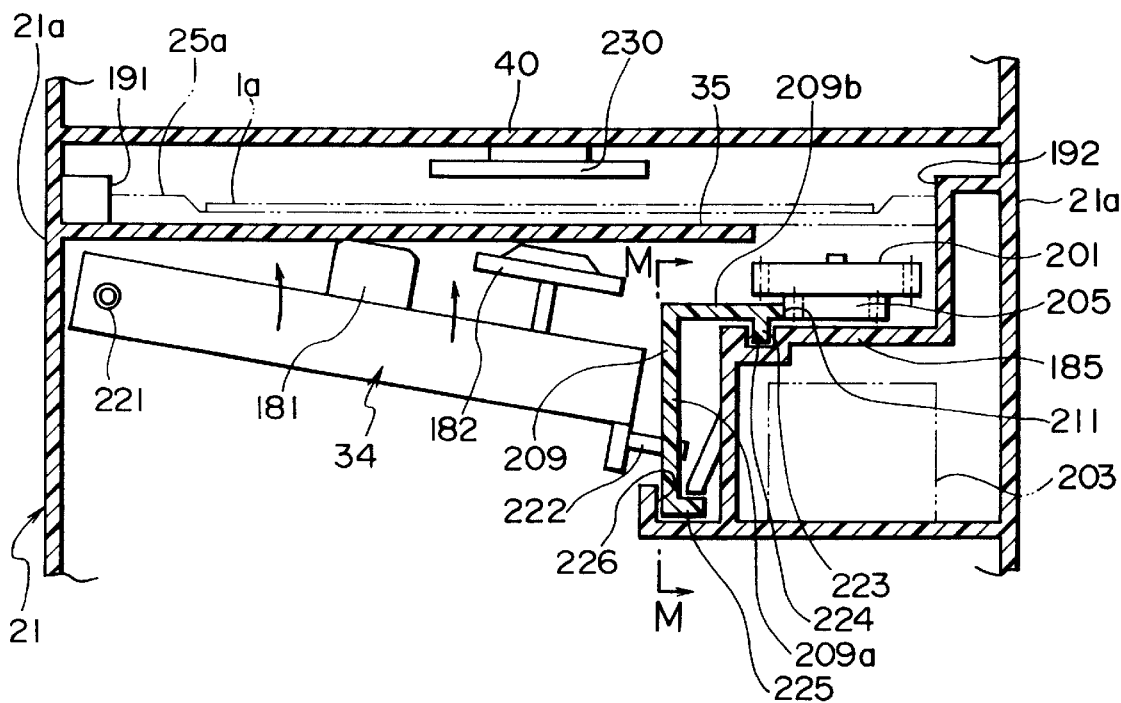
FIG. 25 is a cross-sectional view from line L—L of FIG. 23 according to the present invention.

A playback area 35 for holding the disc 1 and the disc holder 25 in the playback position is located between the player 34 and the tray area 40. When the disc 1 is to be played back, the player 34 moves up, and the disc 1 is lifted up by a turntable 182 which is attached to the upper side of the player 34 and is clamped by a disc clamper 230 (FIG. 25).

A cam gear 161, (FIG. 19), which is a driving means for the stocker drive cam 23, is attached to the upper side of the upper partition 31, and a control block 36, which is a control means, is located below the lower partition 32. A transparent window 37 is positioned from the top to the front side of the cabinet 21. A user can see the stocker 22 moving up and down and the tray 33 sliding.

First Disc Holder and Stocker

Figure 2:
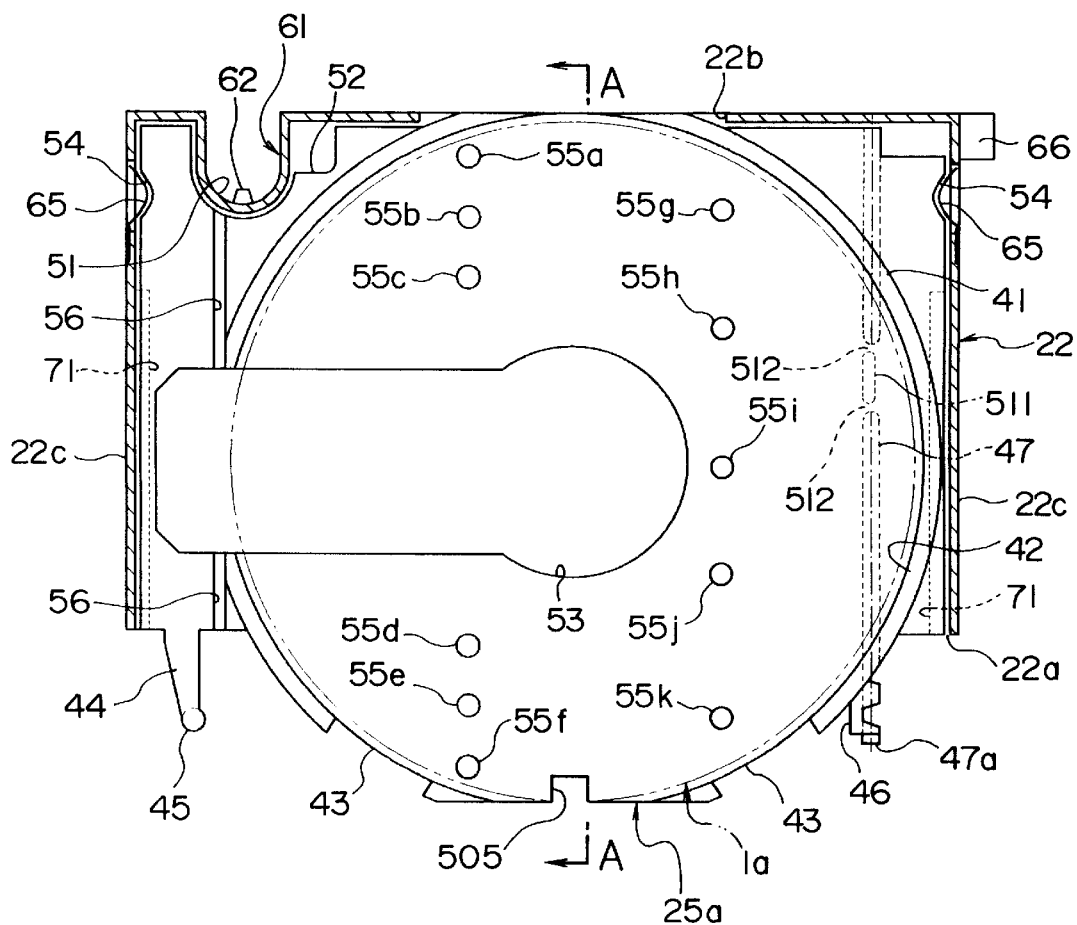
FIG. 2 is a cut-away top view of a first disc holder 25a for a 12 cm disc in a stocker 22 according to the present invention.

FIG. 2 shows a construction of the compartments of the stocker 22 and the disc holder 25. In this embodiment, a first disc 1a, the diameter of which is 12 cm, or a second disc 1b, (FIG. 34), the diameter of which is 8 cm, is used as a disc 1. A first disc holder 25a is used only for the first disc 1a of 12 cm, and with the second disc 1b of 8 cm, a second disc holder 25b (FIG. 34) described below is used.

The length from the front to the rear of the first disc holder 25a is set approximately equal to the diameter of the first disc 1a. A circular disc area 41 is depressed in the middle of the first disc holder 25a, and the first disc 1a is placed in the disc area 41. An incline 42 slanting down into the depressed disc area 41 is formed along the circumference of the disc area 41, so that the user can easily take out the first disc 1a. A pair of first cut-away portions 43 are formed at the right and left fronts of the incline 42 symmetrically with respect to the center axis.

An oblong playback opening 53 through which an optical pickup 181 for reading data recorded on the disc 1 and the turntable 182 (FIG. 33) are inserted, is formed from the left side into the center of the disc area 41. Six detection holes 55a to 55f through which the presence, the position, and the possible abnormal condition of the first or second discs 1a or 1b are detected, are arranged in a row at predetermined intervals left of the center axis. Five detection hole 55g to 55k are arranged in a row at predetermined intervals right of the center axis.

These detection holes 55a to 55k are used for detection of the presence or absence, type, and possible double-loading of the first discs 1a, and are arranged at predetermined intervals so that a second disc 1b accidentally placed by the user can be detected.

Figure 3:
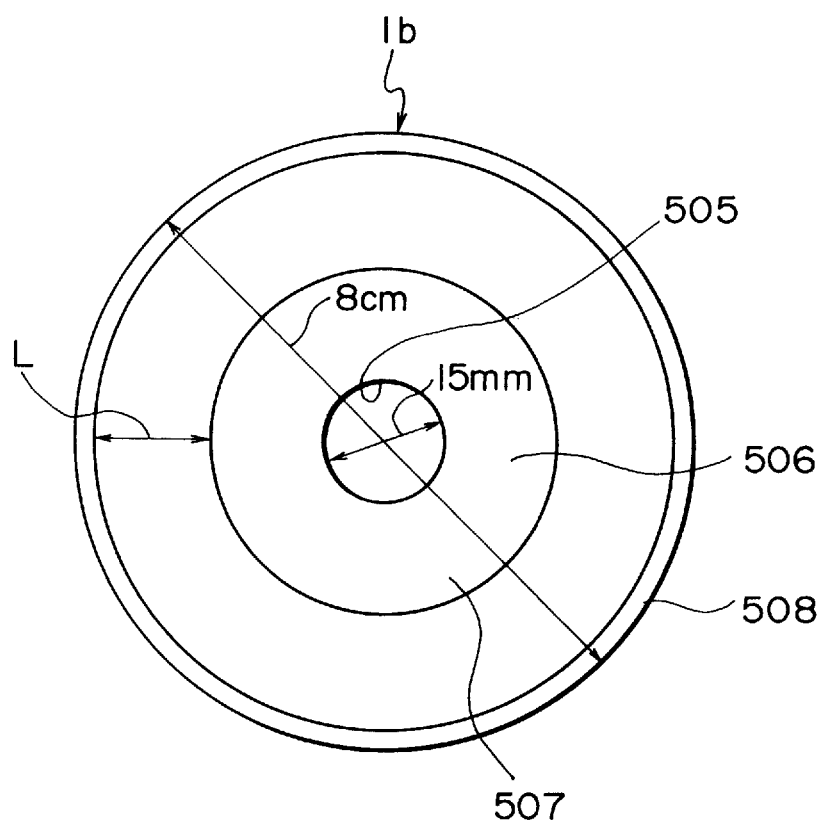
FIG. 3 is a top view of a second disc 1b with a diameter of 8 cm according to the present invention.

The intervals between the detection holes 55a to 55k are determined in accordance with the construction of the second disc 1b shown in FIG. 3. The diameter of the second disc 1b is 8 cm, and a center hole 505, the diameter of which is 15 mm, is formed in the center of the second disc 1b for chucking purpose. A transparent area 506 is positioned around the center hole 505, and a non-transparent area 507 on which a record film is layered is positioned outside the transparent area 506. A narrow transparent area 508 is positioned outside the non-transparent area 507.

Accordingly, if at least one of the detection hole 55a to 55k is obstructed by a non-transparent area 507 when a second disc 1b is placed on the tray 33, the second disc 1b which is accidentally placed on the first disc holder 25a can be detected. Because the non-transparent area 507 is formed into the shape of a ring, the disc area 41 may be divided into four areas, an upper, lower, left, and right area. When a second disc 1b slides onto the area of the upper, lower, left, or right block, at least one of the detection holes 55a to 55k in the area will be obstructed by the non-transparent area 507.

Referring to FIG. 2, a slender first projection 44 protrudes from the left front of the first disc holder 25a, and a column shaped lever engaging portion 45 is formed onto the underside of the end of the first projection 44. A slender second projection 46 protrudes from the right front of the first disc holder 25a. A rack 47 is formed from the right side of the second projection 46 through the underside of the disc area 41.

The rack 47 is divided into two parts, and an engaging portion 511 of a predetermined length is positioned between the two parts. There is a space 512 between the rack 47 and the engaging portion 511. The engaging portion 511 prevents the first disc holder 25a in the playback position from accidentally sliding off before the player 34 moves up. The engaging portion 511, a dual gear 201 described below (FIG. 23), and an arc rib 510 constitute a position regulation means.

A stopper 47a, the cog of which is a different shape from that of the rack 47, is formed onto the top of the rack 47. During an initializing operation, when the first disc holder 25a in the playback position is being transferred to a compartment of the stocker 22 where another first disc holder 25a is already stored, the stopper 47a holds a rear transfer gear 184 (FIG. 21) in order to prevent the first disc holder 25a from being transferred by the rear transfer gear 184. In other words, the stopper 47a comes into contact with a second blank portion 188b (FIG. 22) of the rear transfer gear 184, thereby stopping rotation of the rear transfer gear 184. This prevents the first disc holder 25a in the playback position from being damaged by colliding with another disc holder 25 which is already stored in the stocker 22.

Figure 9:
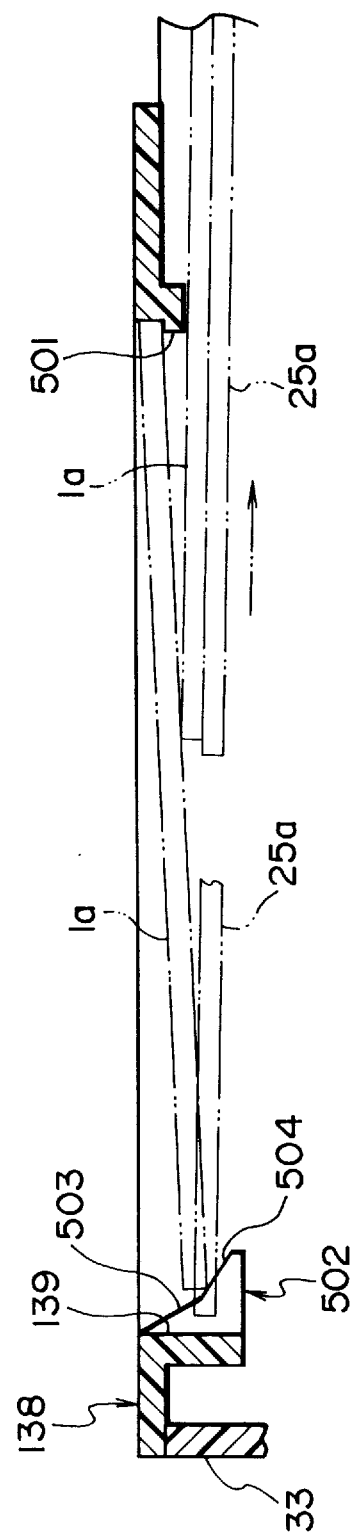
FIG. 9 is a cross-sectional view from line C—C of FIG. 8 according to the present invention.

A second cut-away portion 51 and a third cut-away portion 52 through which the stocker drive cam 23 (FIG. 1) and the guide rod 24 (FIG. 1) are positioned are adjacently formed into the left rear of the stocker 22 and of the first disc holder 25a. Semicircular engaging cut-away portions 54 are formed into the right and left sides near the rear of the first disc holder 25a. A lever groove 56 for guiding a second holding lever 253 (FIG. 34) is formed into the upper side of the first disc holder 25a from the front to the rear. A rectangular cut-away portion 505 is formed into the middle front of the first disc holder 25a so as to avoid a tapered rib 502 (FIG. 9).

The length from the front to the rear of the stocker 22 is set at the minimum length necessary to store the first disc 1a, in this embodiment, approximately equal to the diameter of the first disc 1a. Accordingly, the size of the stocker 22 can be minimized. The inside of the stocker 22 is slightly wider than the first disc holder 25a. A front portal 22a is formed into the front side of the stocker 22. A cam-inserting groove 61 into which the stocker drive cam 23 (FIG. 1) is inserted is formed into the left rear of the stocker 22, and a cam follower 62 protrudes from the curved face of the cam-inserting groove 61. A rectangular projection 66 protrudes from the right rear corner of the stocker 22.

Figure 4:
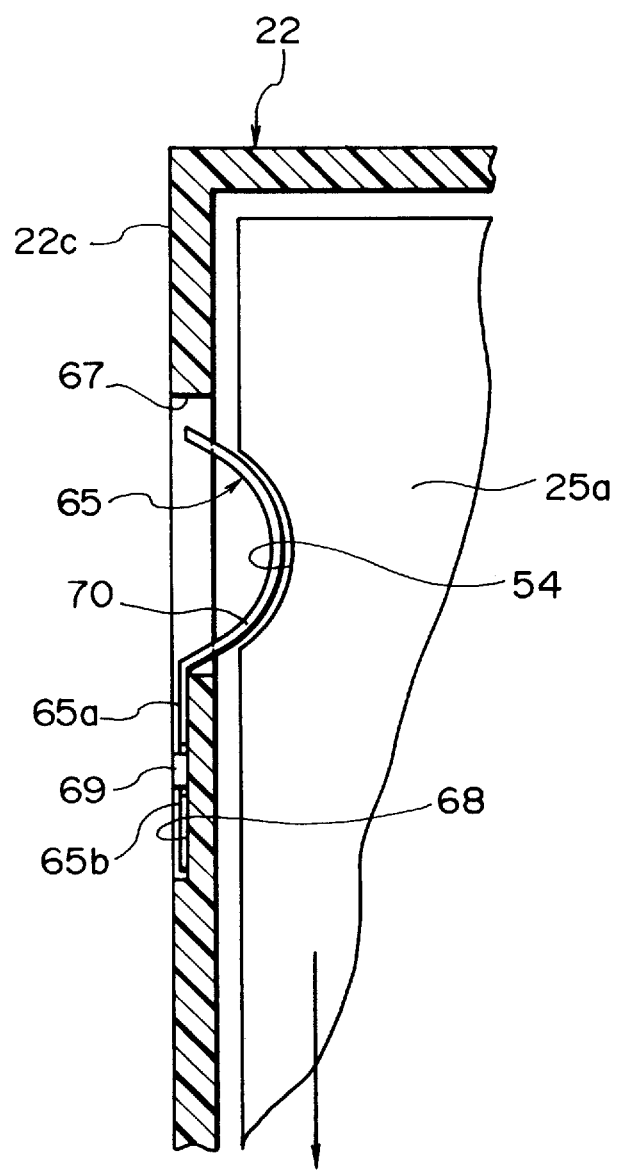
FIG. 4 is a partial view showing a construction of a plate spring 65 according to the present invention.

As shown in FIG. 4, a hollow 68 adjacent to a spring hole 67 is formed into each of the right and left sides 22c of the stocker 22 (only the left side is shown in FIG. 4). An engaging projection 69 is formed onto the bottom of the hollow 68. The engaging projection 69 is inserted into a hole of an engaging piece 65a at the end of a curved portion 70 of a plate spring 65, and the plate spring 65 is thereby attached. The curved portion 70 of the plate spring 65 is inserted through the spring hole 67 into the stocker 22. The engaging piece 65a does not protrude from the side surface of the stocker 22 because the depth of the hollow 68 is greater than the thickness of the engaging piece 65a.

Figure 5:
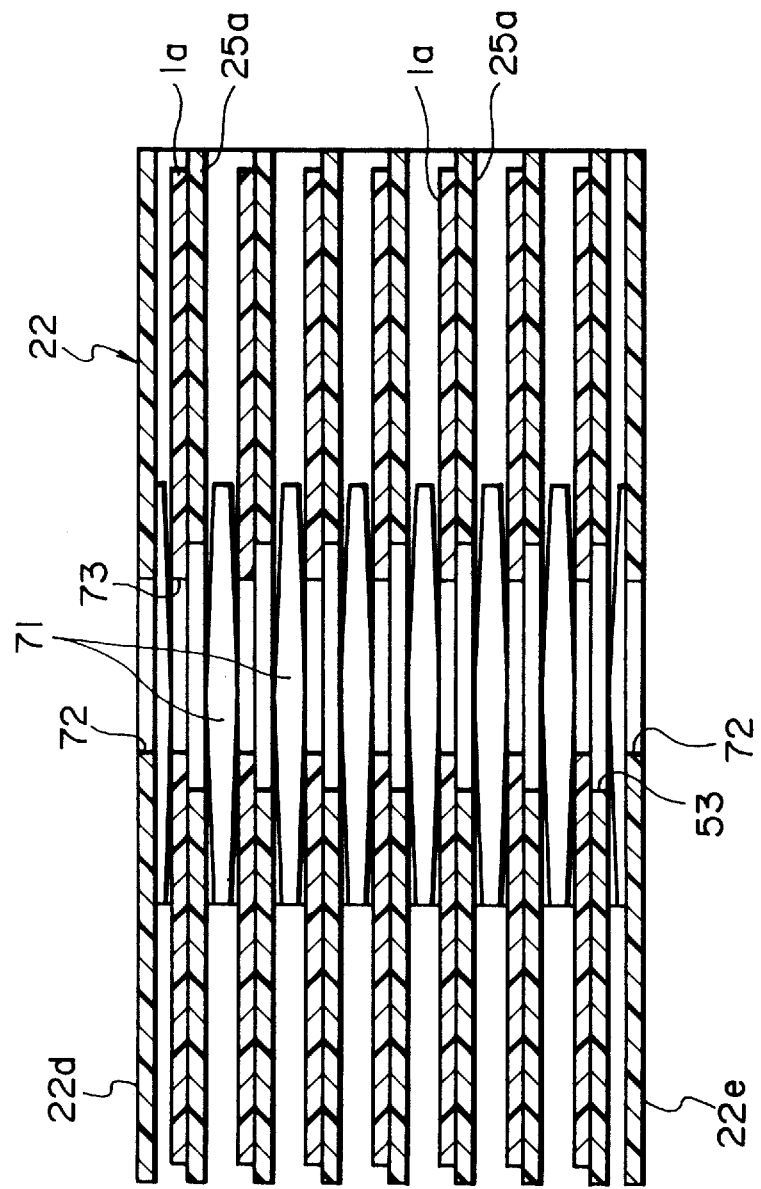
FIG. 5 is a cross-sectional view from line A—A of FIG. 2 according to the present invention.

As shown in FIG. 2, holder shelves 71 for holding the first disc holder 25a protrude from the inside walls of the right and left sides 22c of the stocker 22. The holder shelves 71 are arranged vertically at a predetermined intervals in order to hold seven sets of the discs 1 together with the first disc holders 25a as shown in FIG. 5. The middle of the holder shelf 71 is thicker than the front and rear edges, and the upper side from the middle to the front and the rear is inclined downward. Accordingly, the first disc holder 25a and disc 1 are easily loaded into and removed from such compartment. Holes 72 corresponding to the center axis of the chucking holes 73 of the first disc 1a are formed into the upper and lower walls 22d and 22e of the stocker 22.

When the first disc holder 25a is stored in the stocker 22, the edge of the first disc holder 25a is inserted into the rear opening 22b. The cam-inserting groove 61 is inserted into the second cut-away portion 51 of the first disc holder 25a. There are narrow spaces between the right and left inside walls 22c and the first disc holder 25a. As shown in FIG. 4, the curved portion 70 of the plate spring 65 is inserted into and engages with the engaging cut-away portion 54 of the first disc holder 25a. As shown in FIG. 5, the first disc holder 25a is held by a set of upper and lower holder shelves 71.

When the first disc holder 25a is taken out of the stocker 22, the first disc holder 25a is pulled forward with a predetermined force. The plate spring 65 is elastically deformed out of the engaging cut-away portion 54, so that the first disc holder 25a can be drawn out. The downward inclined face (FIG. 5) which is formed at the front and the rear of the holder shelf 71 allows the first disc holder 25a to slide forward smoothly.

FIG. 6 is a cross-sectional view from line B—B of FIG. 1 and shows the position of the stocker 22 in the cabinet 21. The rear side of the stocker 22 is positioned facing the inside of the rear of the cabinet 21, and the right and left sides 22c of the stocker 22 are positioned facing the inside partitions 82 of the stocker 22. The projection 66 on the right side near the rear of the stocker 22 is inserted into a guide groove 83 which is formed along the course of the stocker 22 (vertically with respect to the diagram).

The stocker drive cam 23 is inserted into the cam-inserting groove 61, and the guide rod 24 is inserted into the third cut-away portion 52 of the first disc holder 25a, passing through the stocker 22. Guide-bar-inserted grooves 90, through which a right guide bar 92 and a left guide bar 93 (FIG. 7) for the tray 33 (FIG. 1) are inserted, are formed between the right and left inside partitions 82 and the outer walls 21a of the cabinet 21.

Tray and Other Parts

Figure 7:
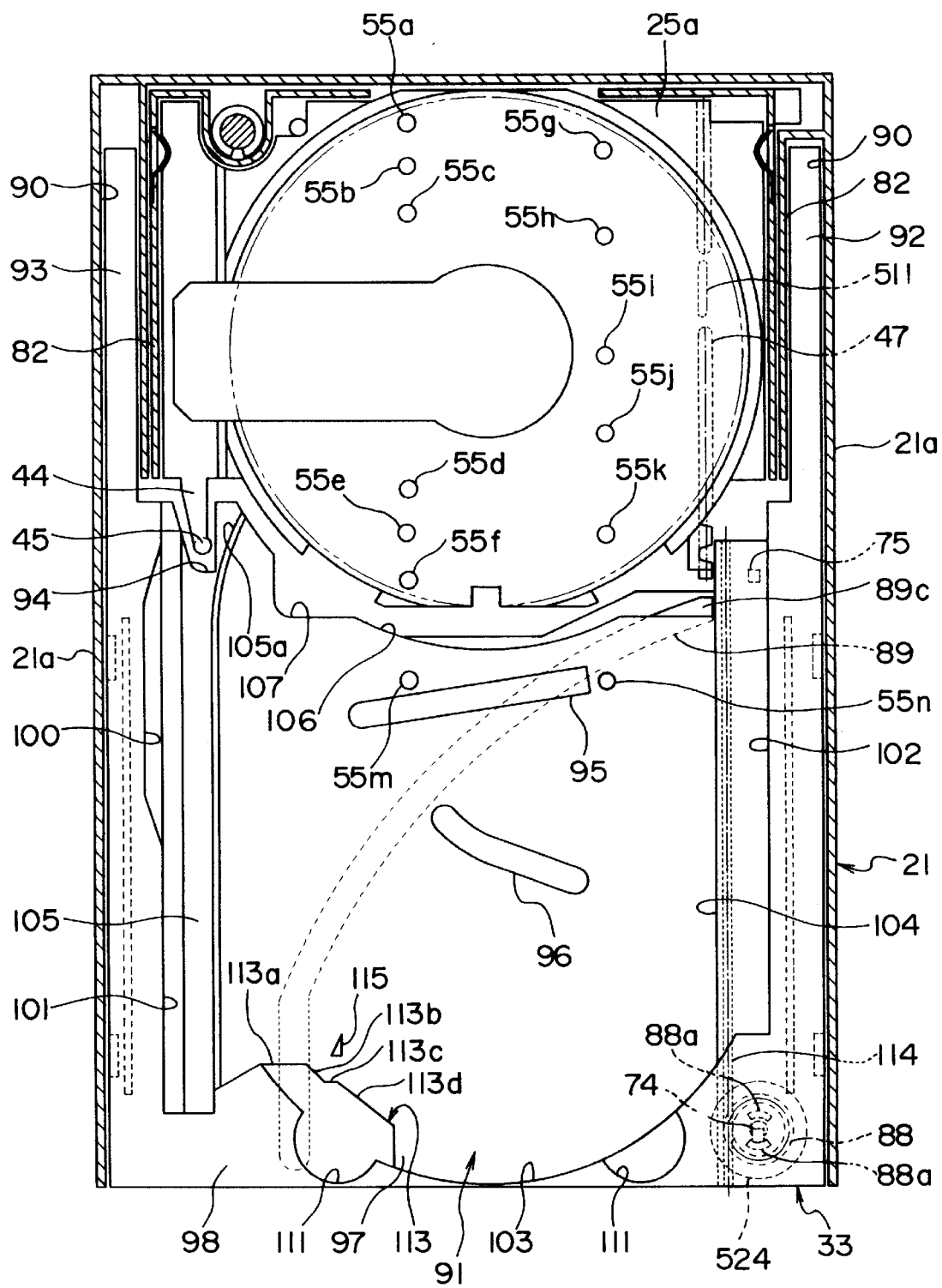
FIG. 7 is a top cut-away view showing a construction of a tray 33 according to the present invention.
Figure 14:
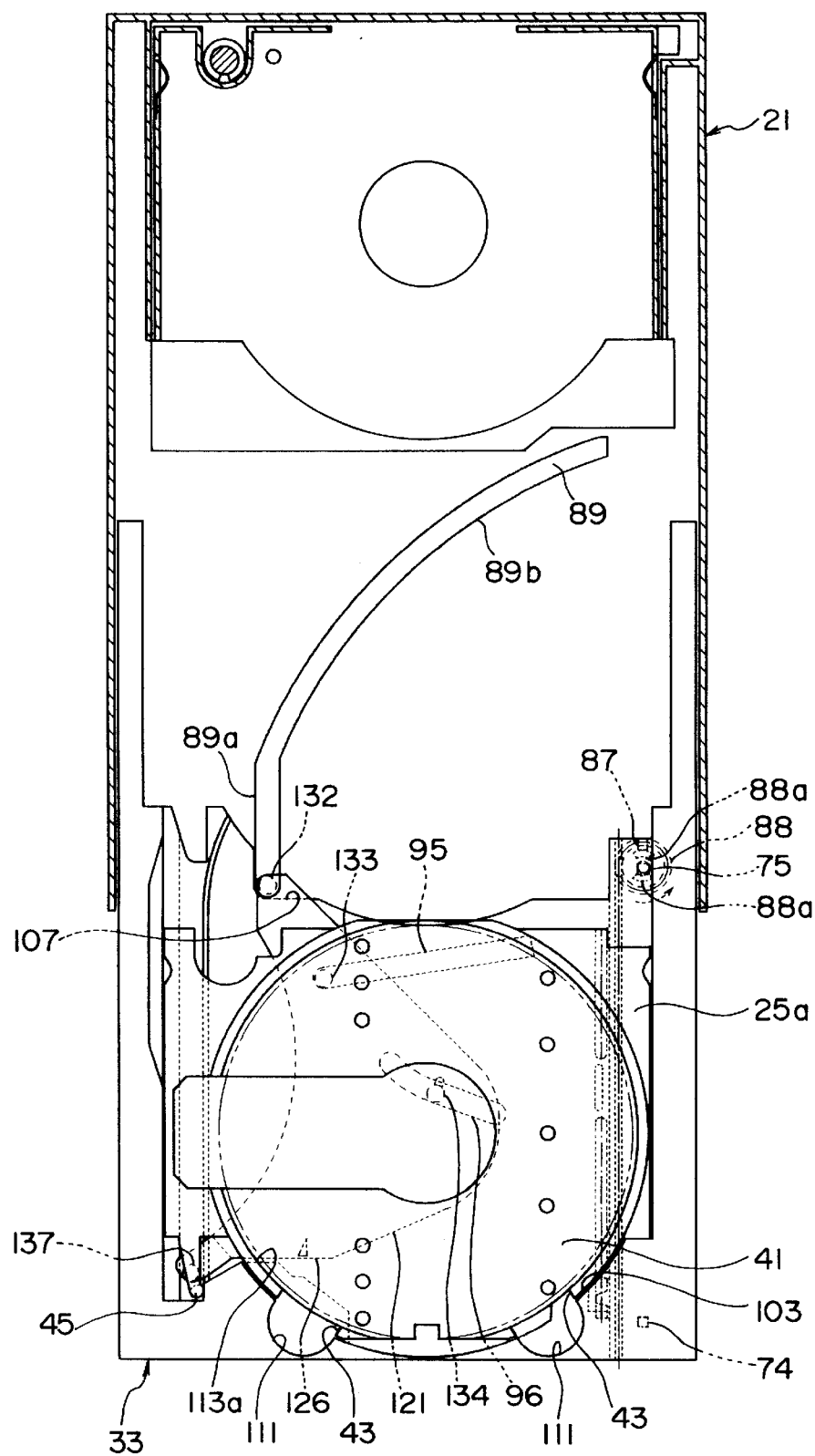
FIG. 14 is a top cut-away view showing a tray 33 when the opening operation is completed according to the present invention.

Referring to FIG. 6, the tray area 40 is positioned in front of the stocker 22. A hole 87 is formed into the right front of the tray area 40, and a tray drive gear 88 is positioned in the hole 87. The tray drive gear 88 is driven by a tray drive motor 524. Two tray stoppers 88a are positioned on the upper side of the tray drive gear 88. When the tray 33 is positioned as shown in FIG. 7 or FIG. 14, a front stopper rib 74 or a rear stopper rib 75 which is formed onto the underside of the tray 33 is engaged with the tray stoppers 88a.

As shown in FIG. 6, two sensors 86L and 86R are positioned in the tray area 40 near the stocker 22. The sensors 86L and 86R detect the presence or absence, and possible slipping, or double-loading of the first disc 1a or the second disc 1b. The left sensor 86L is positioned on the line over which the detection holes 55a to 55f of the disc holder 25a are moved, and the right sensor 86R is positioned on the line over which the detection holes 55g to 55k are moved. The various types of detection operations of the sensors 86L and 86R are described below.

A first lever guide groove 89 is formed onto the tray area 40 from the middle right to the front left. The first lever guide groove 89 is a guide means for guiding a first guided projection 132 of a loading lever 121 (FIG. 8) which is engaged with the disc holder 25a. The first lever guide groove 89 is comprised of a straight portion 89a near the front and a curved portion 89b toward the middle right.

When the first guide projection 132 of the loading lever 121 comes off from the first lever guide groove 89 for some reason, a re-inserting hollow 40a which is a recovery means for re-inserting the first guide projection 132 into the first lever guide groove 89 is formed in front of the first lever guide groove 89. The front side of the re-inserting hollow 40a is as wide as the first lever guide groove 89, and is formed gradually narrower in the middle in order to easily re-insert the first guide projection 132 into the first lever guide groove 89. The re-inserting hollow 40a is shallower than the first lever guide groove 89, in order to prevent the first guide projection 132 from being inserted into the re-inserting hollow 40a when the first guide projection 132 moves through the first lever guide groove 89 and passes by the re-inserting hollow 40a.

First tray guide ribs 76, which are straight, are positioned from the front to the middle along the right and left sides of the tray space 40. Four second tray guide ribs 77 are formed onto the front and the middle inside the right and left outer walls 21a.

As shown in FIG. 7, the tray 33 is placed slidably in the tray area 40. A holder area 91 on which the first disc holder 25a is placed is located in the front of the tray 33, and right and left guide bars 92 and 93 protrude from the right and left rear edge of the holder area 91.

The width of the tray 33 is equal to or slightly less than the inside width of the cabinet 21. The right and left guide bars 92 and 93 are inserted into the right and left guide-bar-inserted grooves 90. Accordingly, the tray 33 can slide along a predetermined course. There are predetermined spaces between the right and left outer walls 21a and the right and left guide bars 92 and 93, so that the tray 33 can slide smoothly forward and backward. The length of the tray 33 is appropriately set so that the front edge of the tray 33 is set in the same position as the front side of the cabinet 21 when the tray 33 is stored in the cabinet 21.

The middle portion of the holder area 91 near the stocker 22 is appropriately shaped so as not to collide with the front edge of the first disc holder 25a when the stocker 22 moves up and down (vertically with respect to the diagram). A fourth cut-away portion 94 is formed so as to avoid contact with the first projection 44 (FIG. 2) of the first disc holder 25a, and the curved portion 106 is formed so as to avoid contact with the disc area 41.

Figure 8:
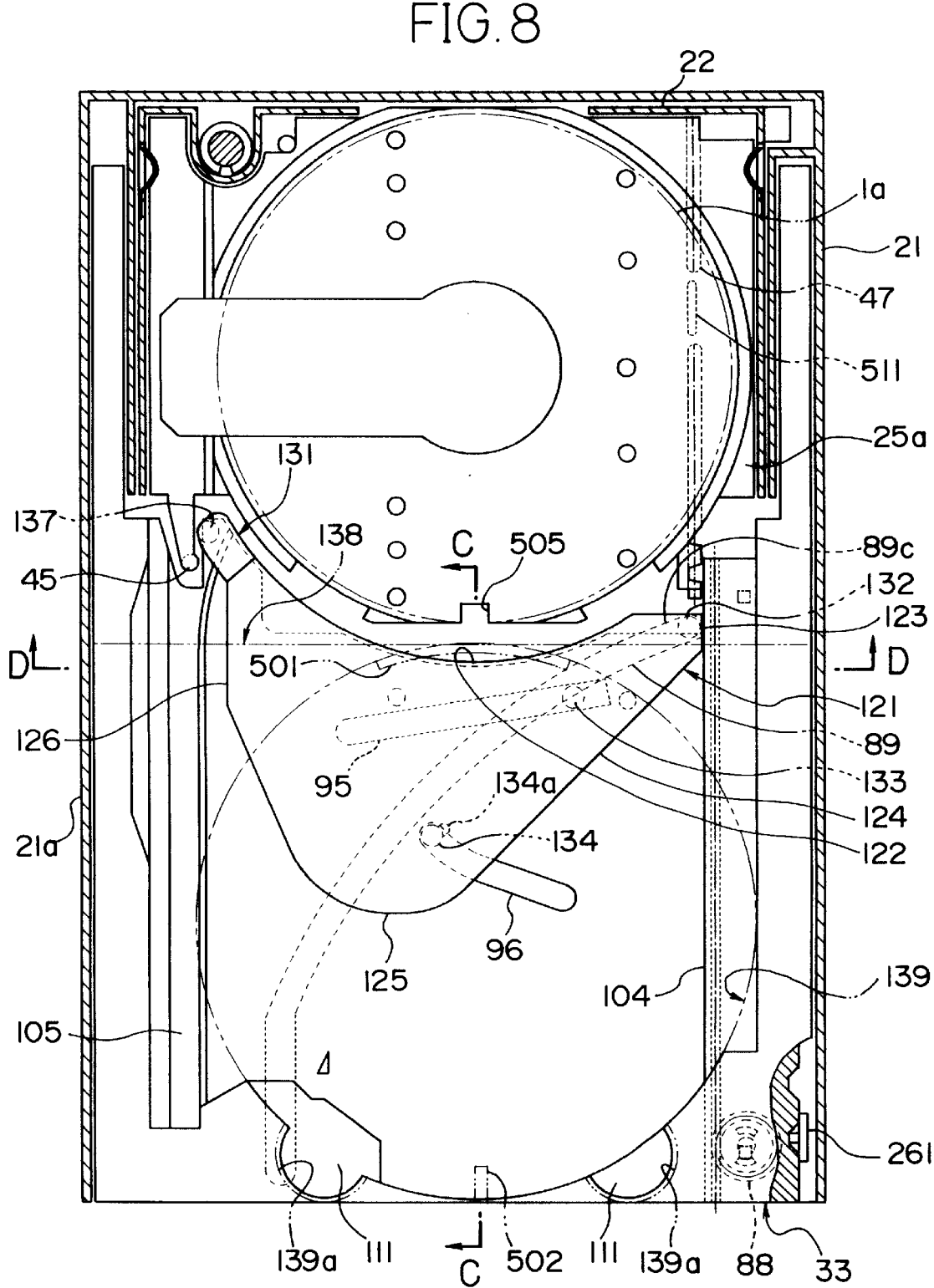
FIG. 8 is a top cut-away view showing a construction of a loading lever 121 according to the present invention.

A fifth cut-away portion 107 is formed into the left side of the curved portion 106 in order to avoid contact with the loading lever 121 (FIG. 8) which is moved and rotated in order to move the first disc holder 25a. When the tray 33 is stored, the right rear edge of the holder area 91 is constructed so as to avoid contact with the rear end 89c of the first lever guide groove 89, so that the first guide projection 132 of the loading lever 121 can be inserted into the rear end 89c of the first lever guide groove 89 on the tray area 40 as shown in FIG. 8.

Referring to FIG. 7, the holder area 91 is comprised of an upper surface 98 and an hollow surface 97. The width of the hollow surface 97 corresponds to the width of the first disc holder 25a, and left and right guide edges 101 and 102 are formed straight from the front to the middle of the left and right inner sides of the hollow surface 97.

A holding lever guide 100 for guiding a second holding lever 153 (FIG. 253) of the second disc holder 25b described below is formed into the wall of the left guide edge 101 on the left side. An engaging portion guide groove 105 for guiding the lever engaging portion 45 (FIG. 2) of the first disc holder 25a is formed from the front to the middle of the right side of the left guide edge 101. The right rear wall of the engaging portion guide groove 105 is a curved portion 105a which is curved in the right direction. A curved edge portion 103 corresponding to the disc area 41 of the first disc holder 25a is formed into the front inside wall of the hollow surface 97. The arc-shaped finger-inserting areas 111 are formed into the right and left sides of the curved edge portion 103.

A second lever guide groove 95 is formed from the left to the right into the hollow surface 97 near the middle, and a third lever guide groove 96 is formed from the right front to the left middle into the hollow surface 97. The second lever guide groove 95 is comprised of only a straight line portion, and the third lever guide groove 96 is comprised of a straight line portion and a curved line portion. The second and third lever guide grooves 95 and 96 are positioned so as not to be parallel, corresponding to the course of the moved and rotated loading lever 121 (FIG. 8). Detection holes 55m and 55n are positioned in the hollow surface 97 near the middle, along the two lines of the detection holes 55a to 55f and 55g to 55k of the first disc holder 25a.

A triangular projection 115 and a contact portion 113 are positioned near the left finger-inserting area 111, in order to rotate a first holding lever 252 (FIG. 35) as described below. The height of the contact portion 113 is set between the upper surface 98 and the hollow surface 97. At the edge of the contact portion 133, a first contact surface 113a, a second contact surface 113b, a third contact portion 113c, and a fourth contact portion 113d are positioned from the left to the right.

A tray drive rack 114 is formed on the underside of the tray 33 from the front to the middle and gears with the tray drive gear 88 of the tray area 40. A front stopper rib 74 and a rear stopper rib 75, which are engaged with the tray stoppers 88a described above, are formed onto the front and the rear underside of the tray 33. When the tray 33 is closed, one of two tray stoppers 88a is engaged with the front stopper rib 74 so that the tray 33 is held and is prevented from being accidentally drawn out by a user.

As shown in FIG. 8, a loading lever 121, which is an engaging lever for engaging with and loading the first disc holder 25a, is positioned on the bottom of the tray 33. The loading lever 121 is formed approximately into a L-shape, and is comprised of a first curved edge 122 which is constructed so as to avoid contact with the disc area 41 of the stocker 22, a first straight edge 123, which comes into contact with a rack guide 104 of the tray 33, a second curved edge 125, which protrudes forward, and a third straight edge 126, which stretches from the left end of the second curved edge 125 to the middle.

A column shaped first guide projection 132, a second guide projection 133, and a third guide projection 134 are formed on the underside of the loading lever 121. The guide projections 132 to 134 are arranged in a line from the right rear to the middle along the second straight edge 124. The first guide projection 132 is inserted into the first lever guide groove 89 of the tray 33, the second guide projection 133 is inserted into the second lever guide groove 95 of the tray 33, and the third guide projection 134 is inserted into the third lever guide groove 96 of the tray 33.

A hook 134a is formed on the third guide projection 134 in order to prevent the third guide projection 134 from coming out of the third lever guide groove 96, and the loading lever 121 is thereby prevented from accidentally coming out of the holder area 91. When the tray 33 is closed, the first guide projection 132 is positioned at the rear end of the first lever guide groove 89, the second guide projection 133 is positioned at the right edge of the second lever guide groove 95, and the third guide projection 134 is positioned at the left end of the third lever guide groove 96.

A short arm 131, the level of which is higher than the other portions, is formed at the crossing of the first curved edge 122 and the third straight edge 126. A column shaped holder engaging portion 137 is formed on the underside of the short arm 131, and is positioned behind the lever engaging portion 45 of the first disc holder 25a.

As shown in FIG. 8 with the double-short-single-long dashed line, the holder area 91 and the loading lever 121 is covered with a tray cover 138. A hole 139 the diameter which corresponds to the diameter of the first disc 1a and a semicircular cut-away portion corresponding to the finger-inserting area 111, are formed into the middle of the tray cover 138.

As shown in FIG. 9, an arc-shaped engaging projection 501 protrudes from the rear edge of the hole 139, and a tapered rib 502 protrudes from the front edge of the hole 139. The engaging projection 501 has a low projection height of, for example, 0.2 mm. The tapered rib 502 is comprised of an upper inclined face 503, which forms a steep slope, and a lower inclined face which forms a gentle inclined face 504. The engaging projection 501 and the tapered rib 502 constitute a double-loading holding means for the first disc 1a. When two first discs 1a are placed on the tray 33, the engaging projection 501 and the tapered rib 502 hold the upper first disc 1a in order to prevent the first disc 1a from accidentally falling off.

When a user accidentally places, for example, two first discs 1a on the tray 33, the tray 33 is closed in order to store the first disc holder 25a in the stocker 22. At such time, the lower first disc 1a is stored in the stocker 22 together with the first disc holder 25a, but the upper first disc 1a collides with the rear edge of the tray 33 and is left on the tray 33.

The remaining first disc 1a is slightly tilted, its front edge is held by the lower inclined face 504 of the tapered rib 502, and its rear edge is slightly lifted. When the lower first disc 1a further slides, the upper first disc 1a is drawn together with the lower first disc 1a, and its lifted rear edge is stranded on the engaging projection 501. The upper first disc 1a is placed and held on the engaging projection 501 of the tray cover 138 and the lower inclined face 504 of the tapered rib 502. This prevents the upper first disc 1a from accidentally falling under the tray 33.

When two first discs 1a are so placed, such condition is detected and the tray 33 is re-opened before it is completely closed. The lower first disc 1a on the first disc holder 25a is inserted under the upper first disc 1a which is left on the tray 33. This allows the user to easily take out the upper first disc 1a.

A cut-away portion 505 (FIG. 2) is formed into the front edge of the first disc holder 25a in order to avoid contact with the tapered rib 502, so that the first disc holder 25a can be positioned to a position where the disc area 41 of the first disc holder 25a corresponds to the hole 139 in the tray cover 138 as shown in FIG. 8.

Figure 10:
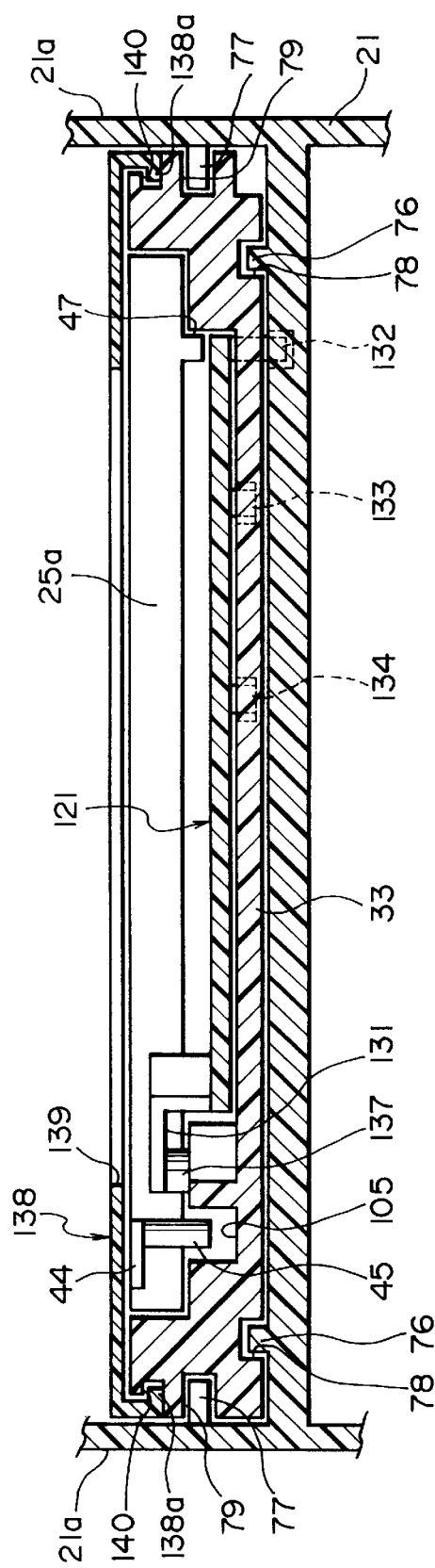
FIG. 10 is a cross-sectional view from line D—D of FIG. 8 according to the present invention.

FIG. 10 is a cross-sectional view from line D—D of FIG. 8, and shows a construction of the first disc holder 25a, the tray 33, the loading lever 121, and the tray cover 138 which are described above. The loading lever 121 is positioned below the first disc holder 25a and the tray cover 138 is positioned above the first disc holder 25a, so as not to obstruct the loading lever 121 which is sliding back and forth. The height of the short arm 131 of the loading lever 121 is lower than that of the first projection 44 of the first disc holder 25a, so that the short arm 131 can be inserted under the first projection 44.

Right and left first tray guide ribs 76 in the tray area 40 are inserted into first slide grooves 78 which are formed on the underside of the tray 33. Second tray guide ribs 77 which protrude from the inside of the right and left outer walls 21a of the cabinet 21, are inserted into second slide grooves 79 on the right and left sides of the tray 33. Accordingly, the tray 33 can be moved back and forth.

It is feasible for the tray 33 to be guided only by the second tray guide ribs 77, thus the first tray guide ribs 76 could be omitted. L-shaped cover engaging portions 138a which are formed at the right and left edges of the tray cover 138, are engaged with cover fixing grooves 140 on the right and left sides of the tray 33 so as to allow the user to easily take off the tray cover 138. The user can take off the tray cover 138 in order to inspect the mechanism inside.

Opening and Closing Operation of Tray

The opening and closing operation of the tray 33 is described below. As shown in FIG. 8, the first disc 1a is placed on the first disc holder 25a in the stocker 22. When the user selects an open mode using a mode selection switch (not shown) which is positioned on the front panel of the cabinet 21, the tray drive gear 88 is rotated by the tray drive motor 524 (FIG. 6). The tray drive rack 114 which gears with the tray drive gear 88, is moved, so that the tray 33 is opened forward.

Figure 11:
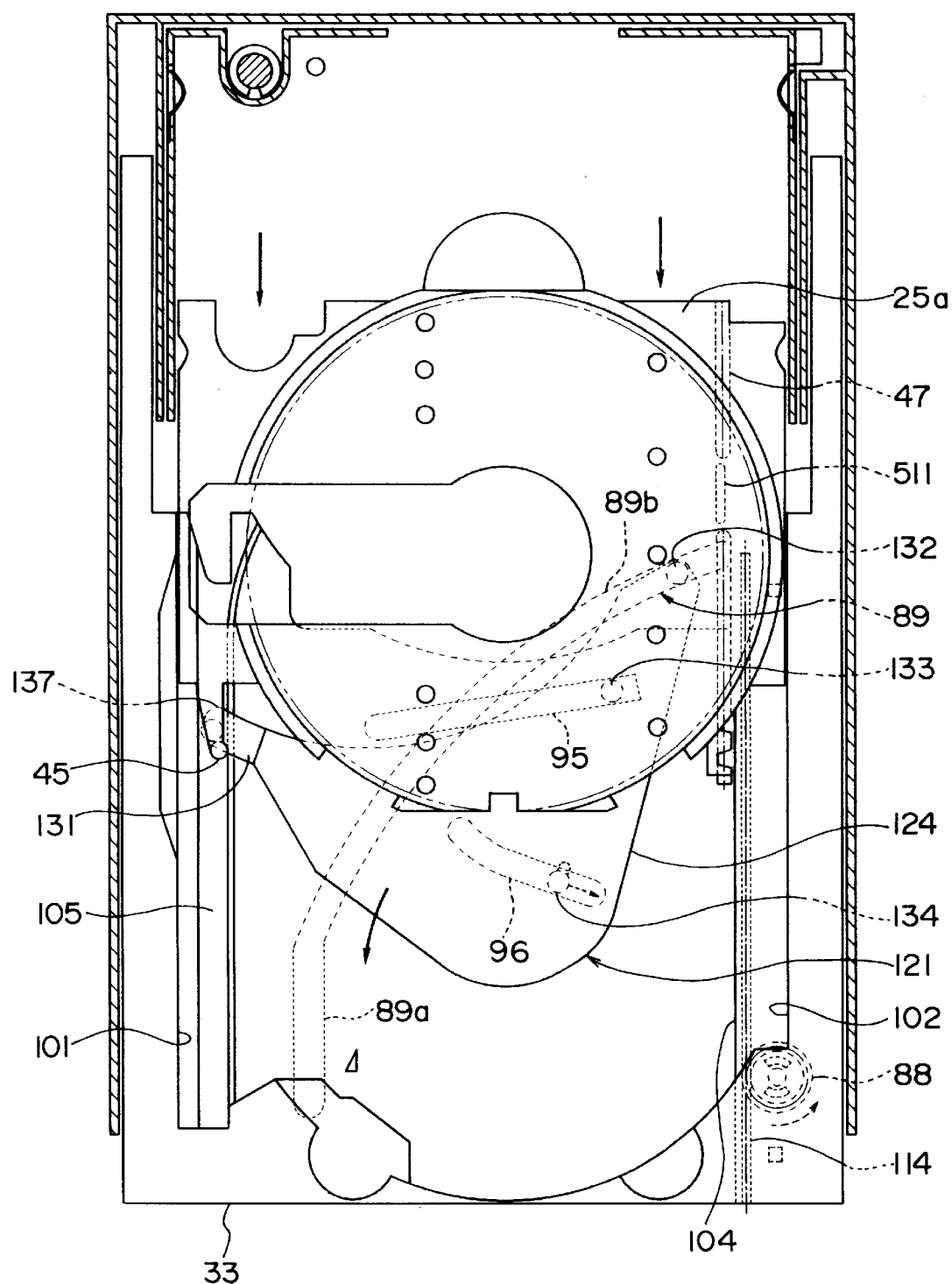
FIG. 11 is a top cut-away view showing an opening operation of the tray 33 (1/2) according to the present invention.

As shown in FIG. 11, when the tray 33 begins sliding forward, the first guide projection 132 of the loading lever 121 is moved along the curved portion 89b of the first lever guide groove 89 to the left front, and the third guide projection 134 is moved along the third lever guide groove 96 to the right front. The loading lever 121 is rotated counterclockwise. The loading lever 121 has been rotated with its center at the second guide projection 133 during a predetermined period after the tray 33 begins, sliding before the loading lever 121 is rotated to a predetermined angle, for example, approximately 45°. Accordingly, the second guide projection 133 is not moved relatively to the tray 33 during such period.

Figure 12:
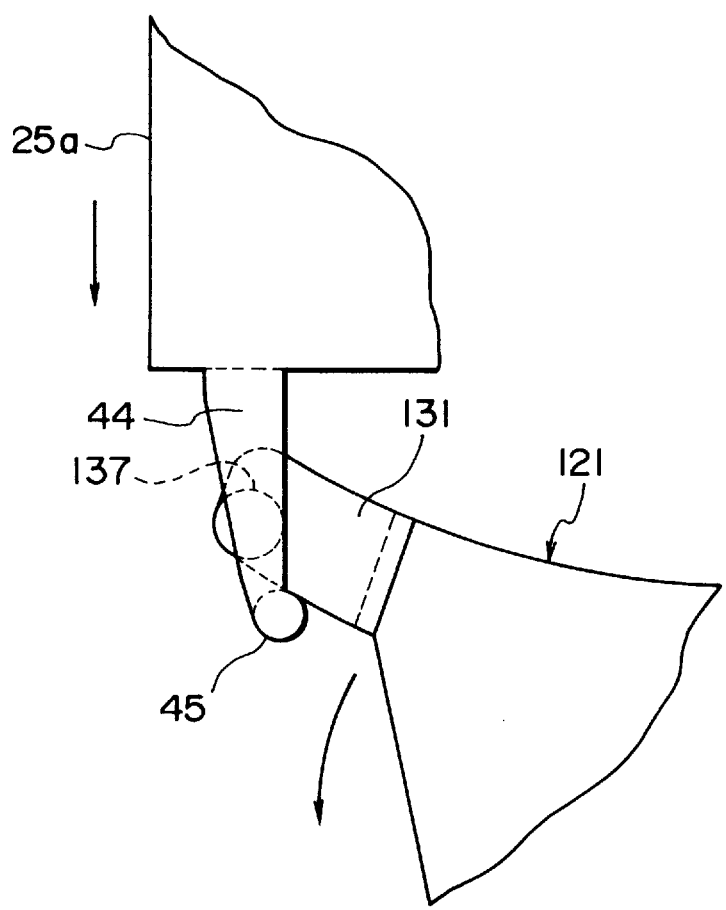
FIG. 12 is a partial view showing engagement between the loading lever 121 and the disc holder 25a in the opening operation according to the present invention.

The holder engaging portion 137 is moved along the engaging portion guide groove 105 by the loading lever 121 which is rotated counterclockwise. As shown in FIG. 12, the short arm 131 of the loading lever 121 is inserted under the first projection 44 of the first disc holder 25a and is engaged with the lever engaging portion 45. When the loading lever 121 is rotated counterclockwise, the lever engaging portion 45 is pushed forward by the short arm 131, so that the first disc holder 25a is moved forward. As shown in FIG. 11, the right and left sides of the first disc holder 25a are guided along the right and left guide edges 101 and 102, so that the first disc holder 25a is moved straight forward.

Figure 13:
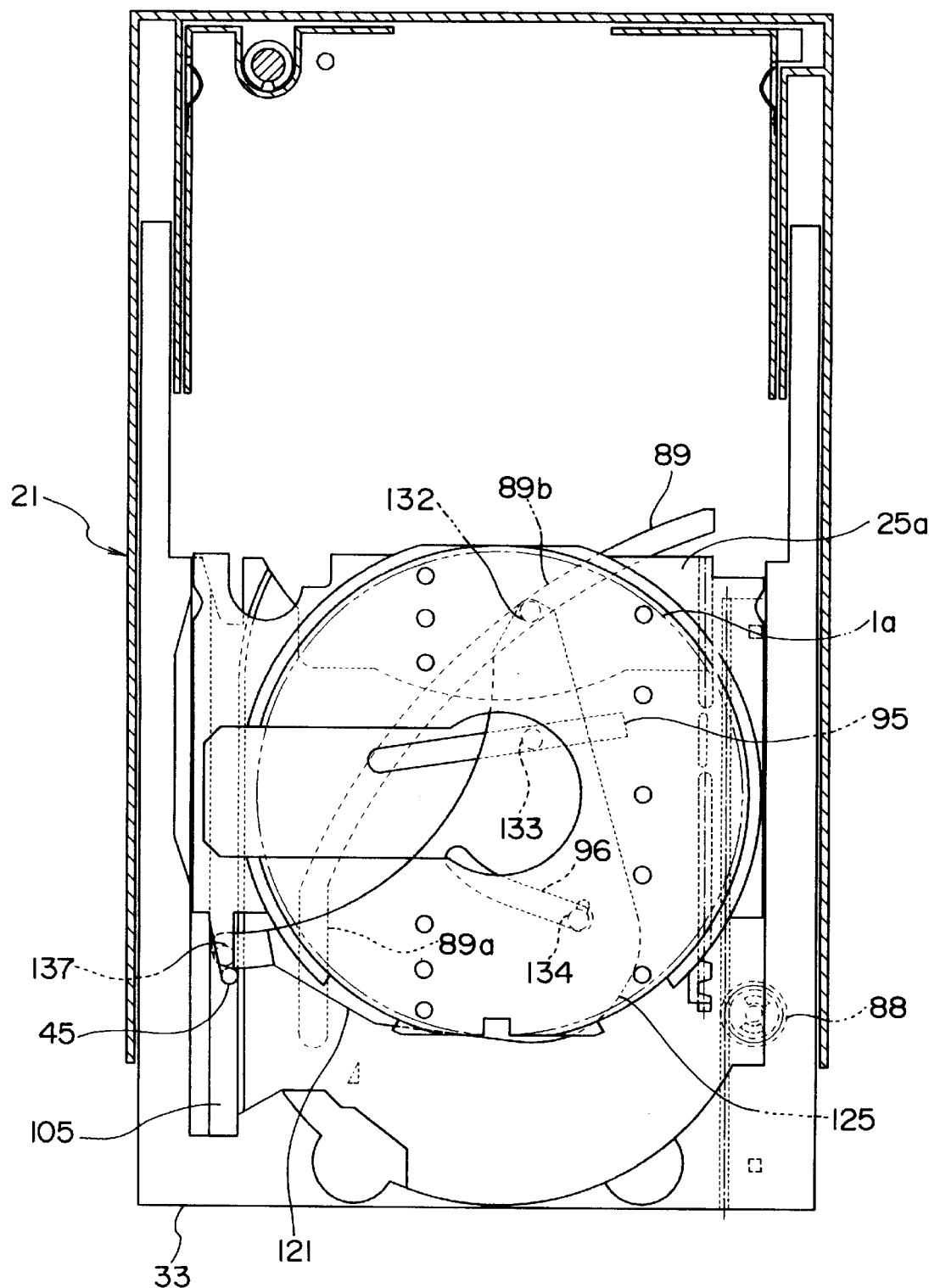
FIG. 13 is a top cut-away view showing the opening operation of the tray 33 (2/2) according to the present invention.

As shown in FIG. 13, when the tray 33 slides forward and the third guide projection 134 of the loading lever 121 reaches the right end of the third lever guide groove 96, the loading lever 121 begins rotating counterclockwise with its center at the third guide projection 134, the first guide projection 133 begins moving along the second lever guide groove 95 to the left, and the second guide projection 133 begins moving along the second lever guide groove 95 to the left. In the time in which the loading lever 121 is rotated counterclockwise with its center at the third guide projection 134, the short arm 131 of the loading lever 121 is moved forward, pushing the lever engaging portion 45 of the first disc holder 25a, so that the first disc holder 25a is moved further forward.

As shown in FIG. 14, when the loading lever 121 is rotated counterclockwise over a predetermined angle, the first guide projection 132 of the loading lever 121 is inserted into the straight portion 89a of the first lever guide groove 89. At this time, the second guide projection 133 of the loading lever 121 reaches the left end of the second lever guide groove 95.

The loading lever 121 is rotated counterclockwise for 90° after the tray 33 begins opening. The lever engaging portion 45 is positioned at the front end of the engaging portion guide groove 105, the outer edge of the disc area 41 of the first disc holder 25a comes into contact with the curved edge portion 103 of the tray 33, the third straight edge 126 of the loading lever 121 comes into contact with the first contact surface 113a of the contact portion 113, and the first guide projection 132 comes into contact with the fifth cut-away portion 107 of the tray 33. At this point, the movement of the first disc holder 25 relative to the tray 33 is completed.

Further, the tray 33 continues to slide forward together with the first disc holder 25a. Since the first guide projection 132 of the loading lever 121 is guided in a straight direction by the straight portion 89a of the first lever guide groove 89 and the holder engaging portion 137 is guided in a straight direction by the engaging portion guide groove 105, the loading lever 121 is moved forward without being rotated. When the first guide projection 132 reaches the end of the straight portion 89a and the first disc holder 25a and the first disc 1a are completely exposed, the tray drive gear 88 is stopped, at which point the opening operation of the tray 33 is completed.

When the tray 33 is opened, the first cut-away portions 43 of the first disc holder 25a correspond to the finger-inserting areas 111, and the user can insert his finger into the finger-inserting areas 111 and easily take out the first disc 1a. In this situation, the rear stopper rib 75 of the tray 33 is engaged with one of the tray stoppers 88a of the tray drive gear 88, and the first guide projection 132 of the loading lever 21 comes into contact with the front end of the straight portion 89a of the first lever guide groove 89, so that the tray 33 is prevented from being further drawn out.

Figure 15:
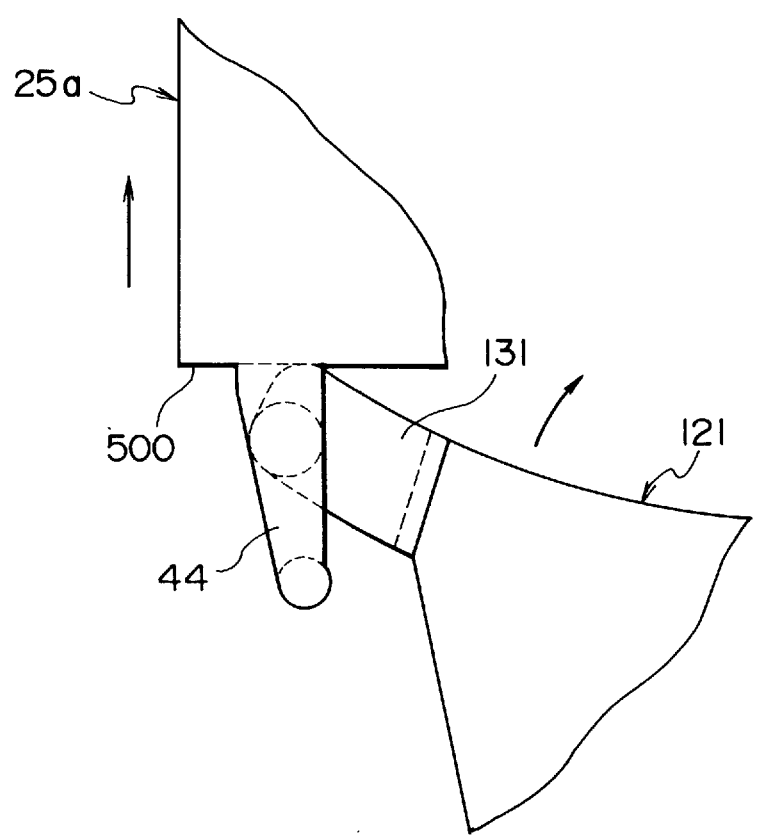
FIG. 15 is a partial view showing engagement between the loading lever 121 and the disc holder 25a in the closing operation according to the present invention.

When the tray 33 is to be closed, the tray drive gear 88 is rotated clockwise in the direction opposite to that for the opening operation, so that the tray 33 slides backward. The loading lever 121 is moved backward in a straight direction, and thereafter is rotated clockwise, in reverse order of the opening operation. As shown in FIG. 15, the short arm 131 of the loading lever 121 comes into contact with and pushes the front edge side 500 of the first disc holder 25a backward to the stocker 22. As shown in FIG. 8, when the closing operation of the tray 33 is completed, the first disc holder 25a is completely stored in the stocker 22. As described above, the first disc 1a can be easily loaded into and removed from the stocker 22 using the loading lever 121 which is rotated and moved in a straight direction synchronously with the tray 33.

When the loading lever 121 is moved forward and the first disc 1a or the second disc 1b is left out of the appropriate position, the loading lever 121 may accidentally come into contact with such disc 1a or 1b and fall off its predetermined course. In the closing operation, although the first guide projection 132 of the loading lever 121 falls out of the first lever guide groove 89, the first guide projection 132 is guided by the re-inserting hollow 40a (FIG. 6) so as to be inserted again into the first lever guide groove 89. Accordingly, when the tray 33 is opened again, the loading lever 121 is moved in the normal course, so that a disc 1a or 1b which is left in the way can be removed.

Raising and Lowering Operation of Stocker

The raising and lowering mechanism and operation of the stocker 22 is described below. As shown in FIG. 1, the stocker drive cam 23 is rotated in order to move the stocker 22 up and down, and the first disc 1a on a compartment specified by a user is transferred to the level of the tray 33 or to the playback area 35. In other words, when a specified first disc 1a is exchanged, the stocker 22 transfers the specified disc 1a to the level of the tray 33, and when a specified first disc 1a is played back, the stocker transfers the specified disc 1a to the level of the playback area 35.

Figure 16:
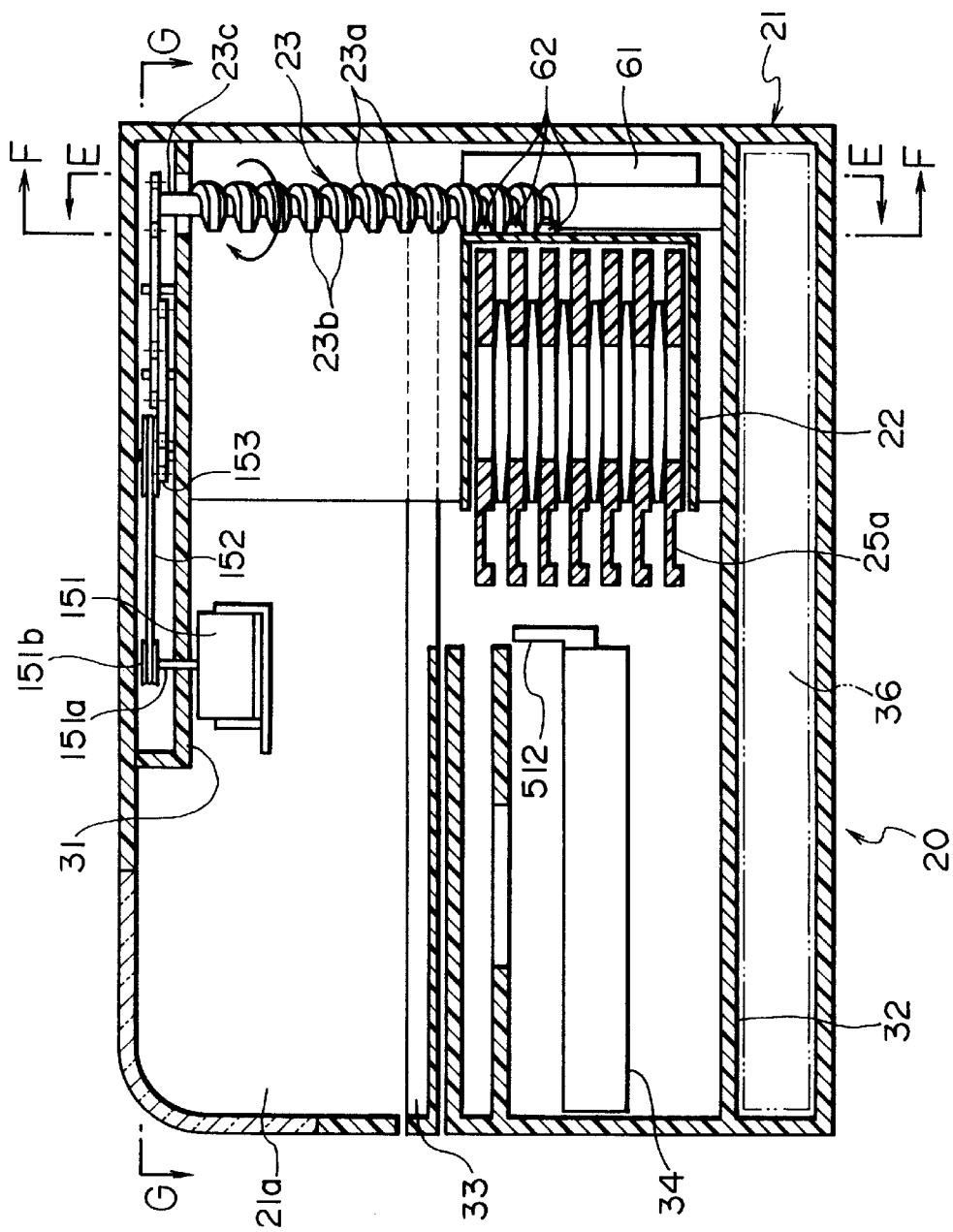
FIG. 16 is a cross-sectional view showing a construction of a stocker drive cam 23 according to the present invention.

As shown in FIG. 2 and FIG. 16, three cam followers 62 protrude from the rear side of the cam-inserting groove 61 of the stocker 22, gearing with the stocker drive cam 23. As shown in FIG. 16, the upper portion of the stocker drive cam 23 penetrates the upper partition 31 and is driven by a drive means (FIG. 19) which is positioned on the upper partition 31 as described below.

Figure 17:
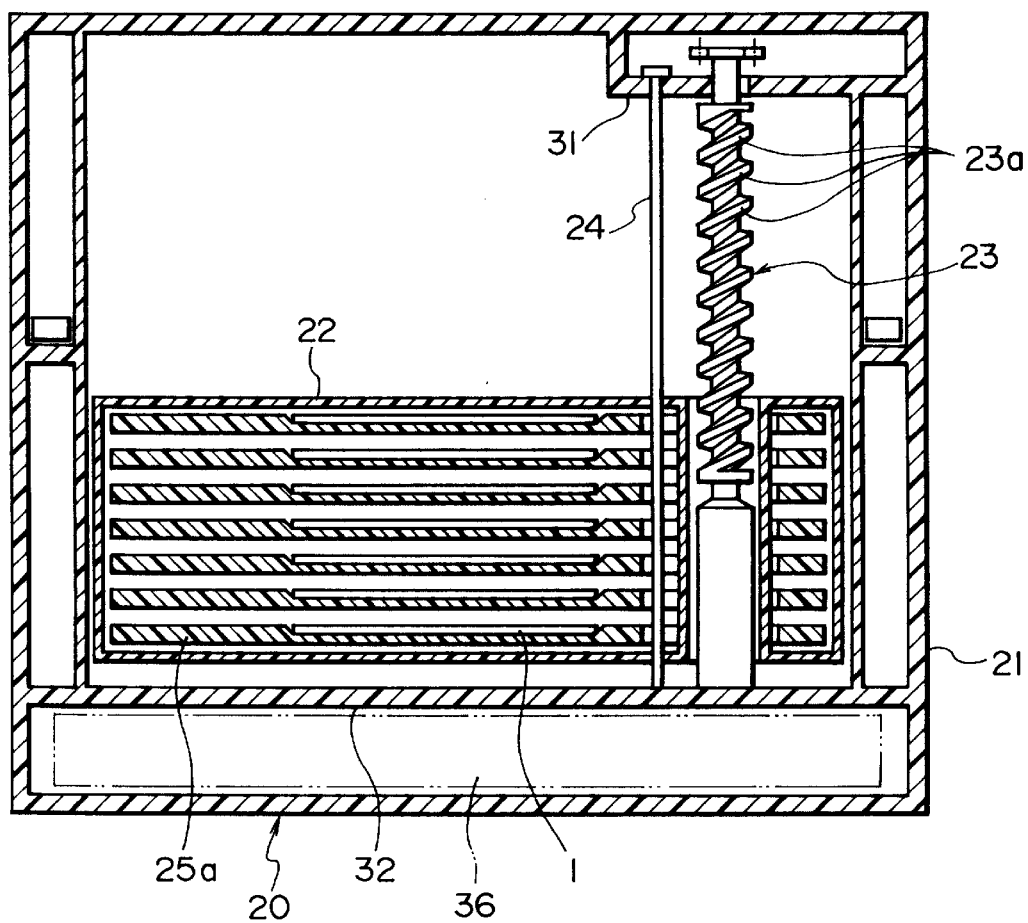
FIG. 17 is a cross-sectional view from line E—E of FIG. 16 according to the present invention.
Figure 18:
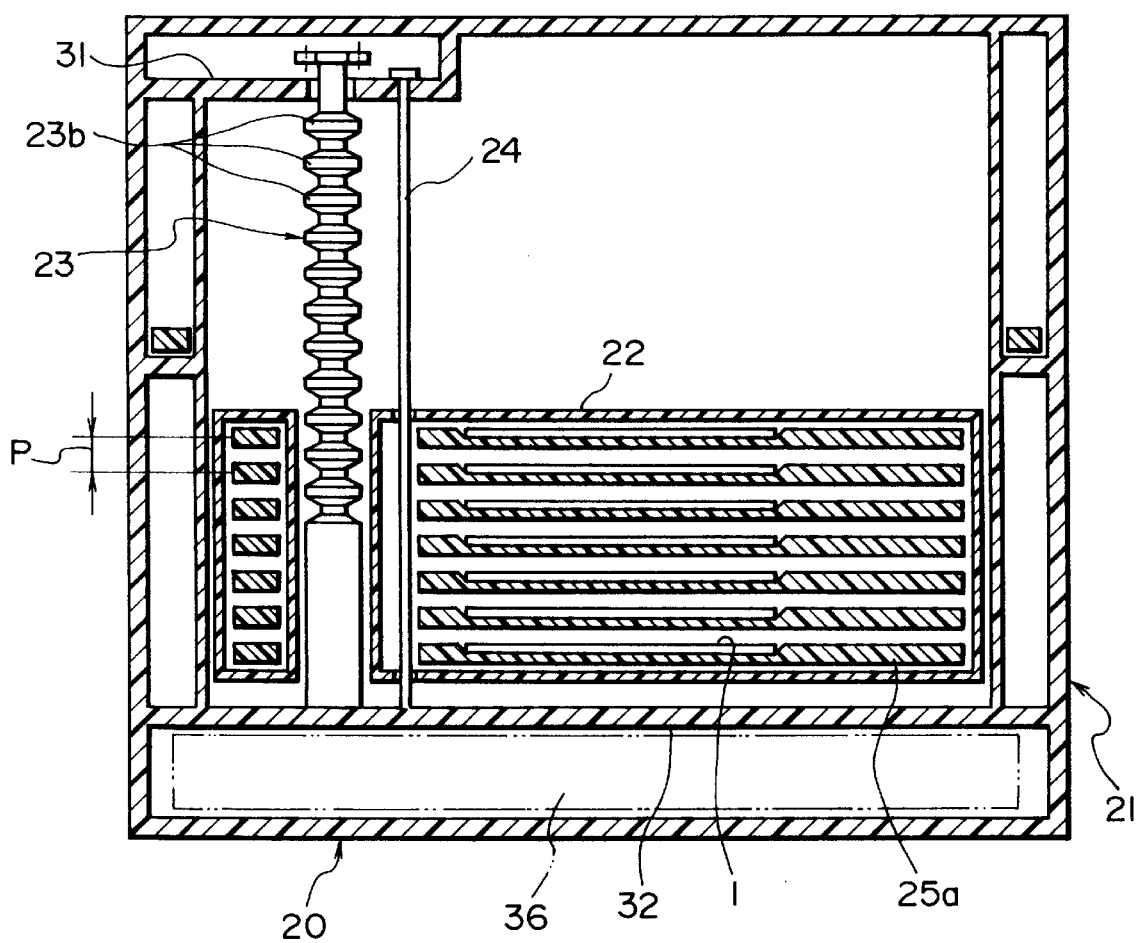
FIG. 18 is a cross-sectional view from line F—F of FIG. 16 according to the present invention.

As shown in FIG. 17, the stocker drive cam 23 is comprised of inclined cogs 23a for moving the cam followers 62 of the stocker 22, and flat cogs 23b for holding the stocker 22. The intervals between the flat cogs 23b is set equal to the intervals between the compartments of the stocker 22 which is equal to the intervals between the stored first disc holders 25a. As shown in FIG. 17 and FIG. 18, the guide rod 24, positioned parallel to the stocker drive cam 23, penetrates the stocker 22 between the upper and lower partitions 31 and 32.

Figure 19:
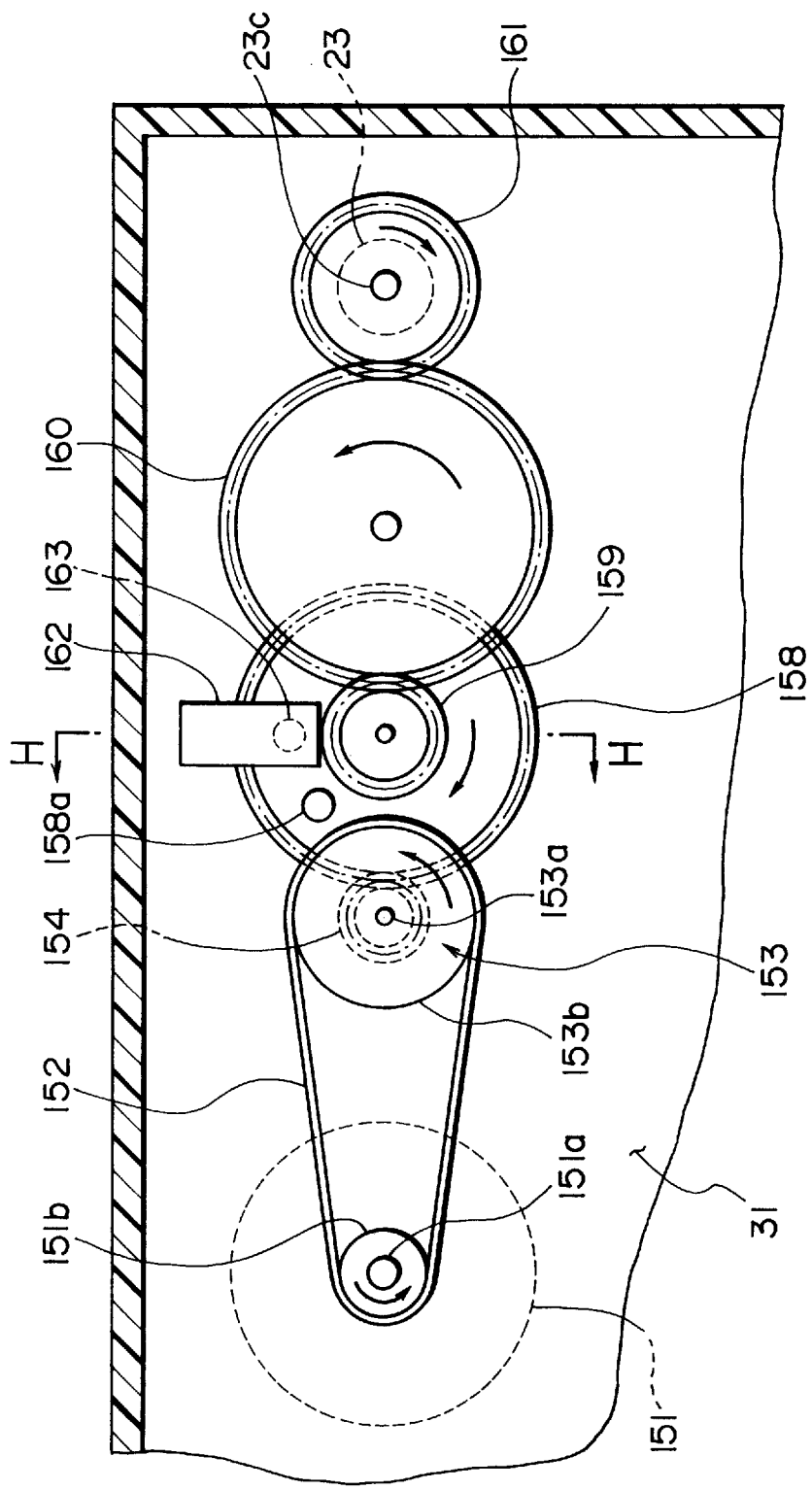
FIG. 19 is a partial view from line G—G of FIG. 16 according to the present invention.

As shown in FIG. 16, the cam drive motor 151 is mounted on the inside of the outer wall 21a of the cabinet 21. The pivot 151a of the cam drive motor 151 penetrates the upper partition 31 and a pulley 151b is attached to the top of the pivot 151a. As shown in FIG. 19, a first transmission gear 153 is attached rotatably onto the upper partition 31, separated from the cam drive motor 151 at an appropriate distance.

A pulley 153b is attached to the top of the pivot 153a of the first transmission gear 153. A belt 152 is twisted around the pulleys 151b and 153b of the cam drive motor 151 and of the first transmission gear 153. A first inner gear 154 with a smaller diameter than the first transmission gear 153, is built onto the underside of the first transmission gear 153 and gears with the second transmission gear 158. One rotation detection hole 158a is formed into the second transmission gear 158. A detector 162 for detecting the rotation detection hole 158a is positioned above the second transmission gear 158.

A second inner gear 159 with a smaller diameter than the second transmission gear 158, is built onto the upper side of the second transmission gear 158 and gears with a third transmission gear 160. The third transmission gear 160 gears with a cam gear 161 which is attached to the pivot 23c of the stocker drive cam 23. Their gear ratios are set so that when the second transmission gear 158 is rotated once, the cam gear 161 is rotated once.

Figure 20:
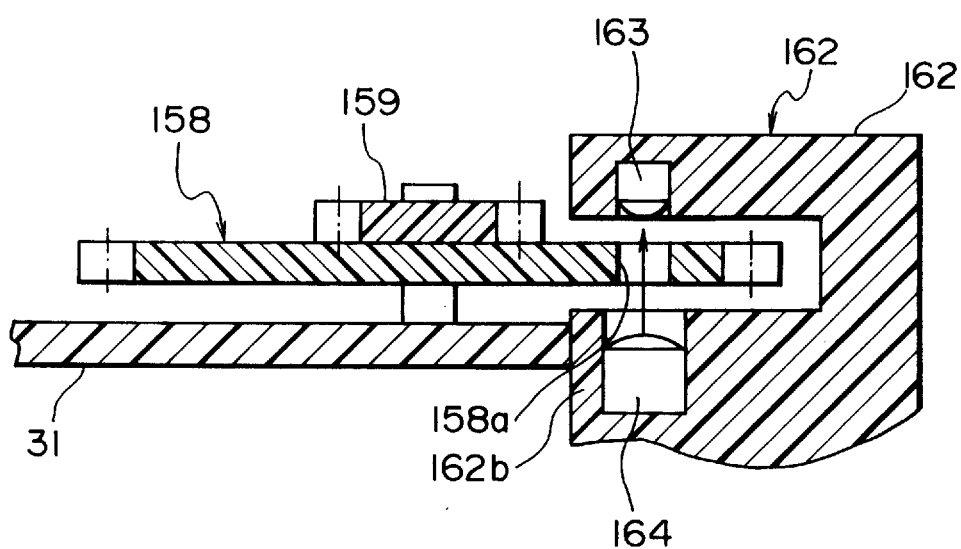
FIG. 20 is a partial view from line H—H of FIG. 19 according to the present invention.

As shown in FIG. 20, the detector 162 is comprised of a upper portion 162a and a base 162b, and the second transmission gear 158 is positioned between the upper portion 162a and the base 162b. A stocker reference position detection sensor 163 is attached to the upper portion 162a of the detector 162 so as to correspond to the rotation detection hole 158a of the second transmission gear 158, and a light emitting device 164 is attached to a base 162b of the detector 162 so as to correspond to the stocker reference position detection sensor 163. Each time the second transmission gear 158 is rotated once, in other words, each time the stocker drive cam 23 is rotated once, a light emitted from the light emitting device 164 is detected through the rotation detection hole 158a by the stocker reference position detection sensor 163.

The rising operation of the stocker 22 is described below. When the stocker is positioned at any level, the rotation detection hole 158a of the second transmission gear 158 corresponds to the stocker reference position detection sensor 163 and the light emitting device 164. In such situation, the inclined cogs 23a of the stocker drive cam 23 are positioned at the rear, and the flat cogs 23b are positioned at the front. The cam followers 62 gear with the flat cogs 23b. Accordingly, in a fashion different from the cams generally in use which are comprised of only inclined cogs in the prior art, the cam followers 62 are prevented from sliding down on the inclined cogs in this embodiment, so that the stocker 22 is held securely at a specified level. The stocker 22 can be securely and accurately positioned.

As shown in FIG. 19, for example, when the stocker 22 moves up one compartment, the cam drive motor 151 is rotated counterclockwise in accordance with a command from the control block 36 which is mounted below the lower partition 32. The rotation is transmitted through the belt 152, the first transmission gear 153, the first inner gear 154, the second transmission gear 158, and the second inner gear 159 to the third transmission gear 160. The rotation of the third transmission gear 160 is transmitted through the cam gear 161 to the stocker drive cam 23, so that the stocker drive cam 23 is rotated clockwise.

As shown in FIG. 16, when the stocker drive cam 23 is rotated clockwise, the cam followers are guided by the inclined cogs 23a to move up, and the stocker 22 moves up. As described above, because the intervals between the flat cogs 23b are set equal to the intervals between the compartments of the stocker 22, when the stocker drive cam 23 is rotated once, the stocker 22 moves up one compartment. As described above with reference to the FIG. 19, when the second transmission gear 158 is rotated once, the rotation detection hole 158a is detected by the light emitting device 164 and the stocker reference position detection sensor 163, and the cam drive motor 151 stops rotating in accordance with the stop command which the control block 36 (FIG. 1) sends in response to the detection signal.

At this point, as shown in FIG. 16, because the flat cogs 23b are positioned at the front and the cam followers 62 gear with the flat cogs 23b, the cam followers 62 are held as securely as they were before the rising operation, and the stocker 22 can be securely and accurately positioned. The lowering operation of the stocker 22 is performed when the cam drive motor 151 is rotated in the direction opposite to the rising operation. When the rising operation for one compartment of the stocker 22 is repeated, the stocker 22 can move up or down by a plurality of compartments.

As described above, with the auto disc changer 20 according to the present invention, because the stocker 22 moves up and down using the inclined cogs 23a of the stocker drive cam 23, and the stocker 22 is held by the flat cogs 23b, the stocker 22 can be securely and accurately positioned with a simple construction.

Playback Operation of Player

The playback operation of the player 34 for the first disc 1a which is stored in the stocker 22 is described below. As shown in FIG. 1, the stocker drive cam 23 is rotated to move the stocker 22 up and down, and a first disc holder 25a stored in a specified compartment is transferred vertically to the level of the playback area 35. The first disc holder 25a in the specified compartment is transferred horizontally to a chucking position in the playback area 35 by a transfer means described below, the player 34 is moved up by a player raising and lowering means described below, and the first disc 1a on the first disc holder 25a is clamped by a chucking means of the player 34. A playback preparation means is comprised of the transfer means and the player raising and lowering means which are performed in succession.

Figure 21:
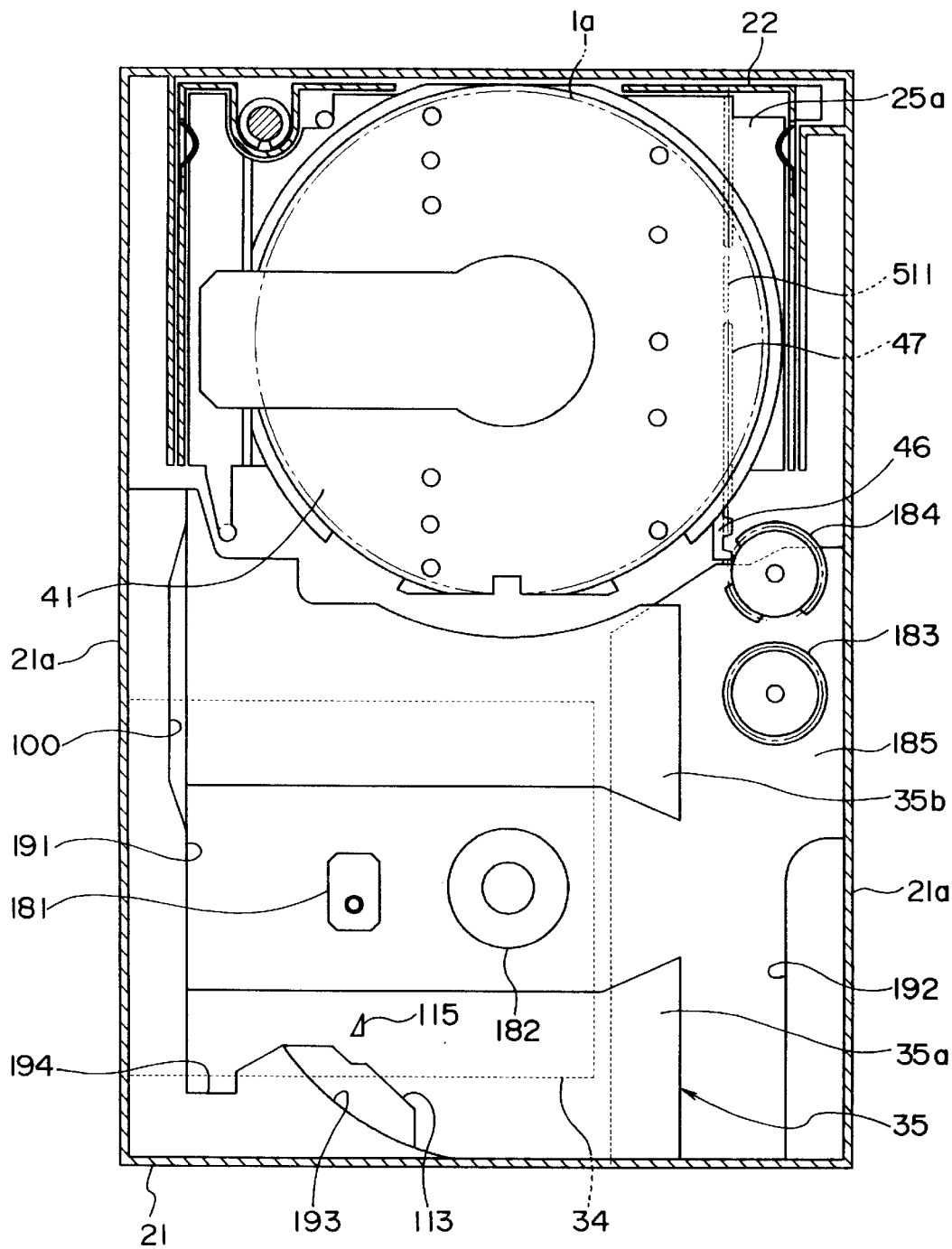
FIG. 21 is a top cut-away view from line J—J of FIG. 1 according to the present invention.

The playback preparation means is described below. FIG. 21 is a top cross-sectional view from line J—J of FIG. 1. The playback area 35 is comprised of plate-shaped front and rear holders 35a and 35b which protrude from the left outer wall 21a of the cabinet 21. The front holder 35a is separated from the rear holder 35b at an appropriate distance.

Straight left and a right edge guides 191 and 192 are formed on the insides of the left and right outer walls. The interval between the left and right edge guides 191 and 192 corresponds to the width of the first disc holder 25a. A holder engaging indentation 194 which is engaged with the first disc holder 25a is formed into the front end of the left edge guide 191. A curved edge portion 193 corresponding to the shape of the disc area 41 of the first disc holder 25a is formed on the left front of the cabinet 21.

The player 34 and the gear mount 185 are positioned below the front and rear holders 35a and 35b. An optical pickup 181 and a turntable 182 are attached to the player 34. When the player 34 moves up in a playback mode, the optical pickup 181 and the turntable 182 pass between the front and rear holders 35a and 35b.

A rear transfer gear 184 which comprises the transfer means is attached on the gear mount 185 so as to gear with the rack 47 of the second projection 46 of the first disc holder 25a. A front transfer gear 183 which comprises the transfer means is attached in front of the rear transfer gear 184. The cogs of the rear transfer gear 184 are constructed in a fashion similar to that of the front transfer gear 183, but the rear transfer gear 184 lacks two parts of the cogs.

Figure 22A:
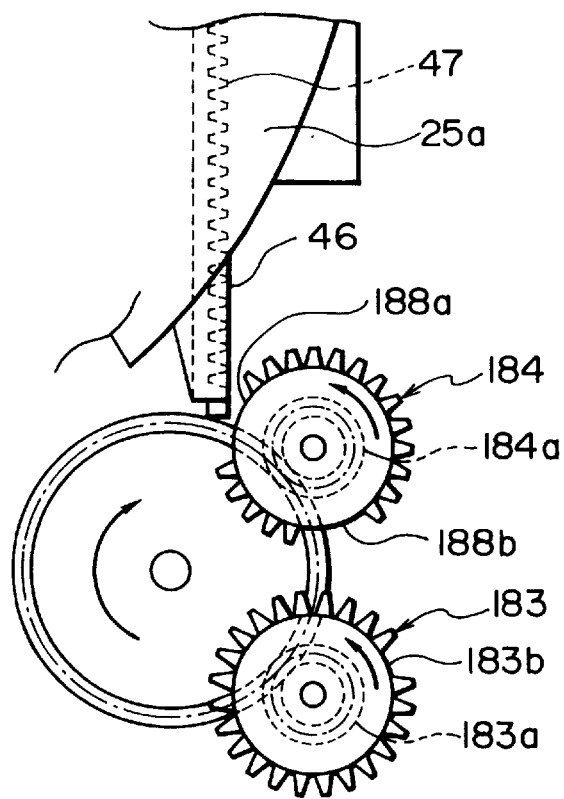
FIGS. 22A and 22B are partial views showing an engagement between transfer gears 183 and 184 and a rack 47 according to the present invention.

As shown in FIG. 22A, the cogs in the rear transfer gear 184 are removed at two blank positions 188a and 188b. In order to prevent the rear transfer gear 184 from coming into contact with the second projection 46 of the first disc holder 25a, the first blank position 188a is positioned at the top of the second projection 46 when the first disc holder 25a is completely stored in the stocker 22. Accordingly, the rear transfer gear 184 does not gear with the rack 47. When the stocker 22 moves up and down, the first disc holder 25a is prevented from colliding against the rear transfer gear 184.

Figure 23:
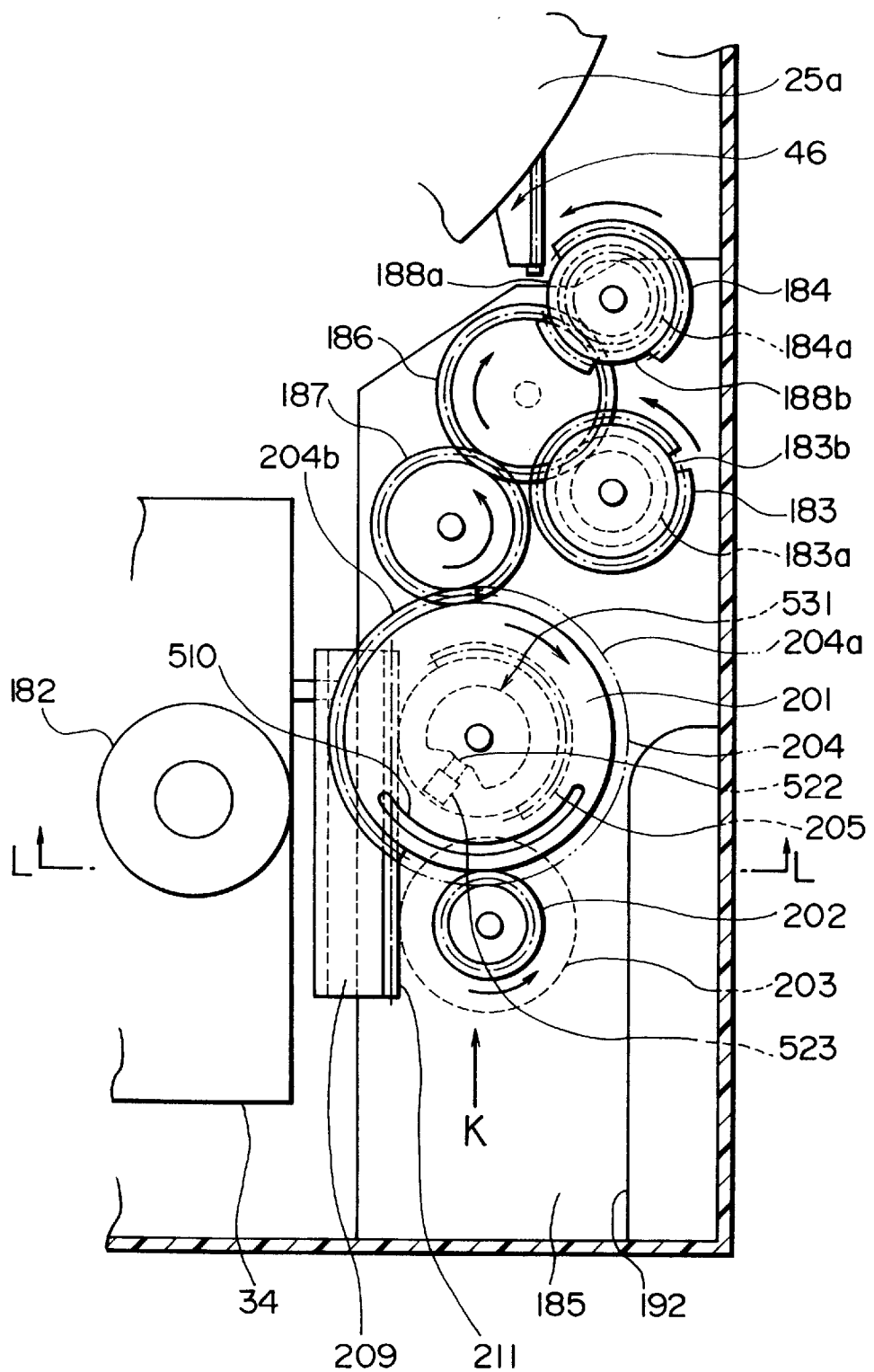
FIG. 23 is a partial view showing the transfer gears 183 and 184 and the other drive means before a transfer operation of a disc begins according to the present invention.

FIG. 23 shows a construction of the drive means for driving the transfer gears 183 and 184. Inner gears 183a and 184a with smaller diameters than the front and rear transfer gears 183 and 184, are built onto the undersides of the front and rear transfer gears 183 and 184. The inner gear 183a has the same diameter as the inner gear 184a, and they gear with a synchronous gear 186, which gears with a transmission gear 187.

Figure 24:
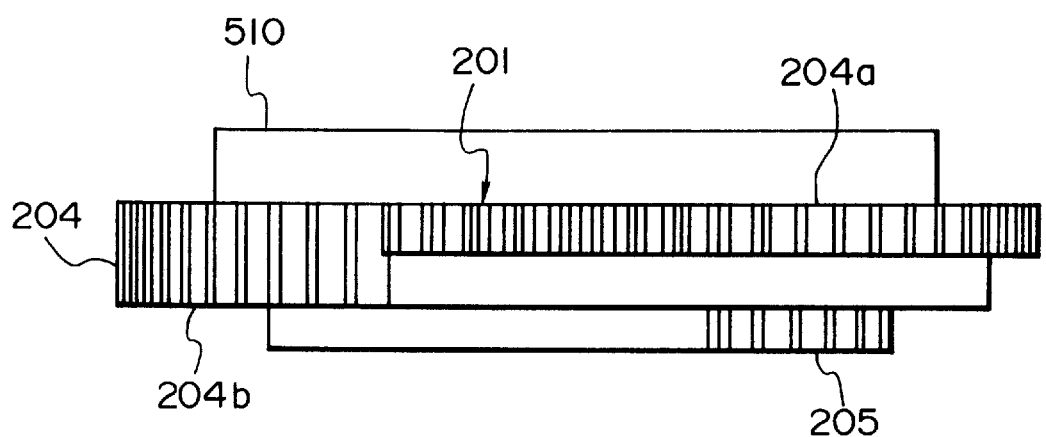
FIG. 24 is a partial view from an arrow K of FIG. 23 according to the present invention.

The transmission gear 187 gears with a dual gear 201 with a greater diameter. An outer gear 204 is built onto the outer edge side of the dual gear 201, and a semicircle inner gear 205 is built onto the underside of the dual gear 201. As shown in FIG. 24, a narrow upper gear 204a and a lower gear 204b which correspond to half of the upper gear 204a are built onto the circumference of the dual gear 201.

As shown in FIG. 23, the lower gear 204b shown with a solid line gears with the transmission gear 187. The upper gear 204a shown with a double-short-single-long dashed line gears with a drive gear 202 of a loading motor 203 which is mounted below the gear mount 185. Because the upper gear 204a is built onto the whole circumference of the dual gear 201, rotation of the loading motor 203 is continuously transmitted to the dual gear 201.

As described above, an arc-shaped rib 510 with a predetermined length is built onto the upper side of the dual gear 201. When the first or second disc holder 25a or 25b is set at the playback position, the arc-shaped rib 510 prevents the disc holder 25a or 25b from moving off its appropriate position. The arc-shaped rib 510 and the engaging portion 511 (FIG. 2) constitute a position regulation means for the disc holders 25a and 25b.

A raising and lowering drive rack 211 of the slider 209 which comprises a player raising and lowering means gears with the inner gear 205 of the dual gear 201. Because the semicircular upper gear 204b and the semicircular inner gear 205 are built onto the dual gear 201, rotation of the loading motor 203 is transmitted to the transmission gear 187 and the raising and lowering drive rack 211 in a timely fashion at predetermined intervals. An arc-shaped cam 531 is built onto the underside of the dual gear 201. An indentation is formed into the circumference of the arc-shaped cam 531 at a predetermined angle. A disc holder detection switch 523 is positioned near the arc-shaped cam 531.

Figure 31:
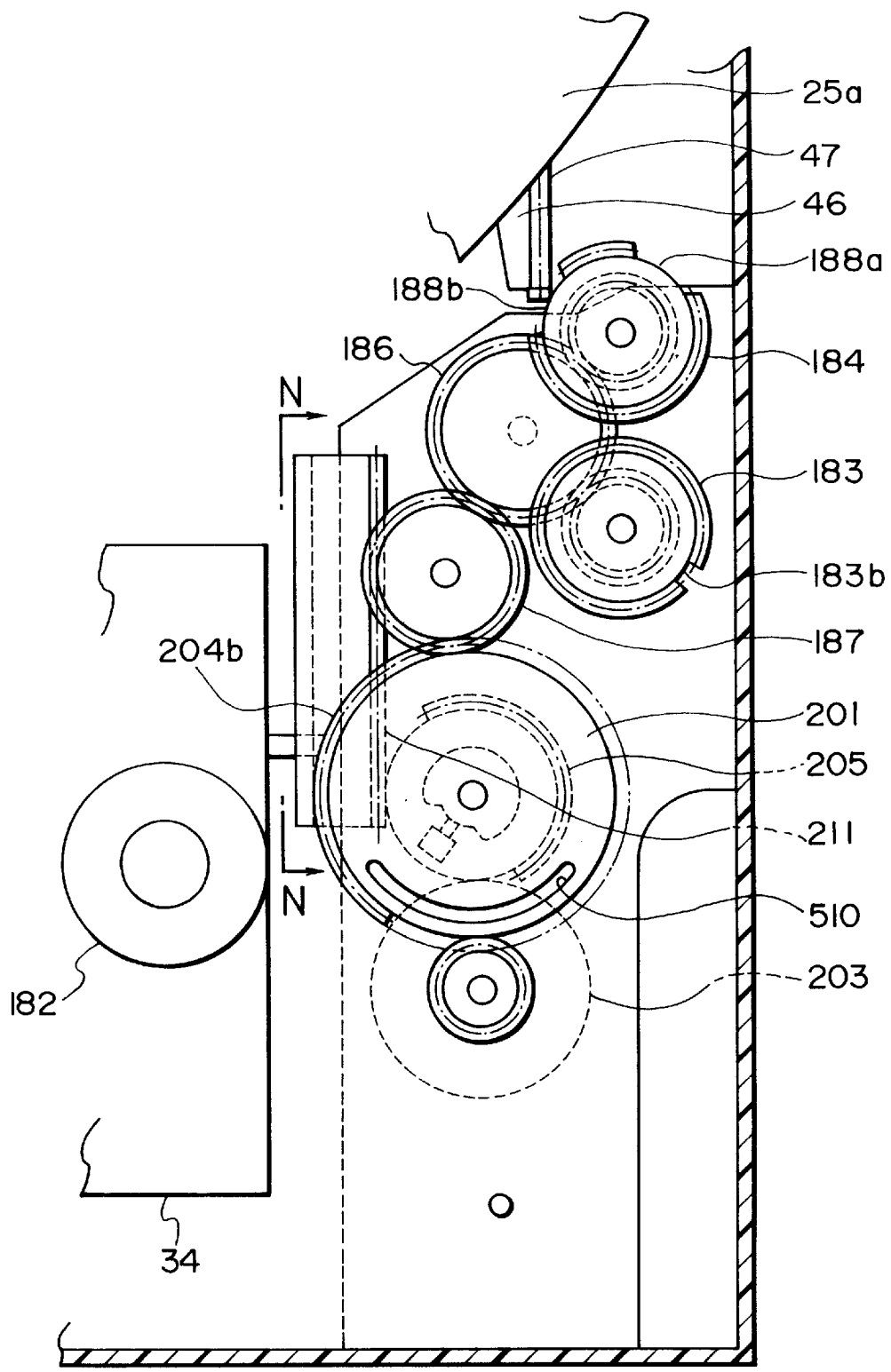
FIG. 31 is a partial view showing the gears when a raising operation for a player 34 is completed according to the present invention.

When the first disc holder 25a is stored in the stocker 22 as shown in FIG. 23 or when the first disc holder 25 is set in the playback position as shown in FIG. 31, the indentation 522 of the arc-shaped cam 531 is positioned with relation to the disc holder detection switch 523, which is turned off. In the other operation when the first disc holder 25 is moving or the player 34 is moving up or down, the disc holder detection switch 523 is turned on.

As shown in FIG. 25, the player 23 is attached rotatably to a pivot 221 which is positioned near the left outer wall 21a of the cabinet 21. A column-shaped projection 222 protrudes from the right side of the player 34. The slider 209 is positioned near the right side of the player 34. The slider 209 is formed into a L-shape with a vertical portion 209a which faces the player 34 and a horizontal portion 209b which is positioned on the upper side of the gear mount 185. The raising and lowering drive rack 211 is built onto the right edge of the horizontal portion 209b and gears with the inner gear 205 of the dual gear 201.

A lower projection 223 is built onto the underside of the horizontal portion 209b from its front to rear (vertically with respect to the diagram) and is inserted into a first guide groove 224 of the gear mount 185. A right projection 225 is formed on the under edge of the vertical portion 209a and is inserted into a second guide groove 226 of the left side of the gear mount 185. Accordingly, the slider 209 can slide only from front to rear. A damper 230 for clamping the first disc 1a is attached rotatably to the underside of the tray area 40 above the playback area 35 in connection with the turntable 182 for the player 34.

Figure 26:
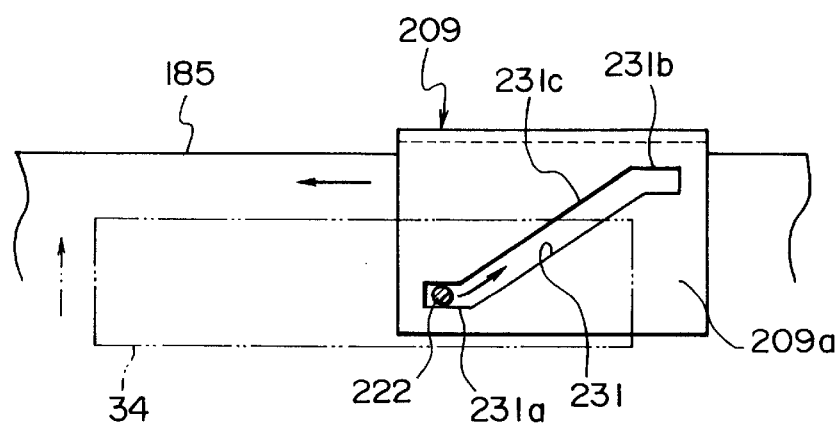
FIG. 26 is a top cut-away view from line M—M of FIG. 25 according to the present invention.

As shown in FIG. 26, a raising and lowering guide groove 231 is formed into the vertical portion 209a of the slider 209. The raising and lowering guide groove 231 is comprised of a rear horizontal portion 231a at the lower rear, a front horizontal portion 231b at the upper front, and an inclined portion 231b extending from the rear horizontal portion 231a to the front horizontal portion 231b. As the slider 209 moves forward or backward, the projection 222 moves up or down along the inclined portion 231b, rotating the player 34 up or down with its center at the pivot 221 (FIG. 25).

Figure 22B:
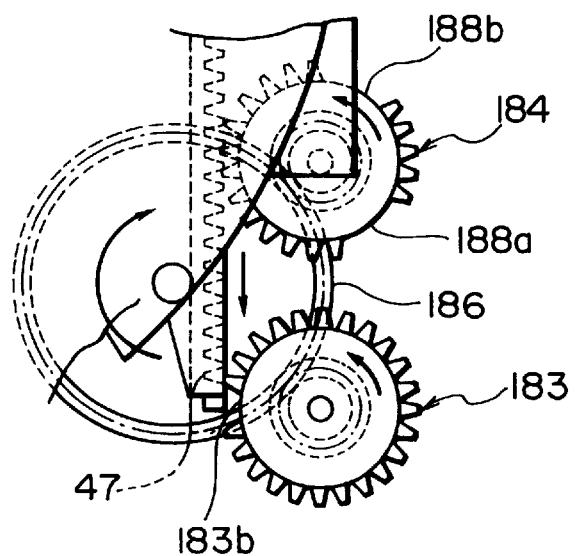

As described in FIG. 23, when the first disc 1a is transferred from the stocker 22 to the playback position, the loading motor 203 is rotated counterclockwise, and the rotation is transmitted via the dual gear 201 to the transmission gear 187, which rotates the synchronous gear 186 clockwise. The rotation of the synchronous gear 186 is transmitted via the inner gears 183a and 184a to the front transfer gear 183 and the rear transfer gear 184. As shown in FIG. 22B, the inner gears 183a and 184b are synchronously rotated so that the rack 47 of the first disc holder 25a gears smoothly with the rear transfer gear 184.

Figure 27:
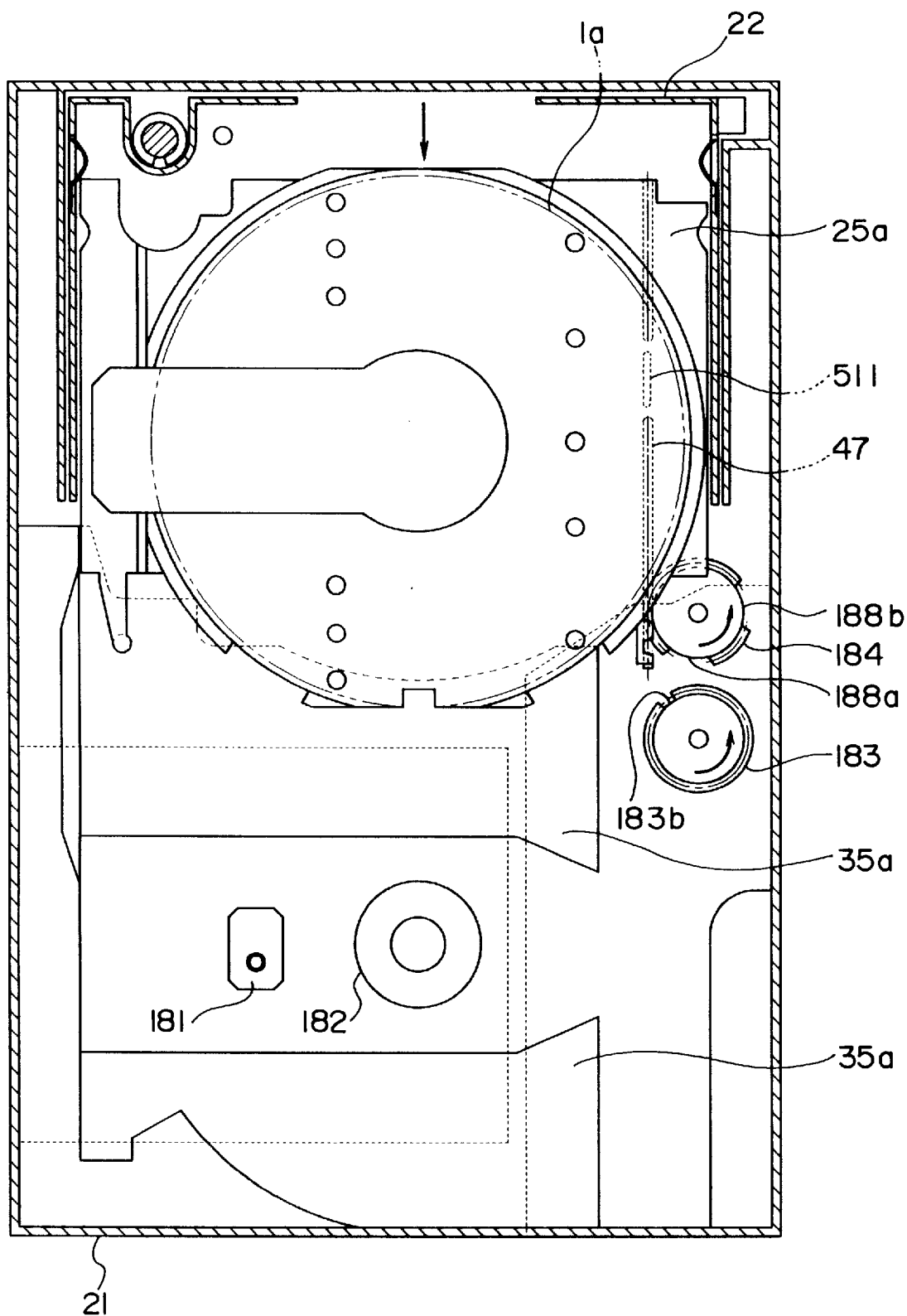
FIG. 27 is a top cut-away view showing a transfer operation of the first disc holder 25a (1/2) according to the present invention.
Figure 28:
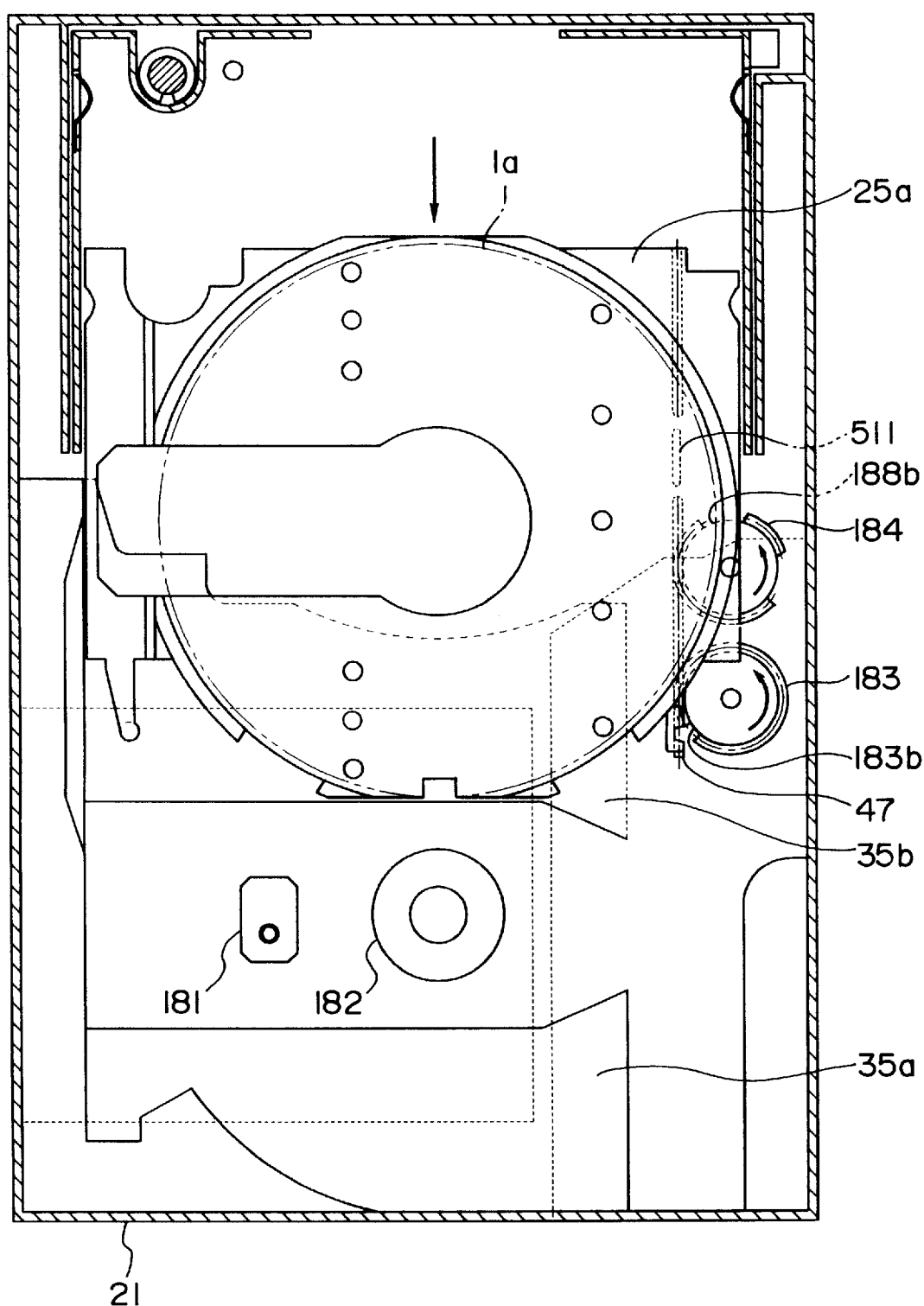
FIG. 28 is a cut-away view showing a transfer operation of the first disc holder 25a (2/2) according to the present invention.

As shown in FIG. 27, when the rear transfer gear 184 is rotated, the rear transfer gear 184 gears with the rack 47 of the first disc holder 25a, so that the first disc holder 25a slides forward. As shown in FIG. 23, at that point, the inner gear 205 of the dual gear 201 does not gear with the raising and lowering drive rack 211 of the slider 209, which thus does not slide. When the rear transfer gear 184 is further rotated as shown in FIG. 28, the front transfer gear 183 gears with the rack 47 before the second blank portion 188b of the rear transfer gear 184 is positioned near the rack 47. When the second blank portion 188b of the rear transfer gear 184 is positioned near the rack 47, the first disc holder 25a is moved further forward by the front transfer gear 183.

Figure 29:
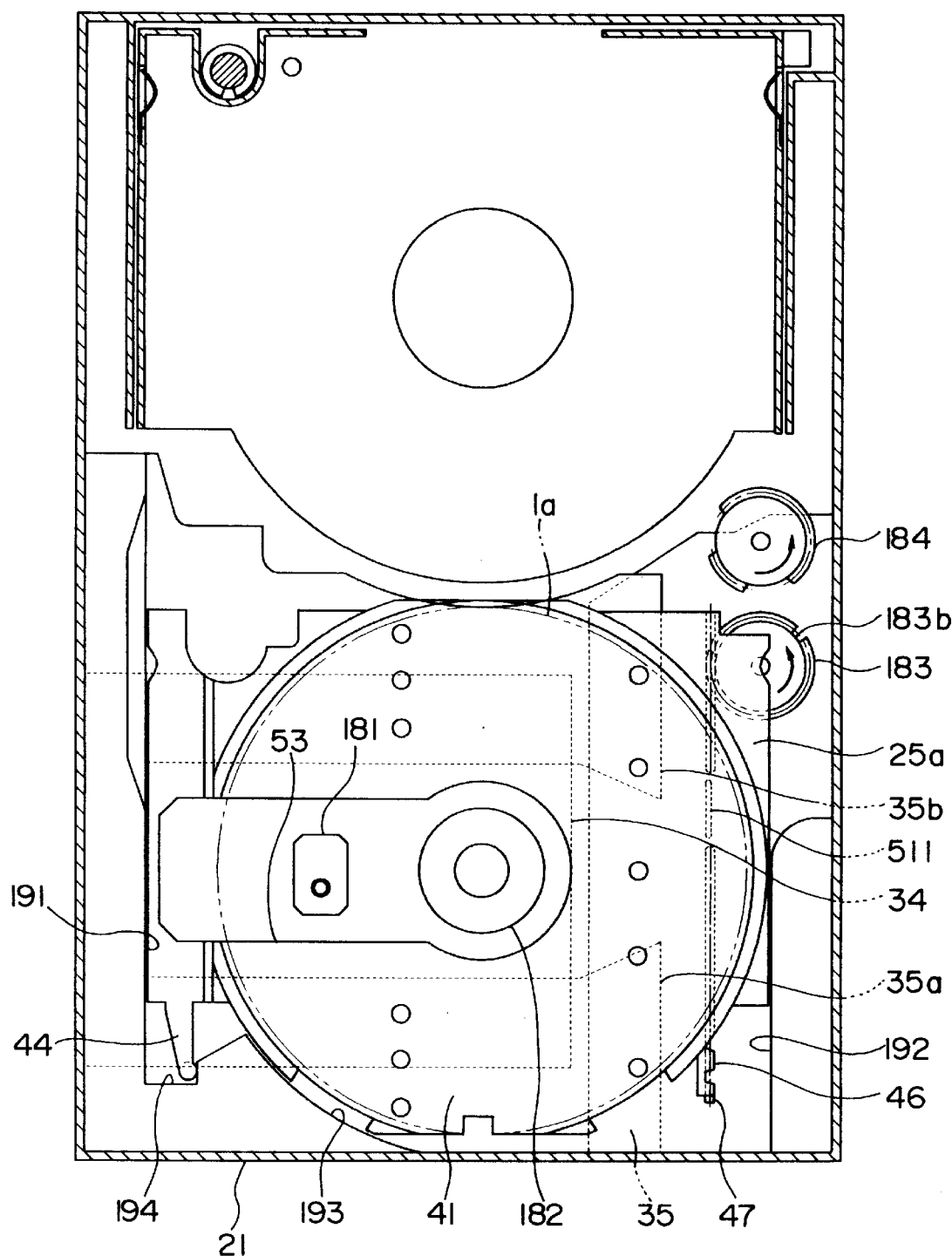
FIG. 29 is a partial view showing the first disc holder 25a when the transfer operation is completed according to the present invention.
Figure 30:
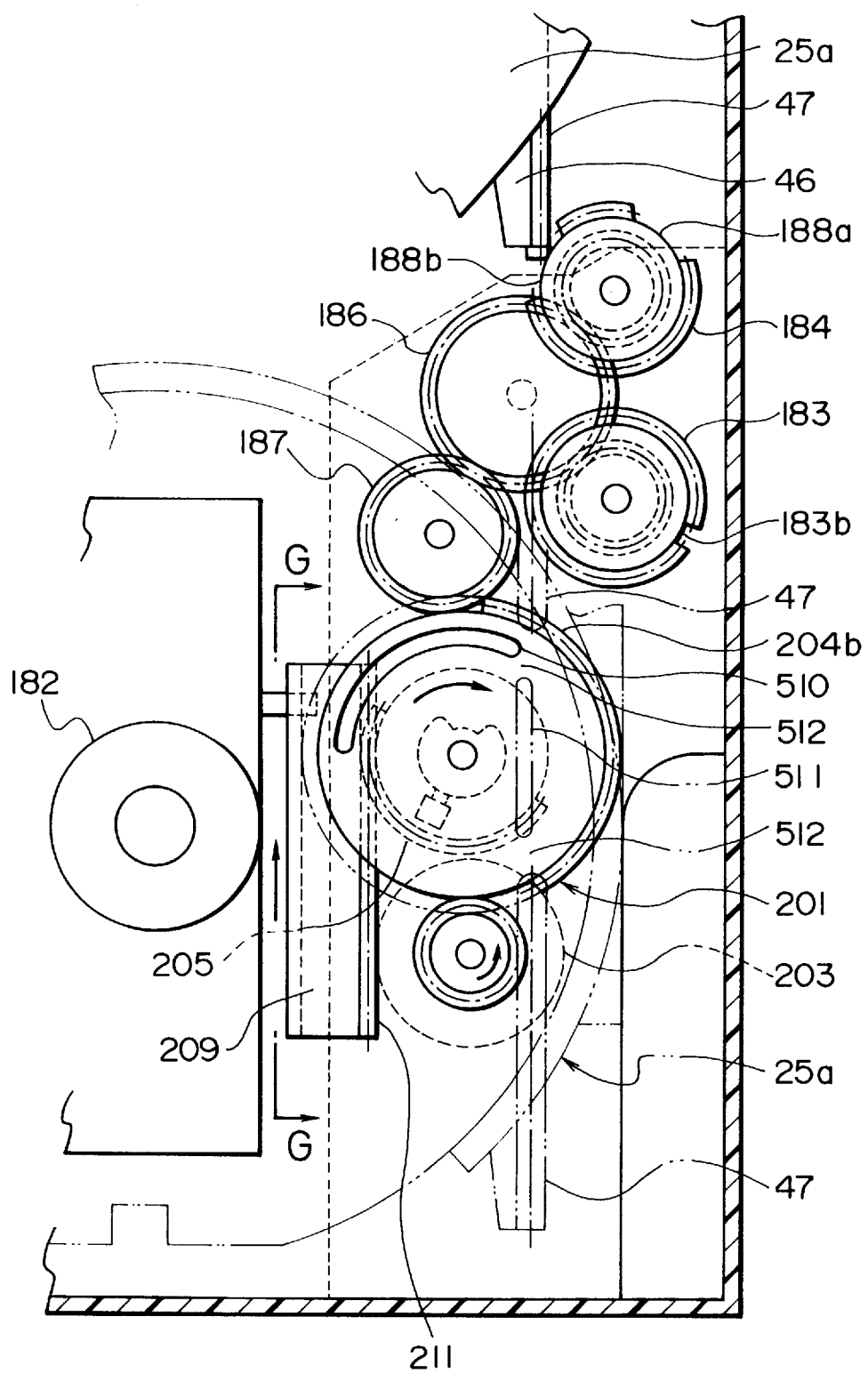
FIG. 30 is a partial view showing the gears when the transfer operation is completed according to the present invention.

As shown in FIG. 29, at that point, the right and left sides of the first disc holder 25a are regulated by the right and left edge guides 191 and 192, so that the first disc holder 25a slides forward in a straight direction. When the first disc 1a reaches the playback position, the first projection 44 of the first disc holder 25a comes into contact with the holder engaging indentation 194 and the circumference of the disc area 41 comes into contact with the curved edge portion 193, so that the first disc holder 25a is held at the playback position. At this point, the transfer of the first disc holder 25a is completed. The playback opening 53 is positioned above the turntable 182 and the optical pickup 181 of the player 34.

When the first disc holder 25a is positioned at the playback position, the lower gear 204b of the dual gear 201 is separated from the transmission gear 187 so as not to transmit the rotation of the loading motor 203 to the transmission gear 187. Accordingly, the transmission gear 187, the synchronous gear 186, and the front and rear transfer gears 183 and 184 stop their rotation, and the first disc holder 25a stops at the playback position.

After the first disc holder 25a is transferred, the loading motor 203 continues to be rotated and the dual gear 201 is further rotated. The arc-shaped rib 510 passes through the rear space 512 of the engaging portion 511 in the middle of the rack 47 of the first disc holder 25*a*, and is inserted into the front or rear space 512 until the dual gear 201 is rotated for a predetermined angle and the player 34 (FIG. 25) moves up. The engaging portion 511 is engaged with the arc-shaped rib 510 (FIG. 23) and the first disc holder 25*a* is thereby prevented from moving off the playback position.

Figure 32:
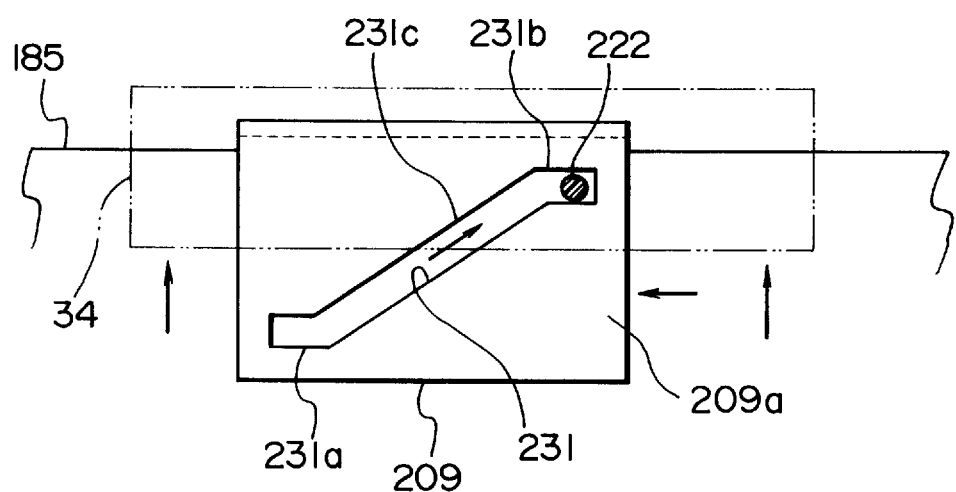
FIG. 32 is a cross-sectional view from line N—N of FIG. 31 according to the present invention.

After the first disc holder 25*a* is transferred, the inner gear 205 of the dual gear 201 gears with the raising and lowering drive rack 211 of the slider 209 and the slider 209 is moved backward. As shown in FIG. 31, before the slider 209 is moved to a rear motion-limited position, the lower gear 204*b* of the dual gear 201 gears with the transmission gear 187. As shown in FIG. 32, when the slider 209 is moved backward, the projection 222 of the player 34 is moved up along the inclined portion 321*c* of the raising and lowering guide groove 231 of the slider 209, and the player 34 is rotated with its center at the pivot 221 (FIG. 33).

Figure 33:
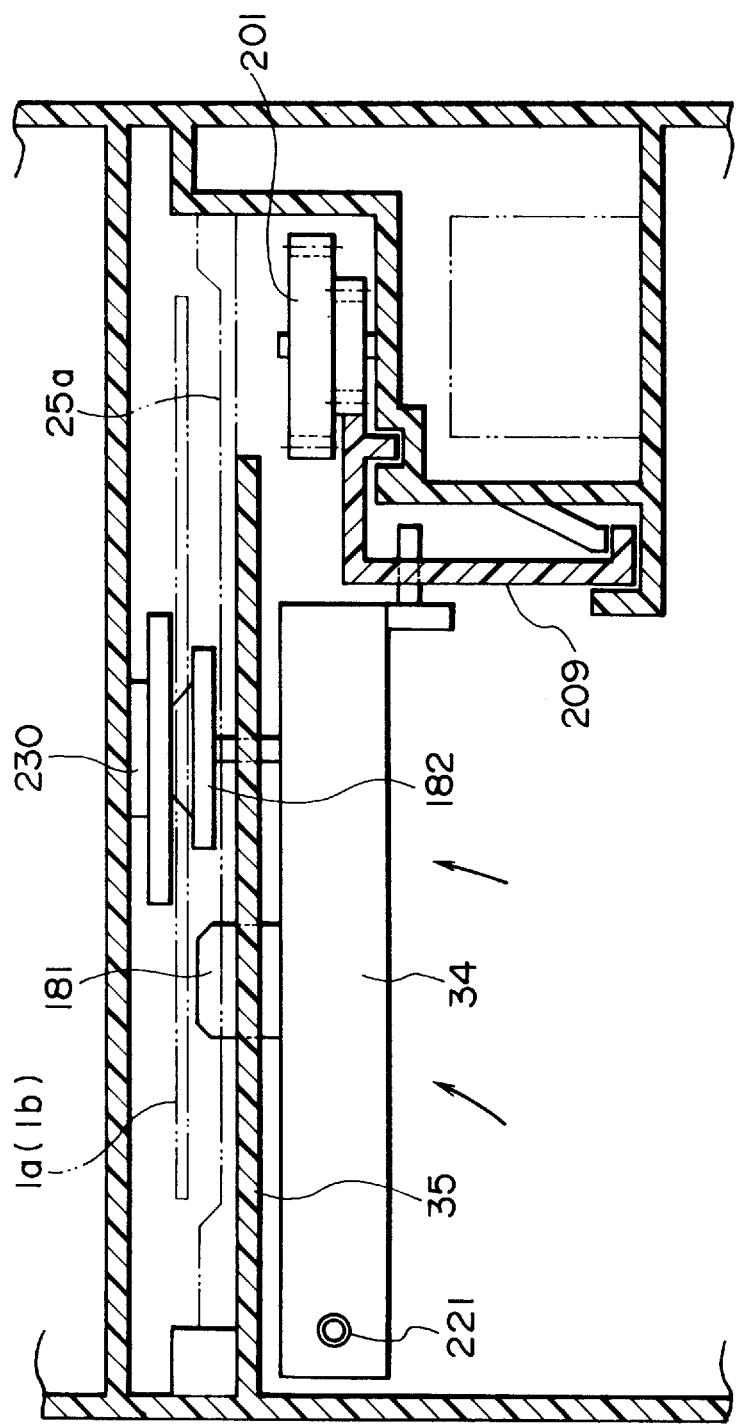
FIG. 33 is a cross-sectional view showing the player 34 when a raising operation for the player 34 is completed according to the present invention.

As shown in FIG. 33, the turntable 182 and the optical pickup 181 are moved up and protrude above the playback area 35. The first disc 1*a* on the first disc holder 25*a* is lifted up by the turntable 182, and clamped by the damper 230 attached above. The optical pickup 181 approaches the underside of the first disc 1*a*. At this point, the first disc 1*a* is rotated by the turntable 182, and the signal recorded on the first disc 1*a* is read by the optical pickup 181.

As shown in FIG. 31, when the player 34 moves up, the second blank portion 188*b* of the rear transfer gear 184 is positioned near the second projection 46 of the first disc holder 25*a* in the stocker 22. Accordingly, the stocker 22 can move up and down in order to allow the user to take out or to exchange a specified first disc 1*a*.

When the first disc 1*a* is stored into the stocker 22 after the playback, the loading motor 203 in the situation shown in FIG. 31 is rotated in the direction opposite to the above description, in other words, clockwise, so that the player 34 is rotated in order to move down the turntable 182 and the optical pickup 181 and to place the first disc 1*a* on the first disc holder 25*a*. The first disc holder 25*a* is moved backward into the stocker 22 as shown in FIG. 21.

As described above, with this auto disc changer 20, the first disc 1*a* can be easily loaded into and removed from the player 34 by the transfer means using the pair of the transfer gears 183 and 184. The first disc holder 25*a* in the stocker 22 can be moved up and down because the cogs are removed at the blank portions 188*a* and 188*b* through which the second projection 46 of the first disc holder 25*a* passes.

Second Disc Holder for 8 cm CD

The operation for the first disc 1*a*, which is a CD with a diameter of 12 cm, is described above, and the operation for the second disc 1*b*, which is a CD with a diameter of 8 cm, is described below.

Figure 34:
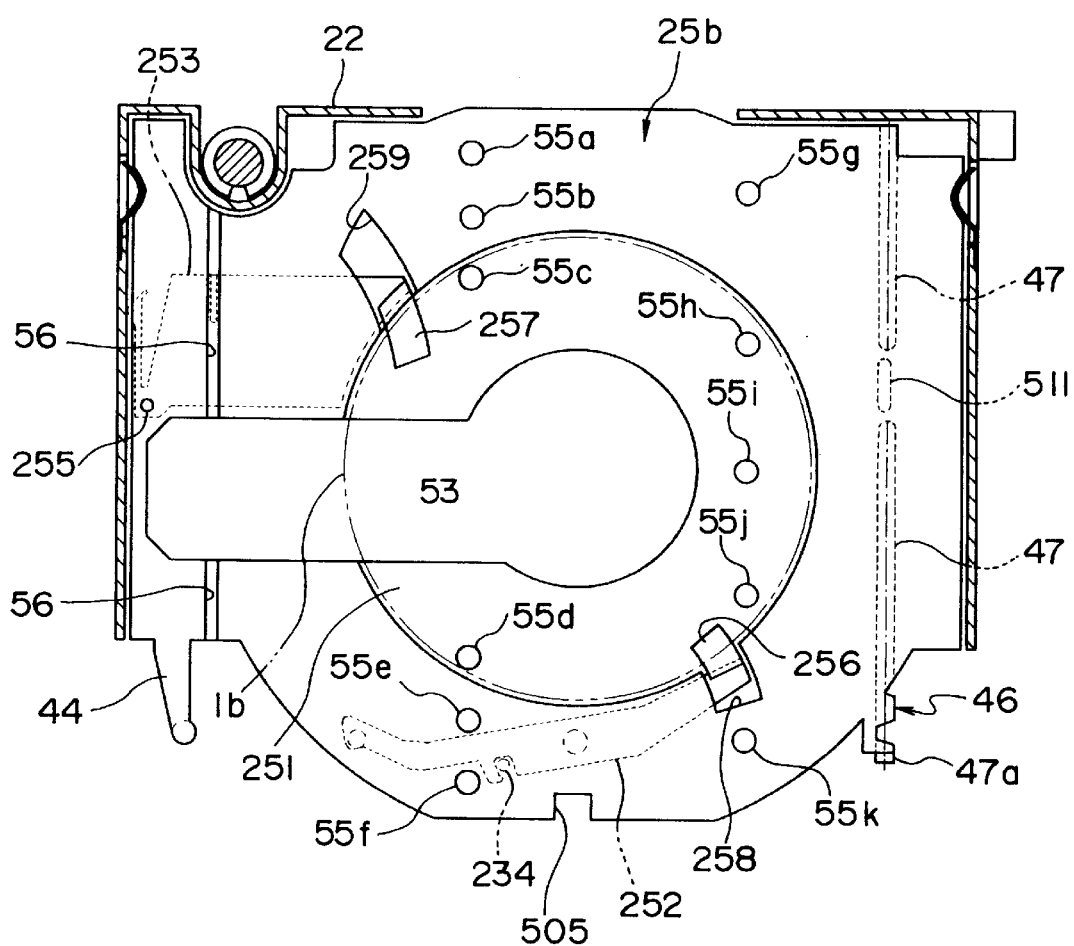
FIG. 34 is a top cut-away view showing a construction of a second disc holder 25b according to the present invention.

This auto disc changer 20 can store and play back a second disc 1*b* which is a CD with a diameter of 8 cm. As shown in FIG. 34, the second disc holder 25*b* which is used only for the second disc 1*b* can be stored in the stocker 22. The outline of the second disc holder 25*b* is formed in a fashion similar to that of the first disc holder 25*a* used only for the first disc 1*a* with a diameter of 12 cm. Accordingly, the storage into the stocker 22, the movement in the opening and closing operation of the tray 33, and the transfer to the player 34 is performed in a fashion similar to the operation for the first disc holder 25*a*, and a detailed description is omitted here.

A depressed disc area 251 in accordance with the second disc 1*b*, with a diameter of 8 cm, is formed into the middle of the second disc holder 25*b*, and the second disc 1*b* is placed in the disc area 251. A playback opening 53 through which the optical pickup 181 and the turntable 182 are inserted, is formed into the second disc holder 25*b*. The six detection holes 55*a* to 55*f* form a left line similarly to those for the first disc holder 25*a*. The five detection holes 55*g* to 55*k* form a right line similar to those of the first disc holder 25*a*. A straight lever groove 56 from the front to the rear is formed onto the second disc holder 25*b* similarly to that for the first disc holder 25*a*.

A long, rod-shaped first holding lever 252 and approximately square-shaped second holding lever 253, which is a holding lever for holding the second disc 1*b*, are attached rotatably to the underside of the disc area 251 with pivots 254 and 255. The first holding lever 252 is positioned in front of the disc area 251, in other words, at the back of the second disc 1*b* when the second disc holder 25*b* is transferred to the stocker 22.

The second holding lever 253 is positioned at the back of the disc area 251, in other words, in front of the second disc 1*b* when the second disc holder 25*b* is transferred to the stocker 22. Openings 258 and 259 are formed into the right front and the left rear of the circumference of the disc area 251 corresponding to the front and rear holding portions 256 and 257 of the holding levers 252 and 253.

Figure 35:
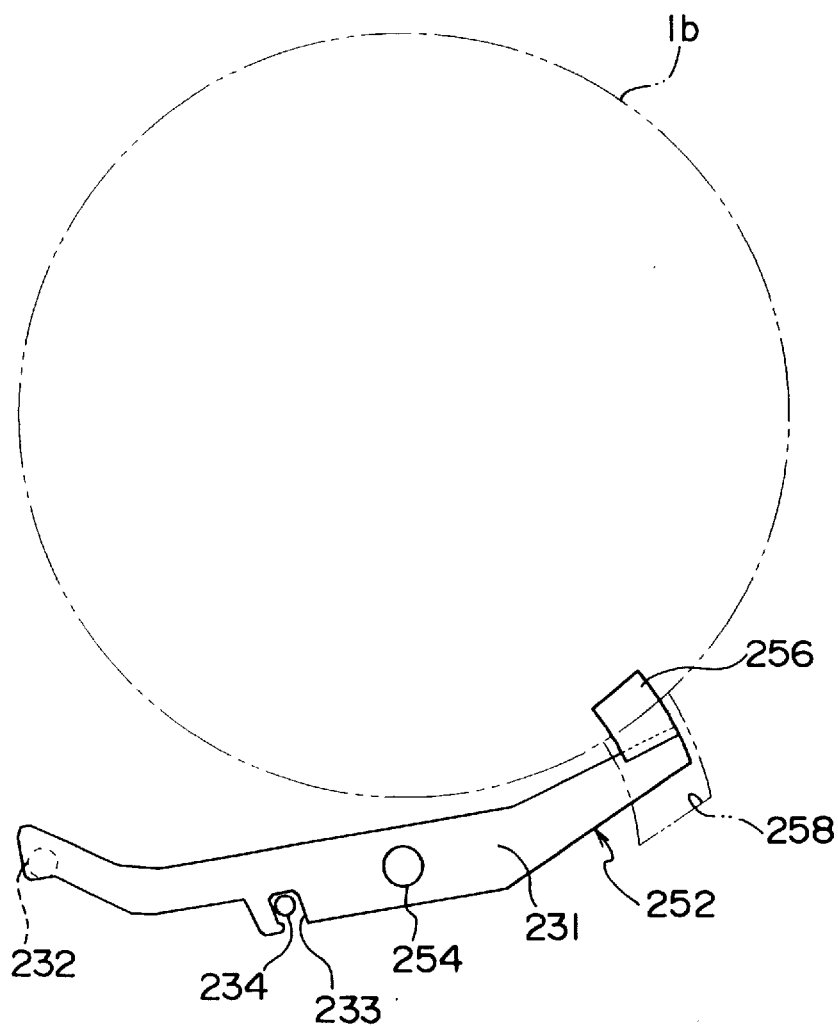
FIG. 35 is a partial view showing a construction of a first holding lever 252 according to the present invention.

As shown in FIG. 35, the first holding lever 252 is comprised of a long, rod-shaped portion 231 which is a long and slender plate, and a front holding portion 256 which protrudes from the right end of the long, rod-shaped portion 231 to the second disc 1*b*. A pivot 254 of the first holding lever 252 is attached to the middle of the long, rod-shaped portion 231. The front holding portion 256 is inserted through the opening 258 from the underside above the upper side of the second disc holder 25*b*. When the first holding lever 252 is rotated counterclockwise, the front holding portion 256 is positioned above the front edge of the second disc 1*b* in order to prevent the second disc 1*b* from accidentally moving out of the disc area 251.

A ball-shaped contact projection 232 protrudes from the underside of the first holding lever 252 at the opposite side of the front holding portion 256. A groove-shaped engaging portion 233 is built into the first holding lever 252 in the left side of the pivot 254, and an engaging projection 234 which is formed onto the underside of the second disc holder 25*b* is inserted into and is engaged with the engaging portion 233. In this situation, the front holding portion 256 hangs over the front edge of the disc area 251.

Figure 36:
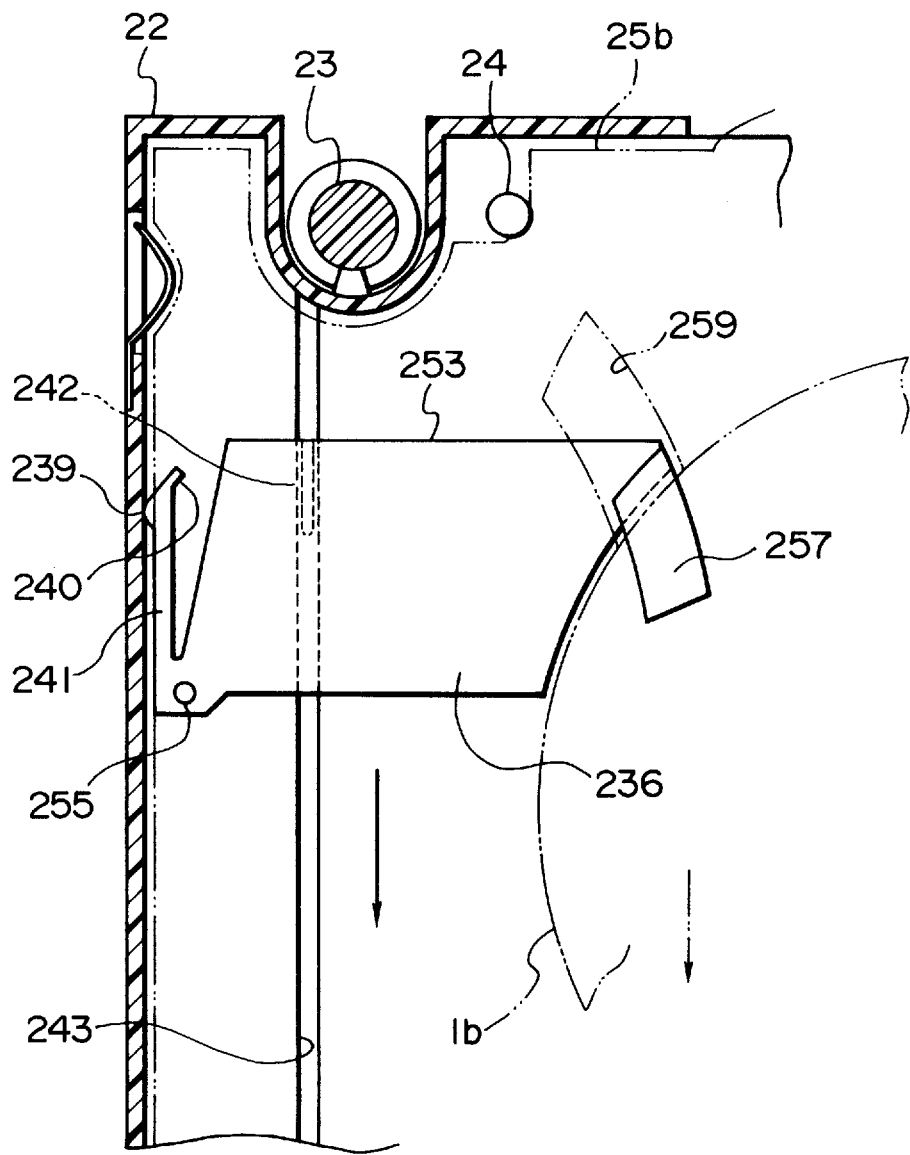
FIG. 36 is a partial view showing a construction of a second holding lever 253 according to the present invention.

As shown in FIG. 36, the second holding lever 253 is comprised of a rectangular portion 236 and a rear holding portion 257 which protrude from the right end of the rectangular portion 236 to the second disc 1*b*. The rear holding portion 257 is inserted into the opening 259 from the underside above the upper side of the second disc holder 25*b*. A long, slender, and flexible contact leg 241 is formed on the left edge of the rectangular portion 236. A triangular top 239 which comes into contact with the inside of the stocker 22 is formed at the top of the contact leg 241. A tip 240 of the triangle top 239 is bent toward the rectangular portion 236. A guide plate 242 is built onto the underside of the rectangular portion 236. The guide plate 242 is inserted into the stocker bottom groove 243 which is formed into the bottom or into the lever guide groove 56 (FIG. 34) of the disc holder 25.

When the top 239 of the contact leg 241 comes into contact with the inside of the stocker 22 and the guide plate 242 is inserted into the stocker bottom groove 243 or into the lever guide groove 56 of the disc holder 25, the second holding lever 253 is held at a predetermined position. At this situation, the rear holding portion 257 hangs over the rear edge of the disc area 251. The second disc 1b which is placed on the disc area 251 is securely held and is prevented from accidentally falling.

Figure 37:
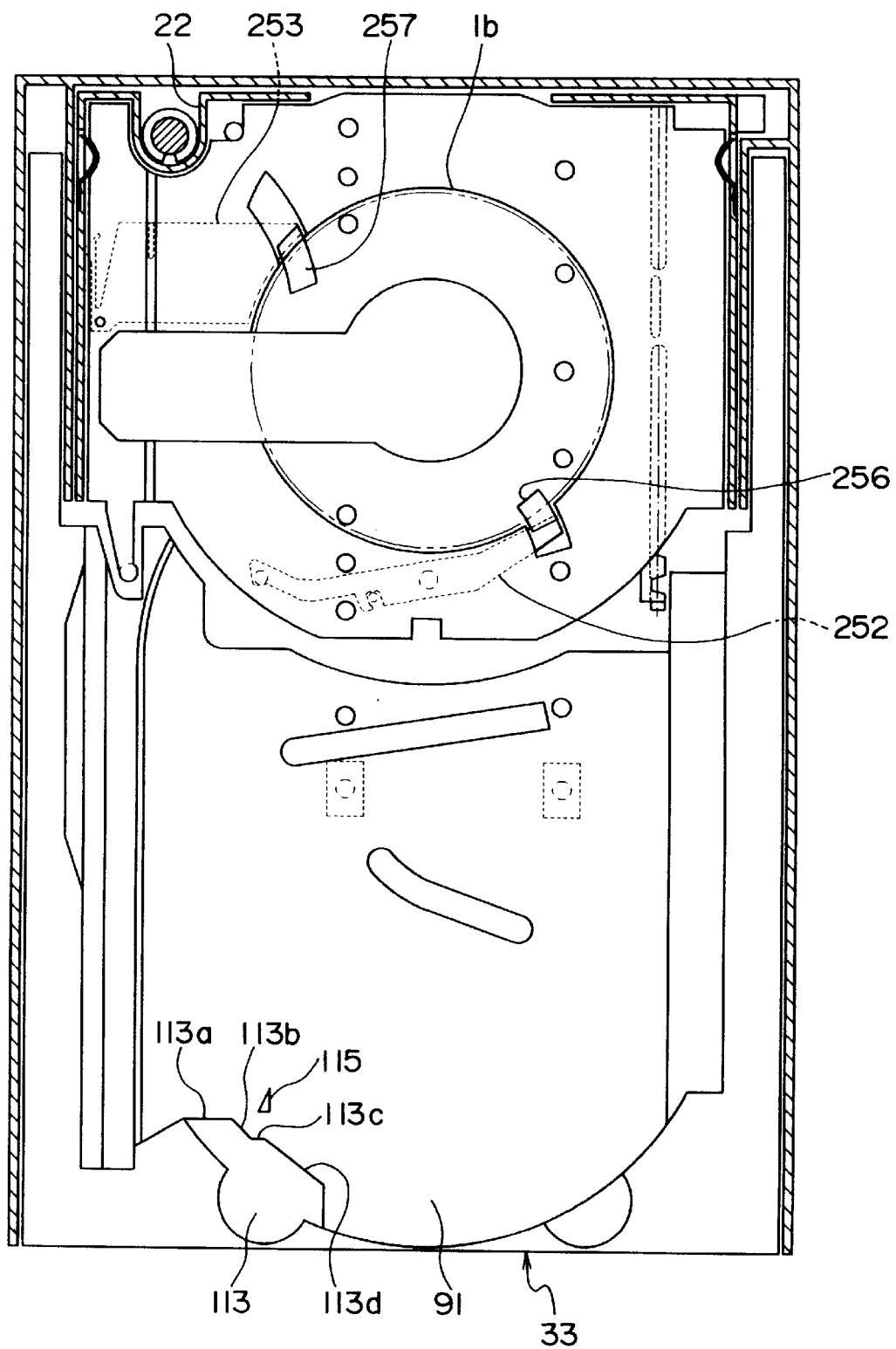
FIG. 37 is a top cut-away view showing the holding levers 252 and 253 when the second disc holder 25b is stored in the stocker 22 according to the present invention.
Figure 38:
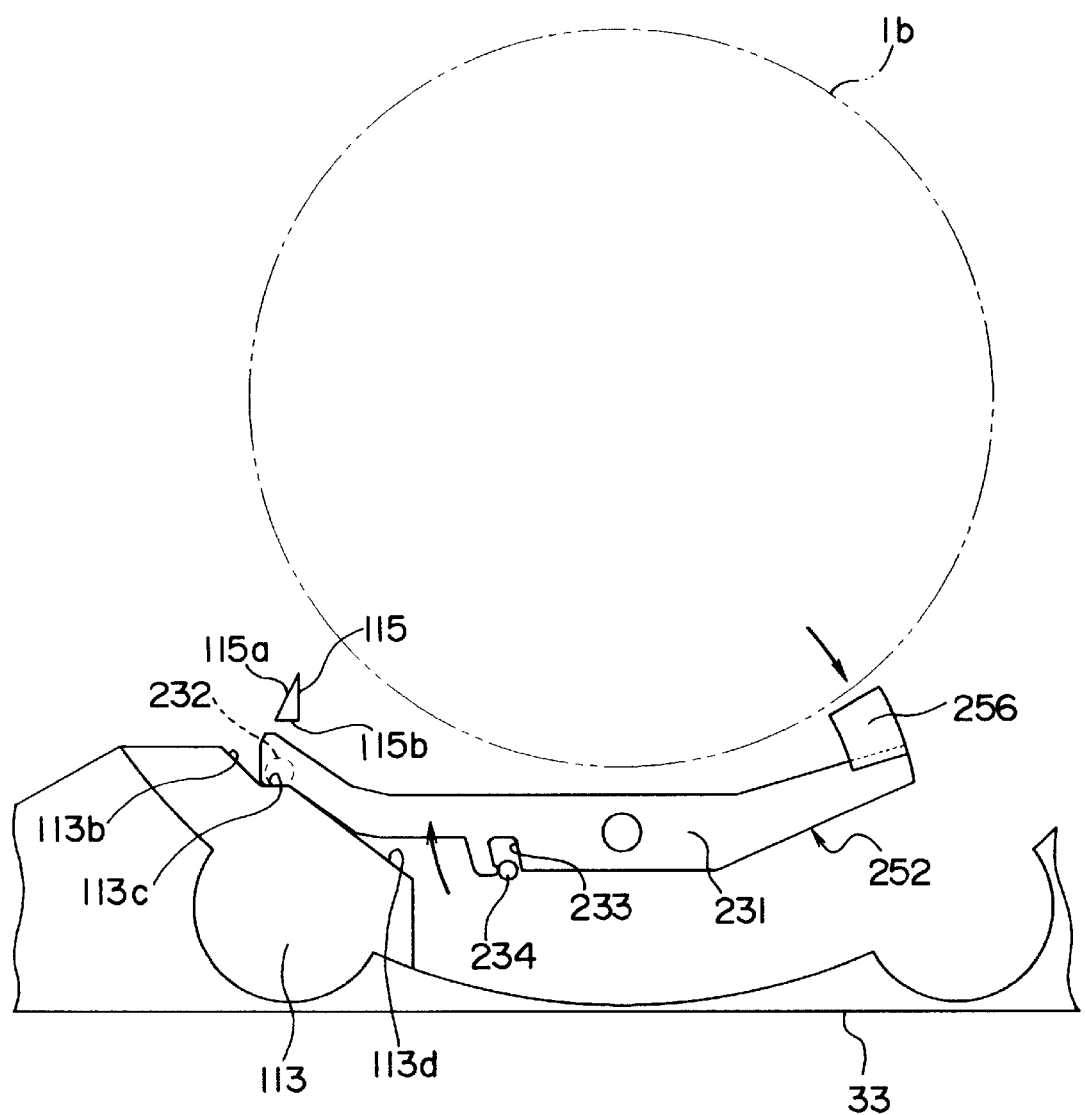
FIG. 38 is a partial view showing the position of the first holding lever 252 when the tray 33 is opened according to the present invention.

As shown in FIG. 37, a triangular projection 115 and a contact portion 113 are built onto the left front of the holder area 91 of the tray 33. The contact portion 113 is comprised of a first contact face 113a and a third contact face 113c which are flat parallel to the direction from the right to the left, an inclined second contact face 113b, and an inclined fourth face 113d. As shown in FIG. 38, the triangular projection 115 is comprised of an inclined portion 115a of the left side and the flat portion 115b of the front side.

The operation of the holding levers 252 and 253 in the opening and closing operation of the tray 33 is described below. As shown in FIG. 37, when the second disc holder 25b is already stored in the stocker 22, the second disc 1b is held on the disc area 251 by the first and second holding lever 252 and 253 in order to prevent the second disc 1b from accidentally falling or being moved.

When the tray 33 begins opening and the second disc holder 25b begins sliding forward, the contact projection 232 of the first holding lever 252 is moved along the inclined portion 115a of the triangular projection 115. The contact projection 232 comes into contact with the third contact face 113c of the contact portion 113, and the rear of the first holding lever 252 comes into contact with the fourth contact face 113d of the contact portion 113. When the tray 33 is further moved forward, the first holding lever 252 is rotated clockwise, the engaging projection 234 of the second disc holder 25b is released from the engaging portion 233, and the front holding portion 256 is retracted from the front edge of the second disc 1b.

Figure 39:
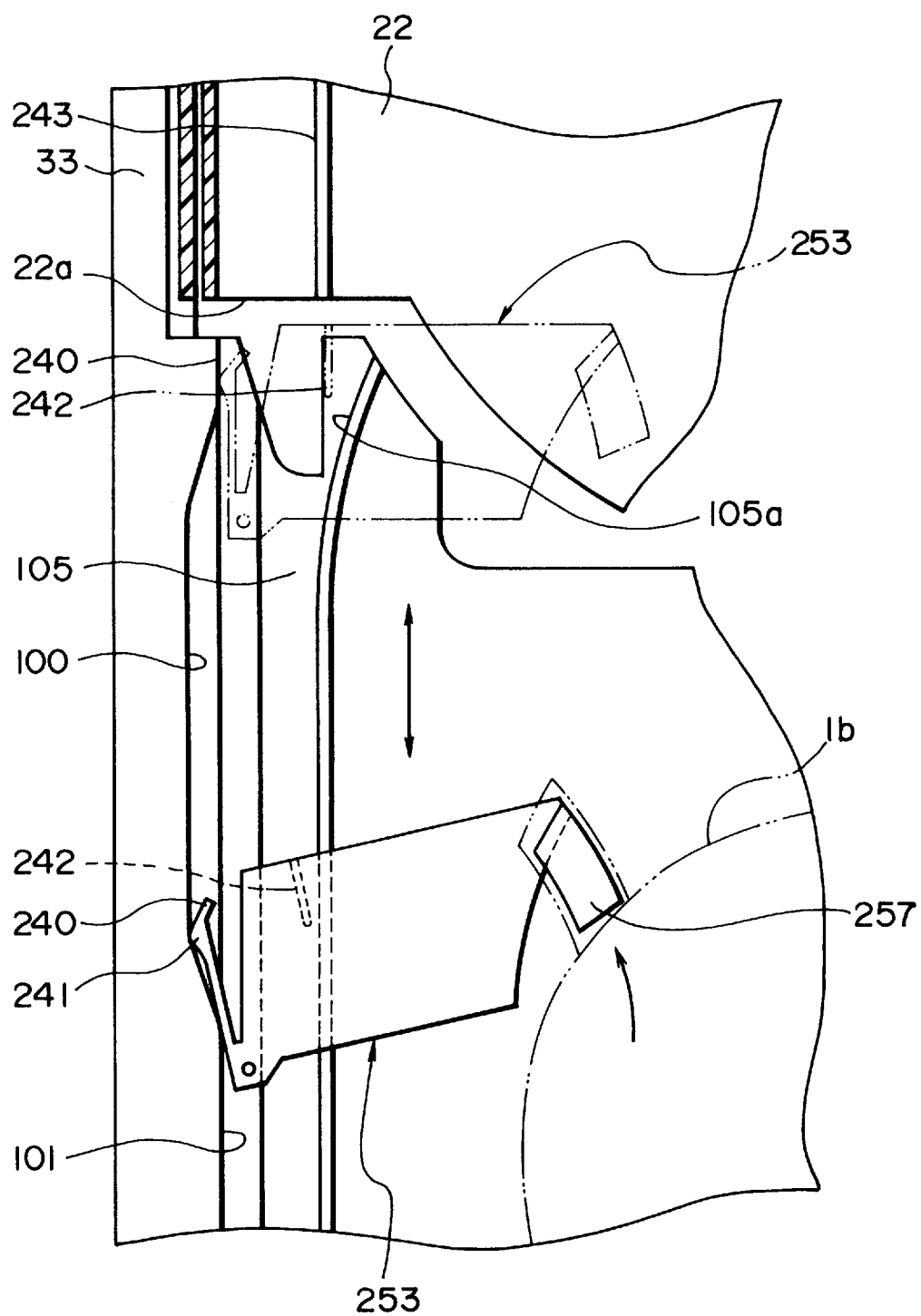
FIG. 39 is a partial view showing rotation of the second holding lever 253 according to the present invention.

As shown in FIG. 36, when the second disc holder 25b slides forward, the top 239 of the contact leg 241 comes into contact with the inside of the stocker 22, and the guide plate 242 slides forward along the stocker bottom 243 or the lever guide groove 56 (FIG. 34). As shown in FIG. 39, when the second disc holder 25b is drawn out from the stocker 22 and slides onto the tray 33, the guide plate 242 of the second holding lever 253 is guided through the curved portion 105a of the tray 33 into the engaging portion guide groove 105.

When the guide plate 242 is moved along the curved portion 105a to the left, the second holding lever 253 is rotated counterclockwise, and the rear holding portion 257 is retracted from the rear edge of the second disc 1b. When the second disc holder 25b is further moved forward, the contact leg 241 is inserted into the holding lever guide 100 of the left edge guide 101. The guide plate 242 is forced to the left by the right side of the engaging portion guide groove 105. Accordingly, the second holding lever 253 which is rotated counterclockwise is held so that the rear holding portion 257 is retracted from the upper side of the second disc 1b.

Figure 40:
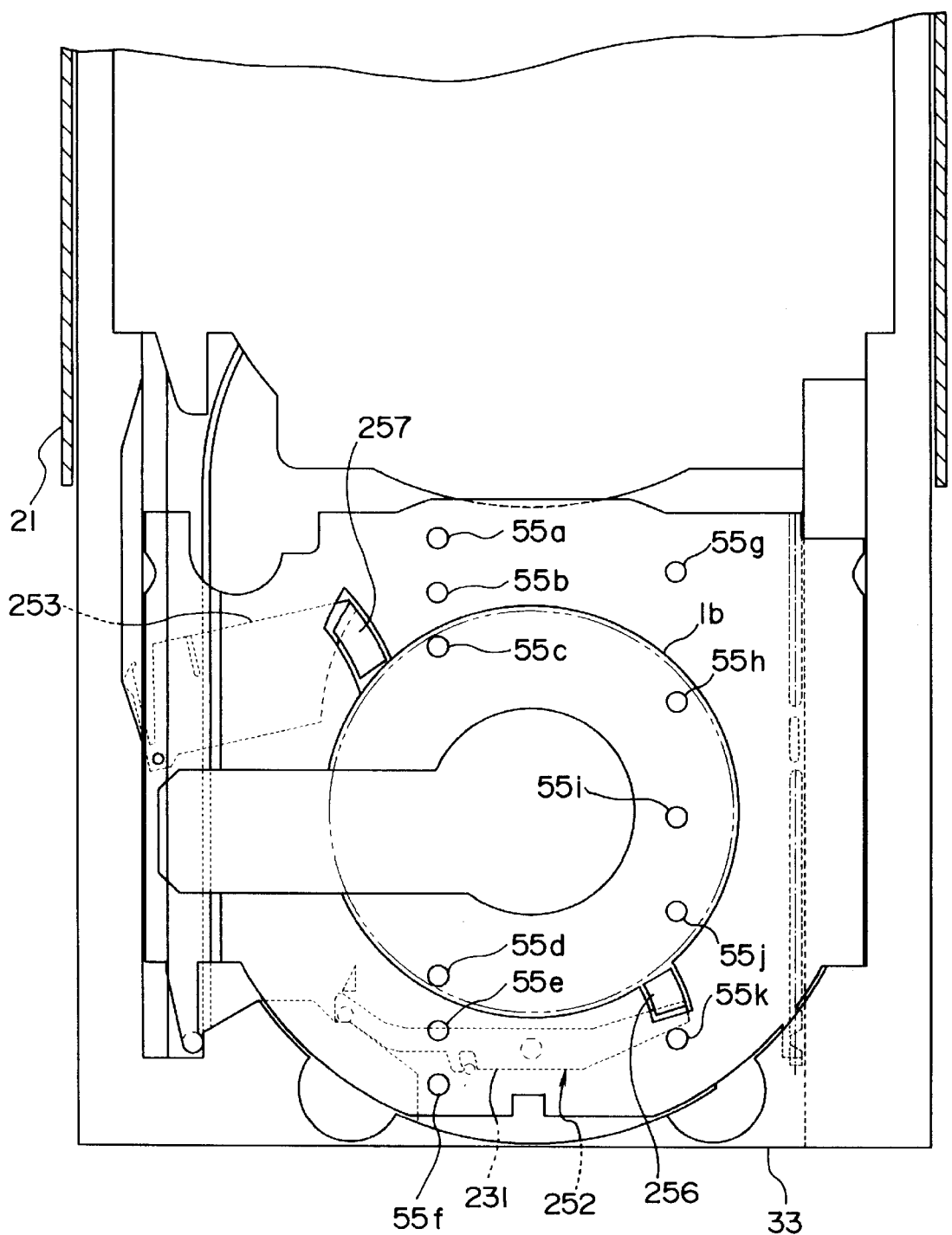
FIG. 40 is a top cut-away view showing the holding levers 252 and 253 when the tray 33 is opened according to the present invention.

As shown in FIG. 40, when the tray 33 is completely opened, the holding levers 252 and 253 are rotated so that the holding portions 256 and 257 are retracted from the front and rear edges of the second disc 1b, and the user can easily take out the second disc 1b. In this situation, the second detection hole 55g from the front of the left detection holes 55a to 55f is obstructed by the long, rod-shaped portion 231 of the first holding lever 252.

For example, when two second discs 1b are placed on the tray 33, the tray 33 begins closing, the first holding lever 252 is rotated counterclockwise, and the front holding portion 256 presses the edge of the upper second disc 1b toward the second holding lever 253. At this point, the second holding lever 253 is not rotated. The upper second disc 1b pressed by the front holding portion 256 comes into contact with the rear holding portion 257 of the second holding lever 253. Accordingly, the first holding lever 252 stops rotating, and the tray 33, for which the detection hole 55e is obstructed by the first holding lever 252, is closed. The two second discs 1b can be detected using such operation.

Figure 41:
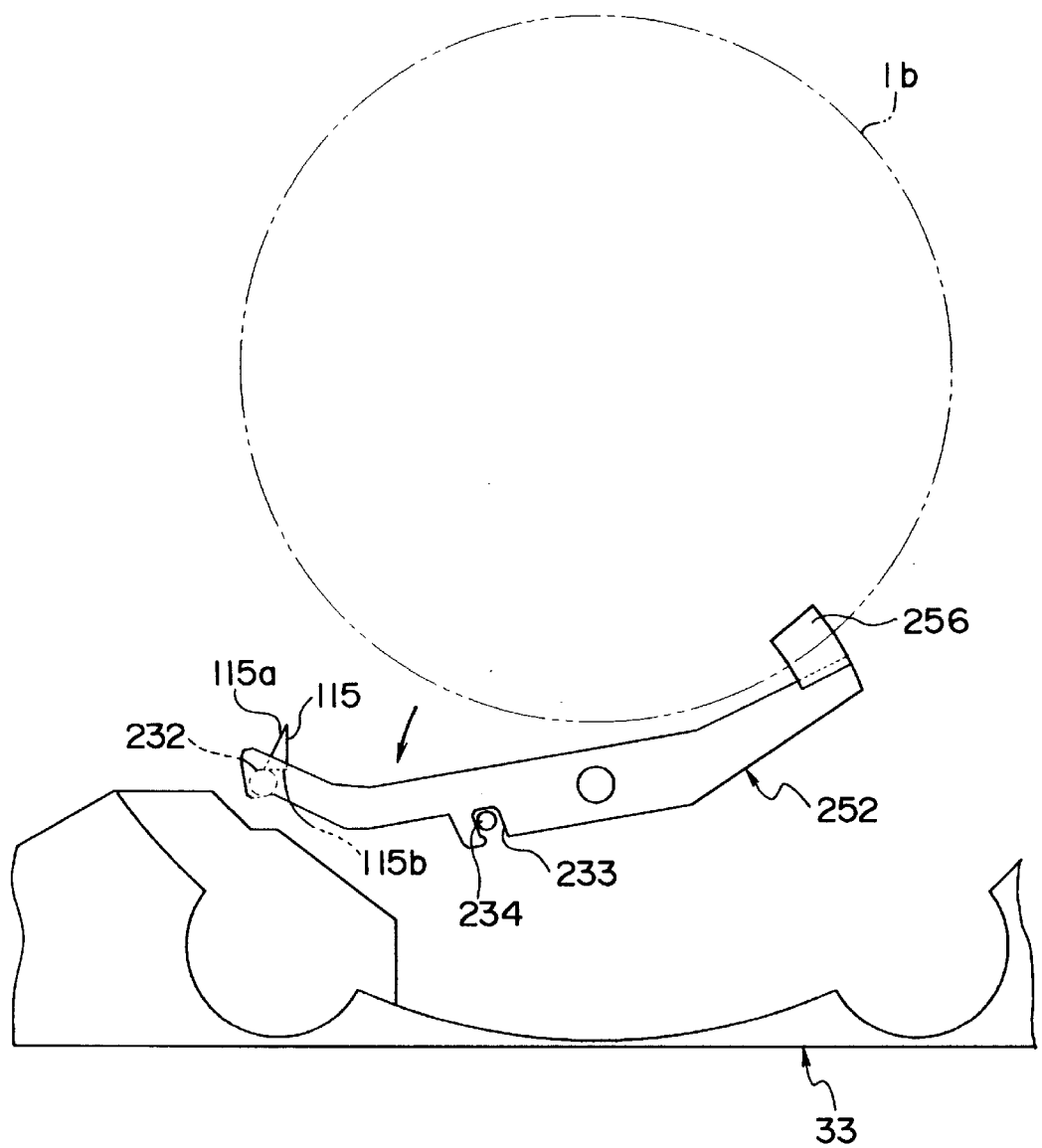
FIG. 41 is a partial view showing rotation of the first holding lever 252 when the tray 33 is closed according to the present invention.

As shown in FIG. 41, when the tray 33 is closed, the contact projection 232 of the first holding lever 252 comes into contact with the flat portion 115 of the front of the triangular projection 115 of the tray 33, and the first holding lever 252 is rotated counterclockwise. The engaging portion 233 of the first holding lever 252 is engaged with the engaging projection 234 of the second disc holder 25b. The contact projection 232 is guided by the flat portion 115b and is moved along the straight portion 115a of the triangular projection 115.

As shown in FIG. 39, when the tray 33 and the second disc holder 25b are moved backward for a predetermined distance, the contact leg 241 of the second holding lever 253 is moved along the curved portion of the rear of the holding lever guide 100 to the right, and the second holding lever 253 is rotated clockwise. Just before the second disc holder 25b is stored into the stocker 22, the guide plate 242 shown with a double-short-single-long dashed line is positioned in the same direction as the stocker bottom groove 243 or the lever guide groove 56 (FIG. 34). The contact leg 241 is moved along the inside of the stocker 22, and the guide plate 242 is inserted into the stocker bottom groove 243.

As described above, when the tray 33 is closed, the first holding lever 252 is first rotated so that the front holding portion 256 hangs over the front edge of the second disc 1b, and thereafter, the second holding lever 253 is rotated so that the rear holding portion 257 hangs over the rear edge of the second disc 1b for the following reason.

When the tray 33 begins closing, the second disc 1b on the second disc holder 25b is moved backward. If the rear holding portion 257 of the second holding lever 253 for holding the rear edge of the second disc 1b is first moved, or if the rear holding portion 257 and the front holding portion 256 of the first holding lever 252 are synchronously moved when the second disc 1b is not held and lifted, the rear holding portion 257 which is moved in the opposite direction to the moving second disc 1b, may violently collide with the outer rim of the second disc 1b possibly damaging the second disc 1b.

In order to avoid this, the first holding lever 252 is first rotated so that the front holding portion 256 hangs over the front edge of the second disc 1b, and thereafter, the second holding lever 253 is rotated so that the rear holding portion 257 hangs over the rear edge of the second disc 1b. If the second disc 1b collides with the front holding portion 257, the shock may be lessened, and the second disc 1b is prevented from being damaged.

As shown in FIG. 37, when the second disc holder 25b is already stored in the stocker 22, the second disc 1b is held in the predetermined position by the holding portions 256 and 257 of the holding lever 252 and 253, and is prevented from accidentally falling off or moving when there is a shock or a vibration.

As shown in FIG. 21, because the triangular projection 115 and the contact portion 113 are built onto the front holder 35a and the holding lever guide 100 is formed into the left guide edge 191, the holding levers 252 and 253 are rotated in the loading operation to the playback position in a fashion similar to that for the opening and closing operation of the tray 33. When the second disc 1b is loaded into the playback position, the holding levers 252 and 253 are retracted from the second disc 1b, and as shown in FIG. 33, the second disc 1b is clamped by the turntable 182 and the damper 230.

As described above, because the second disc 1b, with a diameter of the 8 cm, is held by the front and rear holding levers 252 and 253 when the second disc 1b is stored in or is moving into or from the stocker 22, it is possible to prevent the second disc 1b from accidentally falling off or moving when there is a shock or a vibration. It is feasible to attach a holding lever which is constructed in a fashion similar to the holding levers 252 and 253, to the first disc holder 25a (FIG. 2) for the first disc 1a which has a diameter of 12 cm.

Disc Detection System

Further, with this auto disc changer 20, the presence or absence, and possible slipping, or double-loading of the first disc 1a or the second disc 1b can be detected using the first or second disc holder 25a or 25b according to the following operation using a disc detection system.

As described above with reference to FIG. 2, the eleven detection holes 55a to 55k are formed into the first disc holder 25a only for the first disc 1a which has a diameter of 12 cm. The six detection holes 55a to 55f are arranged in a row left of the center axis. The five detection holes 55g to 55k are arranged in a row right of the center axis. As described above with reference to FIG. 34, the eleven detection holes 55a to 55k are formed into the second disc holder 25b only for the second disc 1b which has a diameter of 8 cm at positions similar to those of the first disc holder 25a.

As described above with reference to FIG. 5, the sensor 86L is positioned along the course through which the detection holes 55a to 55f of the disc holder 25a and the detection hole 55m of the tray 33 are moved, and the sensor 86R is positioned along the course over which the detection holes 55g to 55k and the detection hole 55n of the tray 33 are moved.

Figure 42:
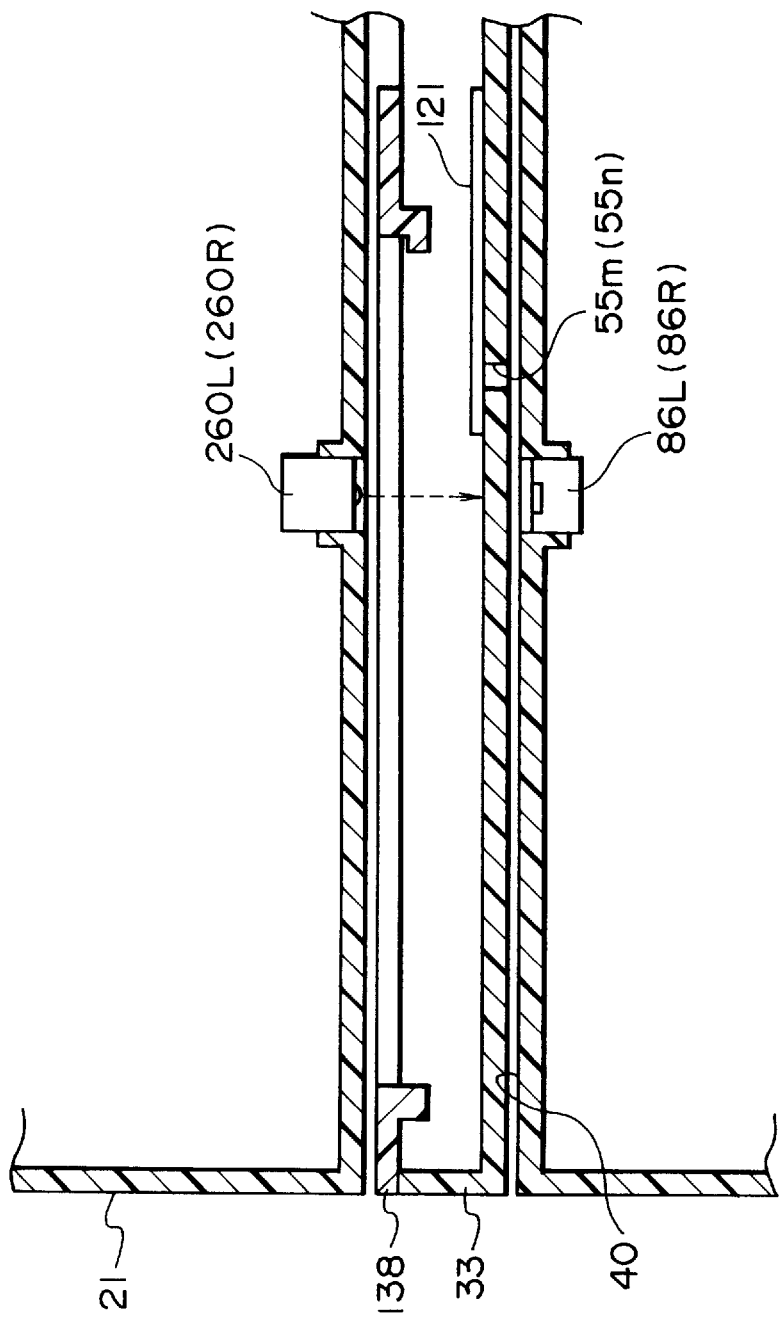
FIG. 42 is a cross-sectional view showing positions of a light emitting device 260L and a sensor 86L according to the present invention.
Figure 43:
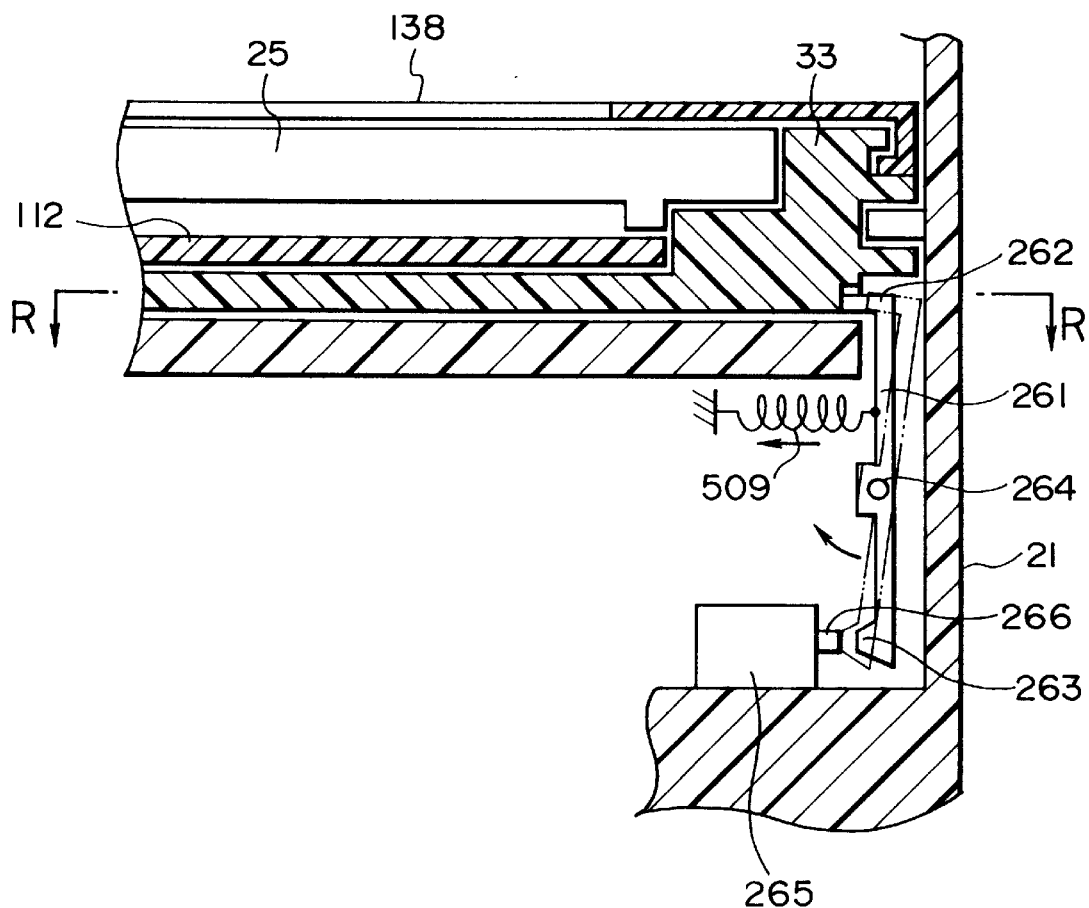
FIG. 43 is a cross-sectional view showing a construction of a timing lever 261 and other parts according to the present invention.

As shown in FIG. 42, light-emitting devices 260L and 260R are positioned above the disc area 40 of the cabinet 21. As shown in FIG. 43, a plate-shaped timing lever 261 is positioned rotatably with the pivot 264 at the right side of the tray 33, and is biased counterclockwise by a helical extension spring 509. A tray contact portion 262 is formed on the top of the timing lever 261, and a switch pressing portion 263 is formed on the lower end of the timing lever 261. The switch pressing portion 263 is positioned at a predetermined distance from a contact point 266 of a tray detection switch 265 such as a push switch.

Figure 44:
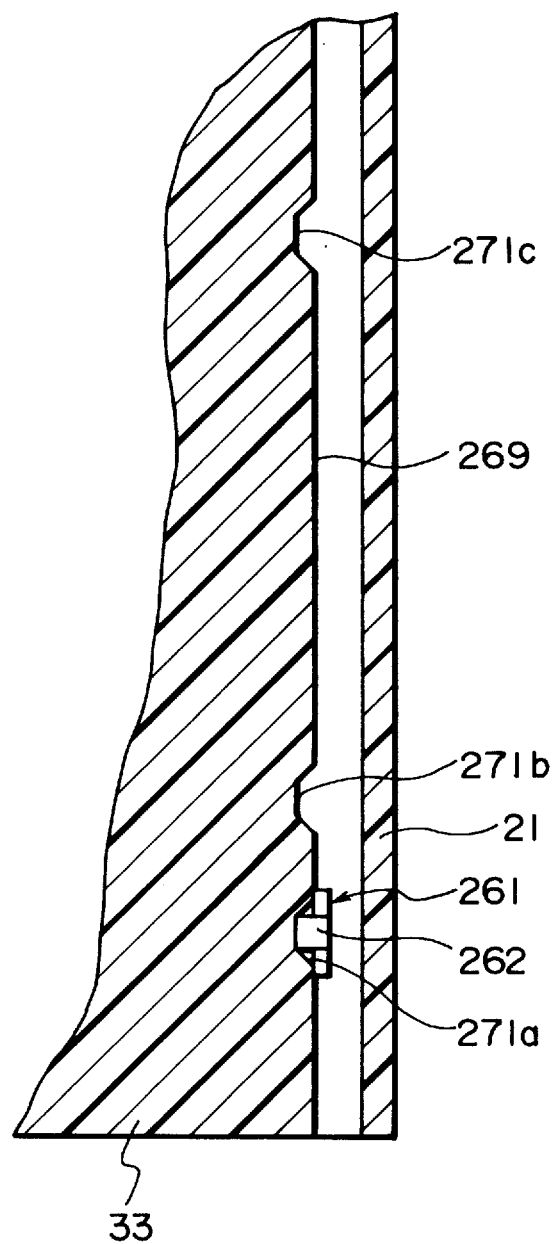
FIG. 44 is a partial view from line R—R of FIG. 43 according to the present invention.

As shown in FIG. 44, three timing grooves 271a, 271b, and 271c are formed into a lever sliding face 26 of the right side of the tray 33 at predetermined intervals. When the tray 33 is closed, the tray contact portion 262 of the timing lever 261 are inserted into the front timing groove 271a. In this situation, the switch pressing portion 263 of the timing lever 261 is separated from the tray detection switch 265 (FIG. 43), so that the tray detection switch 265 is turned off. When the switch pressing portion 263 is inserted into the other timing groove 271b or 271c, the tray detection switch 265 is turned off. Otherwise, the tray detection switch 265 is turned on.

The presence or absence, and possible slipping, or double-loading of the disc can be detected, based on the ON/OFF state of the tray detection switch 265 and the detection of the detection holes 55a to 55f with the sensors 86L and 86R.

Figure 45:
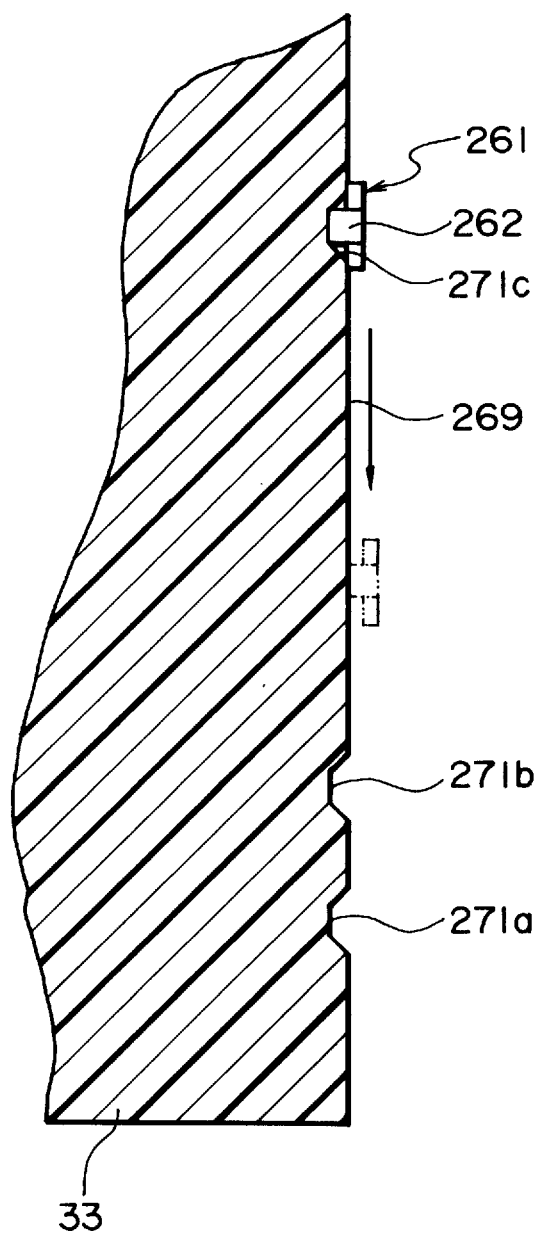
FIG. 45 is a partial view showing an operation of the timing lever 261 when the tray 33 is being opened according to the present invention.

As shown in FIG. 45, when the tray 33 is opened, the tray contact portion 262 of the timing lever 261 is inserted into the rear timing groove 271c. The tray detection switch 265 is turned off. After the user places the first disc 1a on the first disc holder 25a, the tray 33 begins closing and the tray contact portion 262 of the timing lever 261 is moved from the timing groove 271c along the lever sliding face 269. The timing lever 261 (FIG. 43) is rotated clockwise against the biasing force of the helical extension spring 509 and the tray detection switch 265 is turned on. A detection signal from the tray detection switch 265 is transmitted to the control block 36 (FIG. 1), which begins a disc determination operation.

Figure 46:
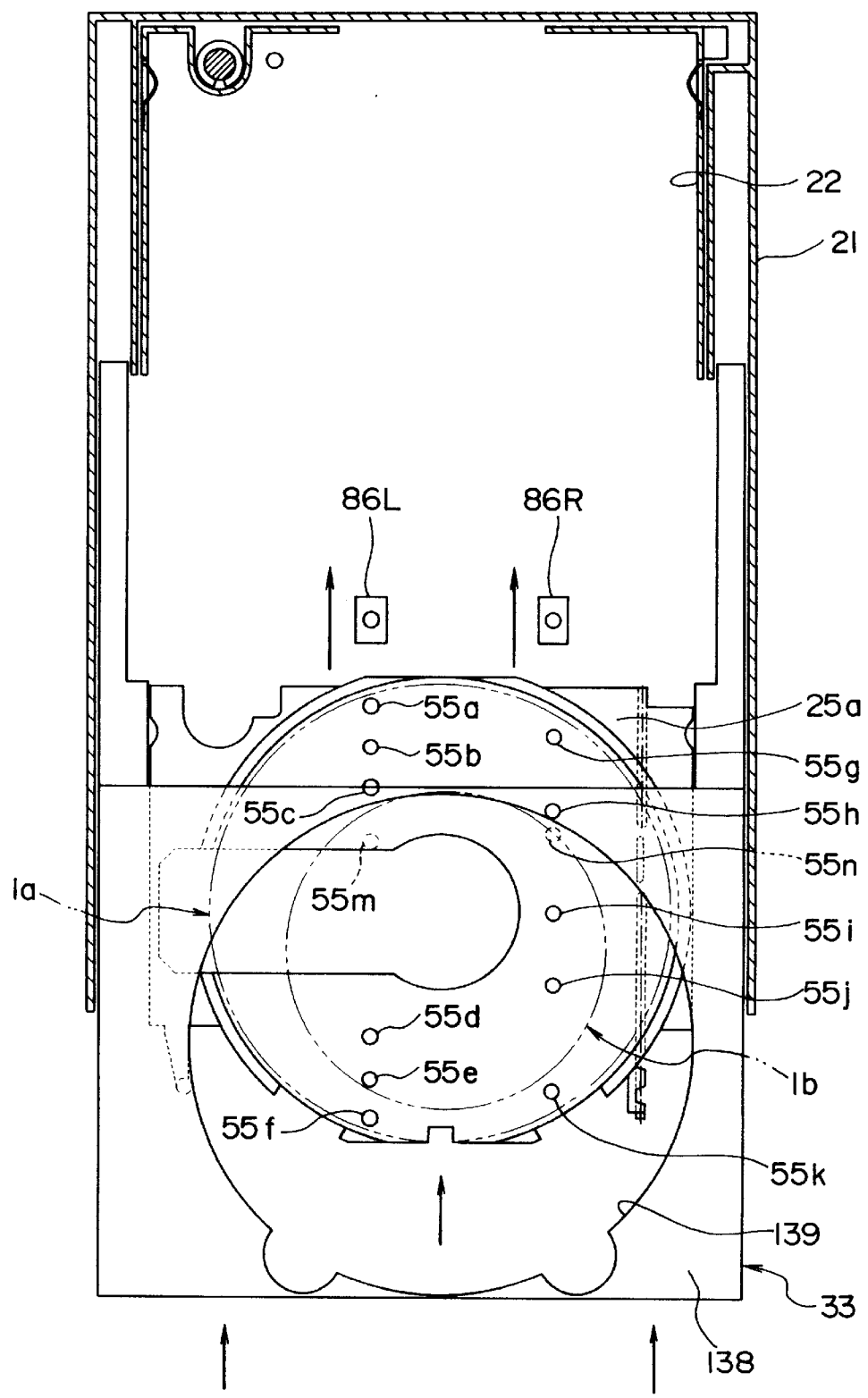
FIG. 46 is a top cut-away view showing a disc detection (1/2) according to the present invention.

When the tray 33 begins closing, the first disc holder 25a is simultaneously moved backward by the loading lever 121 (FIG. 14). The first disc holder 25a is moved at approximately double the speed of the tray 33. As shown in FIG. 46, the detection holes 55a to 55f and 55g to 55k of the first disc holder 25a pass by the sensors 86L and 86R prior to the detection holes 55m and 55n of the tray 33.

Figure 47:
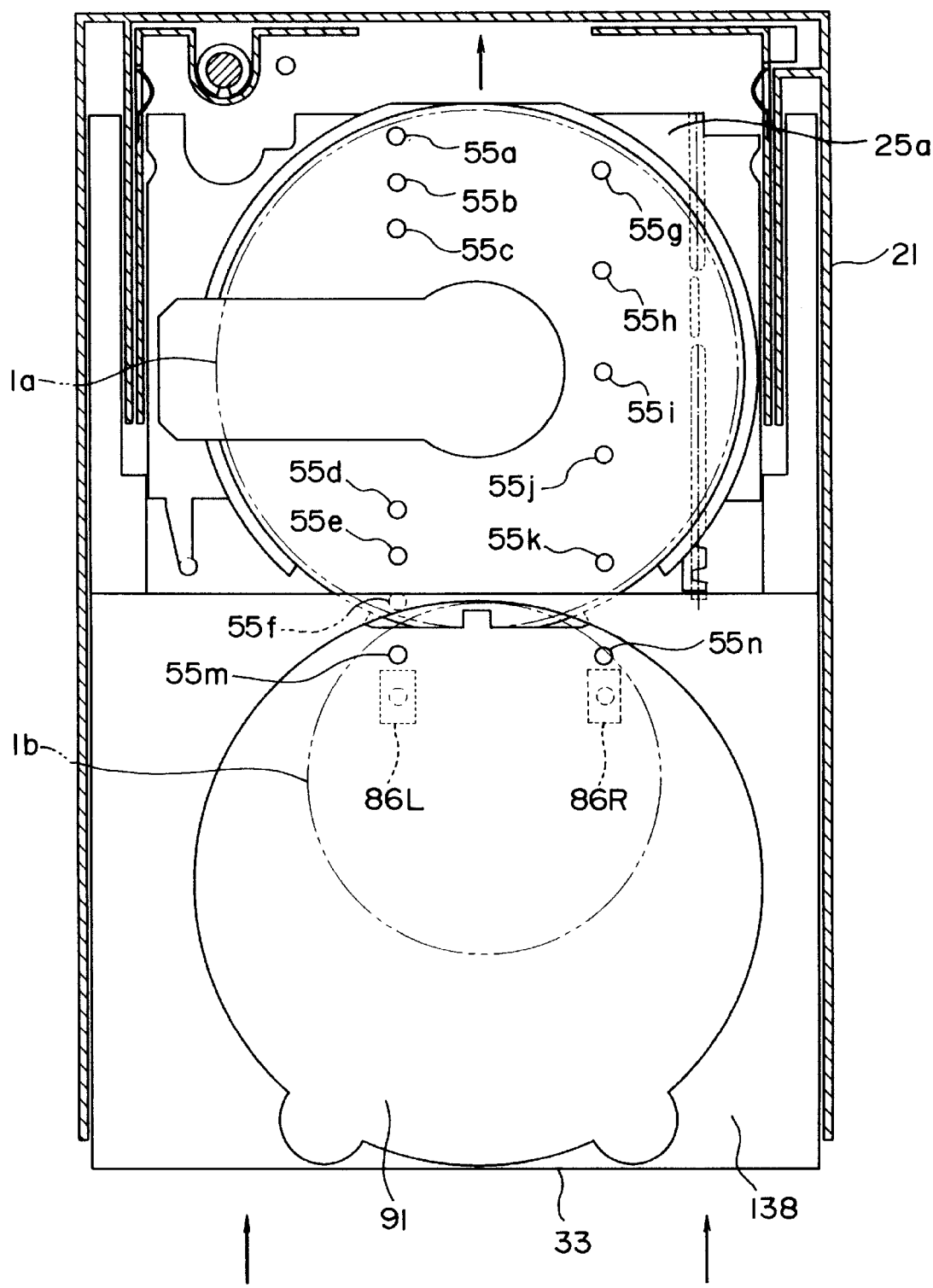
FIG. 47 is a top cut-away view showing a disc detection (2/2) according to the present invention.

In the disc determination operation, the light-emitting devices 260L and 260R (FIG. 42) emit light, which is detected by the sensors 86L and 86R when the detection holes 55a to 55k pass by the sensors 86L and 86R. As shown in FIG. 47, just before the tray 33 is completely closed, the rear edge of the first disc holder 25a passes by the detection holes 55m and 55n of the tray 33. When the detection holes 55m and 55n pass by the sensors 86L and 86R, the light from the light-emitting devices 260L and 260R is detected by sensors 86L and 86R.

When the tray contact portion 262 (FIG. 45) of the timing lever 261 passes by on the timing groove 271b, the tray detection switch 265 is turned off. Thereafter, the detection holes 55m and 55n of the tray 33 pass by the sensors 86L and 86R. At this point, the control block 36 (FIG. 1) detects all of the detection holes 55a to 55n and determines the presence or absence, and possible slipping, or double-loading of the disc 1a or 1b, based on the detection of the light using the sensors 86L and 86R.

Until the tray 33 is completely closed, the tray contact portion 262 of the timing lever 261 (FIG. 44) is positioned on the lever sliding face 269, and the tray detection switch 265 remains in the ON state. During this time, the control block 36 performs the determination. When the tray is completely closed, the tray contact portion 262 of the timing lever 261 is inserted into the timing groove 271a, and the tray detection switch 265 is turned off, at which point the disc determination operation by the control block 36 is completed.

There are eleven detection holes 55a to 55k on the disc holder 25a or 25b, and there are two detection holes 55m to 55n on the tray 33. When no first or second disc 1a or 1b is placed on the first disc holder 25a, the sensors 86L and 86R transmit 13 detection signals to the control block 36 (FIG. 1).

Figure 48:
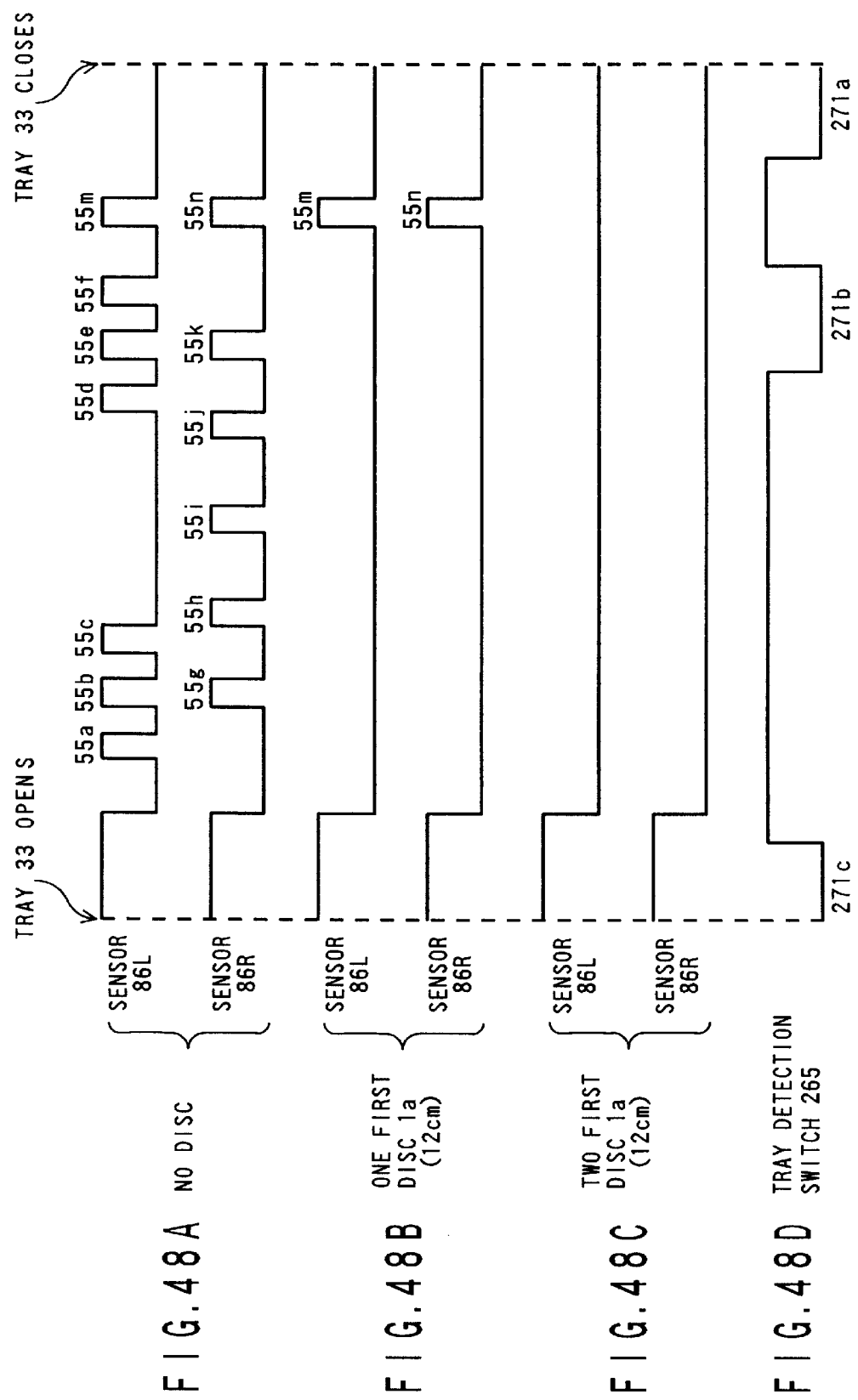
FIGS. 48A–48D depict a diagram showing a disc detection signal when the first disc holder 25a (for a disc with a diameter of 12 cm) is used according to the present invention.
Figure 49:
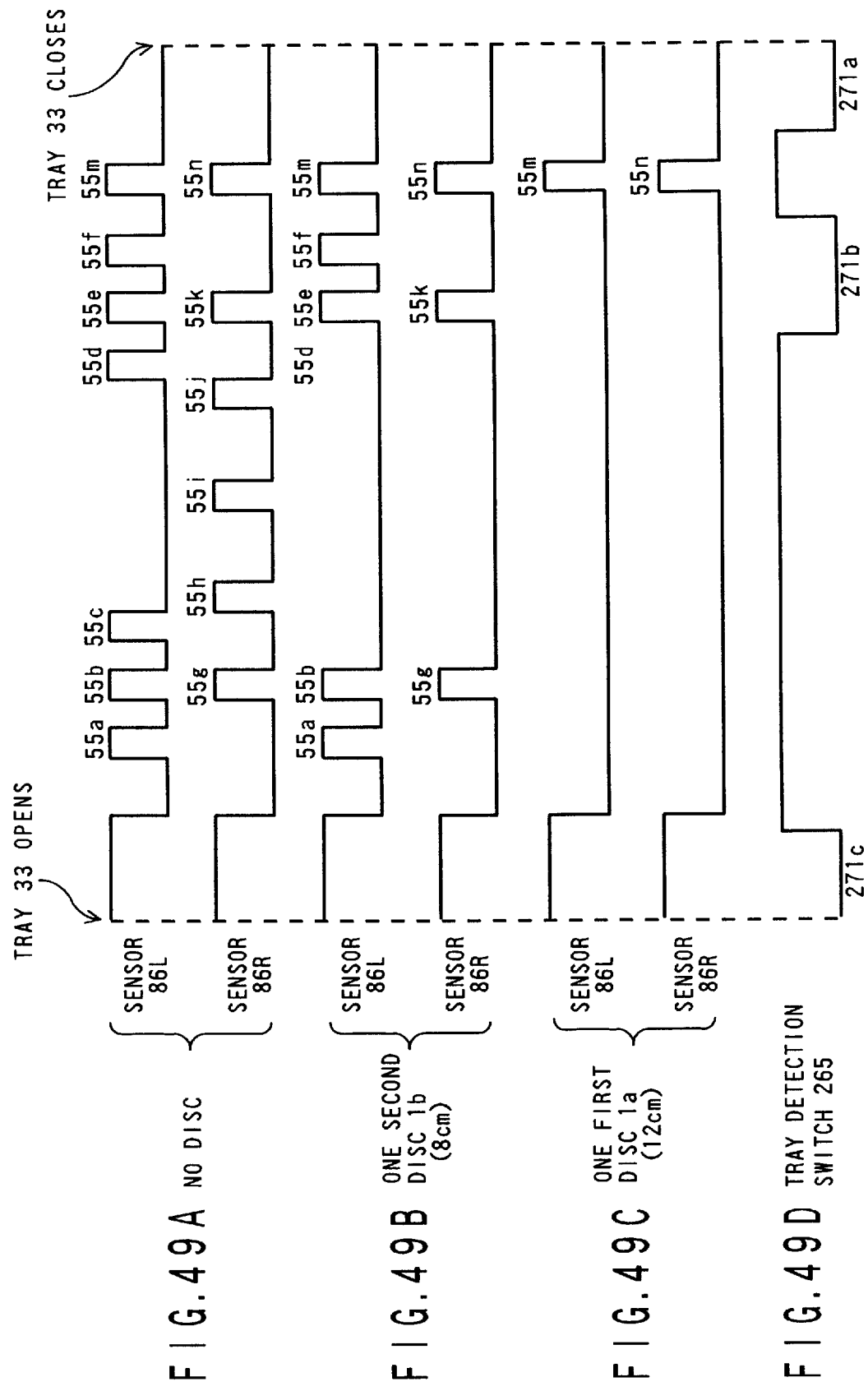
FIGS. 49A–49D depict a diagram showing a disc detection signal when the first disc holder 25b (for a disc with a diameter of 8 cm) is used (1/2) according to the present invention.
Figure 50:
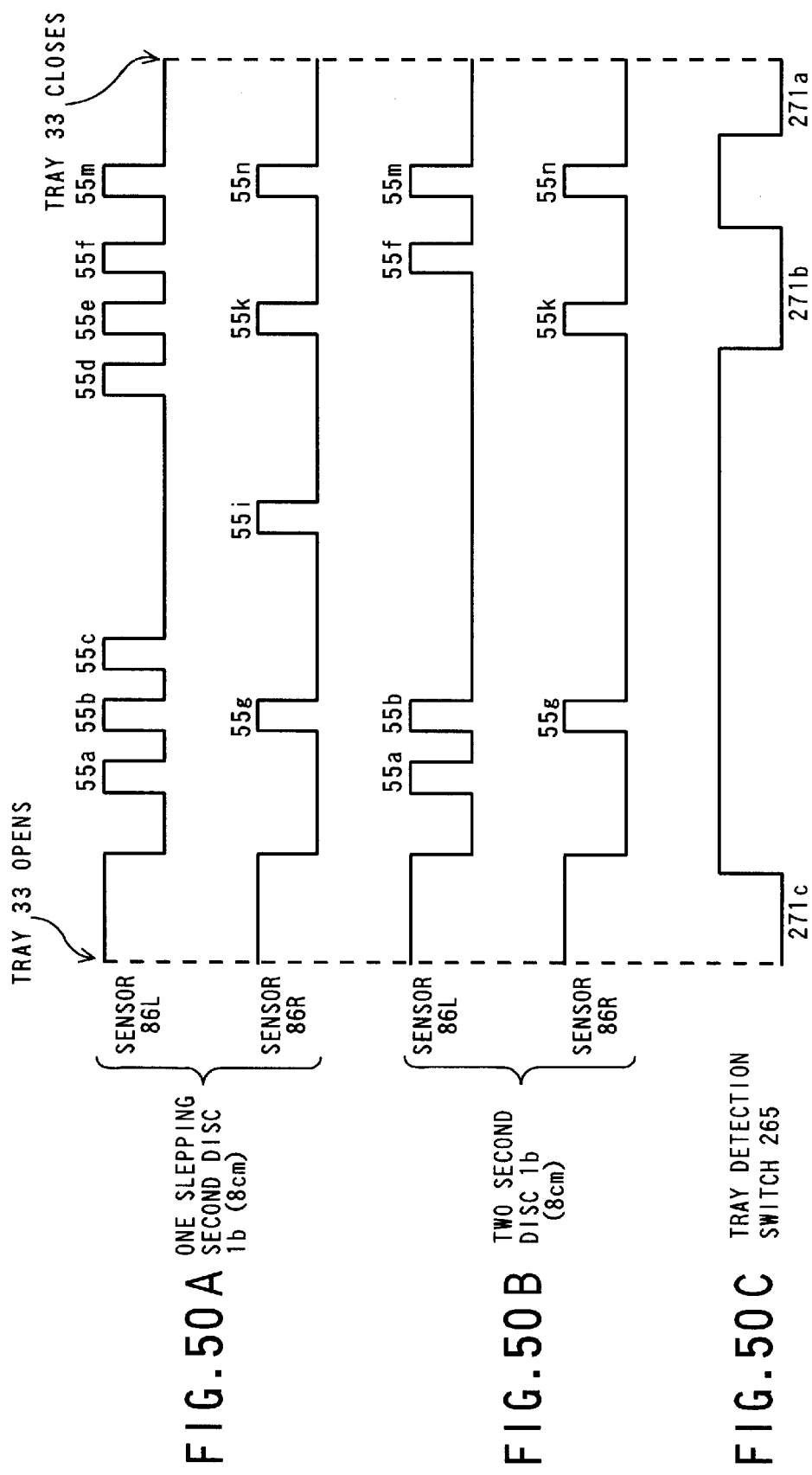
FIGS. 50A—50C depict a diagram showing a disc detection signal when the first disc holder 25b (for a disc with a diameter of 8 cm) is used (2/2) according to the present invention.
Figure 51:
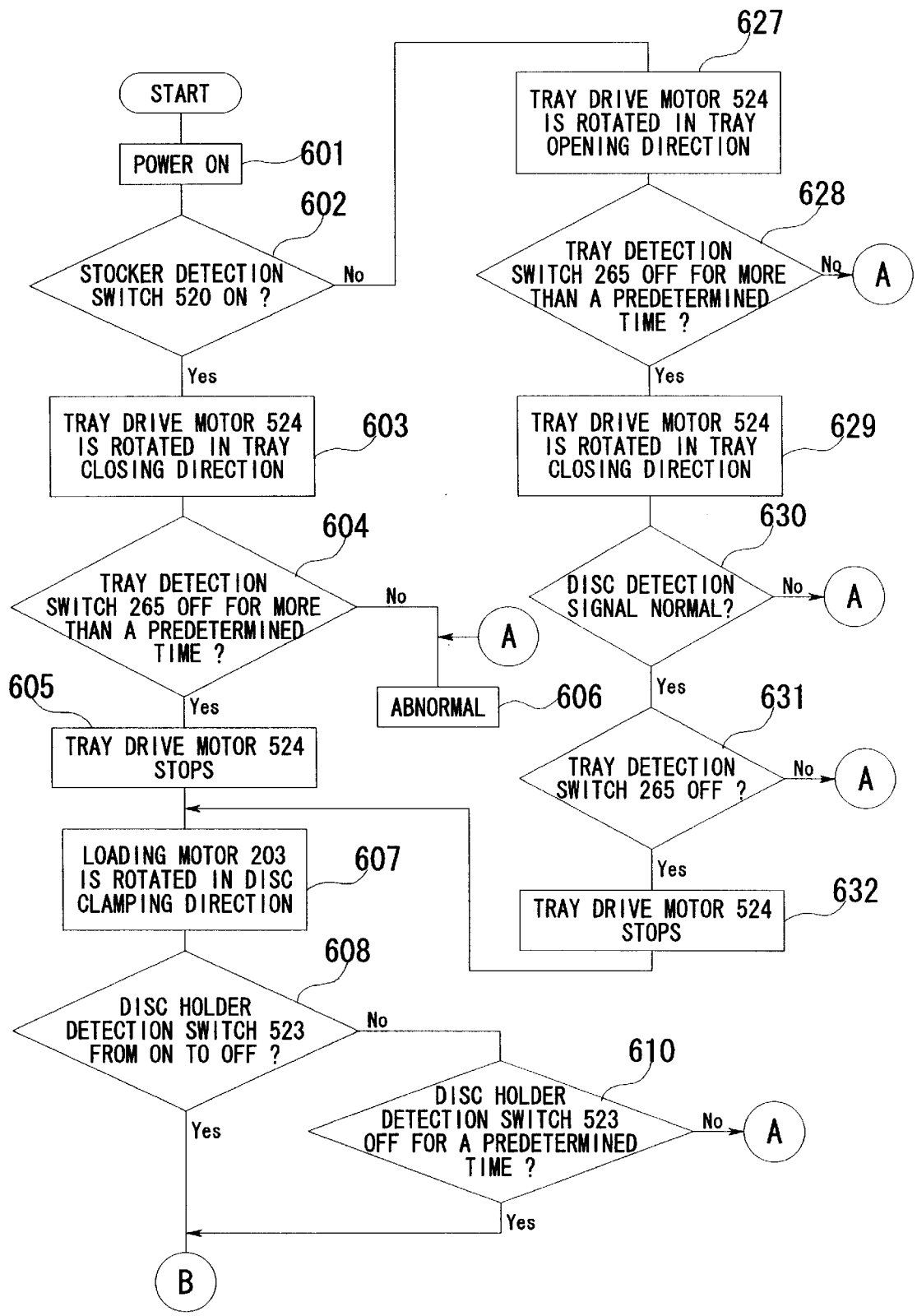
FIG. 51 to FIG. 55 are flow charts demonstrating the order for initializing operations according to the present invention.

FIG. 48 shows the disc detection signals when the first disc holder 25a is used, and FIG. 49 and FIG. 50 show the disc detection signals when the second disc holder 25b (FIG. 34) is used.

FIG. 48A shows a detection signals when no disc 1a or 1b is placed on the first disc holder 25a. Since all of the detection holes 55a to 55n are detected, the control block 36 determines that no disc 1a or 1b is placed on the tray 33, and the tray 33 is closed. FIG. 48D shows the detection signal of the tray detection switch 265.

FIG. 48B shows a disc detection signal when the first disc 1a with a diameter of 12 cm is correctly placed on the first disc holder 25a. Since all of the detection holes 55a to 55k are obstructed, only the detection holes 55m and 55n of the tray 33 are detected, and the tray 33 is closed.

FIG. 48C shows a disc detection signal when the user accidentally places two first discs 1a on the first disc holder 25a. All of the detection holes 55a to 55k are obstructed by the lower first disc 1a, which is transferred to the stocker 22 as the tray 33 is closed. As shown in FIG. 9, because the upper first disc 1a is left on the tray 33, obstructed by the engaging projection 501 and the upper inclined face 503, the detection holes 55m and 55n which are obstructed by the upper first disc 1a, pass by the sensors 86L and 86R. The control block 36 determines that two first discs 1a were placed on the tray 33, and directs the tray 33 to be opened. Because the tray 33 is opened again just before it is completely closed, the user can easily remove the upper first disc 1a which is placed on the lower first disc 1a.

FIG. 49A shows a disc detection signal when no disc 1a or 1b is placed on the second disc holder 25b. Since all of the detection holes 55a to 55n are detected in a fashion similar to the disc detection signal for the first disc holder 25a with no disc 1a or 1b, the tray 33 is closed. FIG. 49D shows the detection signal of the tray detection switch 265.

FIG. 49B shows a disc detection signal when the second disc 1b is correctly placed on the second disc holder 25b. Since the detection holes 55a, 55b, 55e, 55f, and 55k which are located outside the disc area 251 on the second disc holder 25b and the detection holes 55m and 55n are detected, the tray 33 is closed.

FIG. 49C shows a disc detection signal when the user accidentally places the first disc 1a on the second disc holder 25b. The same signal as FIG. 48B is detected, but is determined to be abnormal because the second disc holder 1b is placed on the tray 33. The tray 33 is opened again so that the user can easily take out the first disc 1a.

FIG. 50E shows a disc detection signal when the second disc 1b, which is placed on the second disc holder 25b, slips to the right. Of the right detection holes 55g to 55k, the second rear detection hole 55h and the second front detection hole 55j are obstructed by the non-transparent area 507 of the second disc 1b. The tray 33 is opened again, and the user can correctly re-place the second disc 1b.

FIG. 50F shows a disc detection signal when the user accidentally places two second disc 1b on the second disc holder 25b. As described above with reference to FIG. 40, the second left front detection hole 55e is obstructed by the first holding lever 252 and is not detected. The other detection holes are detected in a fashion similar to the detection signal in FIG. 49B when the second disc 1b is correctly placed. The tray 33 is opened again and the user can take out the upper second disc 1b.

As described above, the auto disc changer 20 according to this invention can detect the presence or absence, and possible slipping, or double-loading of a disc or discs 1a or 1b, based on the disc detection signals from the sensors 86L and 86R, and directs the tray 33 to be opened again so that the user can correctly re-place a disc or discs 1a or 1b. This prevents the auto disc changer 20 from being damaged due to the disc or discs 1a or 1b which are caught by the mechanism inside.

Initializing Operation

An initializing operation of the auto disc changer 20 is described below. The initializing operation is performed when the power supply is accidentally interrupted by an electricity failure and the auto disc changer 20 cannot determine the operational status. The power is supplied via a charge device such as a condenser to the stocker drive motor 151 in the auto disc changer 20. If the power supply is interrupted by an electricity failure when the cam followers 62 of the stocker 22 are positioned on the inclined cogs 23a of the stocker drive cam 23, the power can be supplied from the charge device, so that the cam followers 62 are directed to stop on the flat cogs 23b of the stocker drive cam 23.

Accordingly, even if the power supply is interrupted by an electricity failure and the auto disc changer 20 cannot determine the operational status, the stocker 22 stops so that the disc holder 25 in the stocker 22 corresponds to the tray 33 or the player 34. The disc holder 25 may be positioned between the stocker 22 and the tray 33, or the disc holder 25 may be positioned between the stocker 22 and the playback position. When the power is turned on again, the disc holder 25 on the tray 33 is stored into the stocker 22 and the disc holder 25 corresponding to the playback position is transferred to the playback position, and thereafter, the stocker 22 can move up and down.

Subsequently, the disc holder 25 is transferred from the playback position into the stocker 22, and TOC (table of contents) data are read one by one from the highest level of the compartment in the stocker 22. When a disc 1 is not positioned at the highest level, the data of the disc 1 at the next level is read. In such manner, the presence or absence of discs 1 on all compartments are checked, and the disc 1 at the highest level is clamped onto the player 34, which thereafter remains on standby. The playback operation can thus be quickly re-started when the user selects the playback mode. When there is no disc 1 in the stocker 22, the disc holder 25 at the first level is set to the playback position, and the player 34 moves up and remains on standby. In either case, when the player 34 moves up, the stocker 22 is positioned at the lowest level. This is done because stability is increased when the stocker 22 is positioned at the lowest level.

FIG. 51 to FIG. 55 are flowcharts which show the initializing operation 600 of the auto disc changer 20. In the initializing operation 600, when the power supply switch (not shown) is turned on (in step 601), a determination is made whether or not the stocker detection switch 520 (FIG. 1) is turned on (in step 602). When the stocker detection switch 520 is turned on, the tray drive motor 5 (FIG. 5) is rotated for a predetermined time in order to close the tray 33 (in step 603).

A determination is made whether or not the tray detection switch 265 remains in the OFF state for more than a predetermined time (in step 604). When it is in the OFF state, the tray drive motor 521 stops (in step 605). When it is not in the OFF state for more than a predetermined time in step 604, it is determined that the tray 33 has stopped midway for some reason, and a message indicating the abnormal situation, for example, an alarm or a display, is made (in step 606).

When the tray drive motor 524 stops in step 605, the loading motor 203 (FIG. 23) is rotated for a predetermined time in the disc clamping direction (in step 607), and a determination is made whether or not the disc holder detection switch 523 (FIG. 23) has been turned from the ON state to the OFF state (in step 608).

Figure 52:
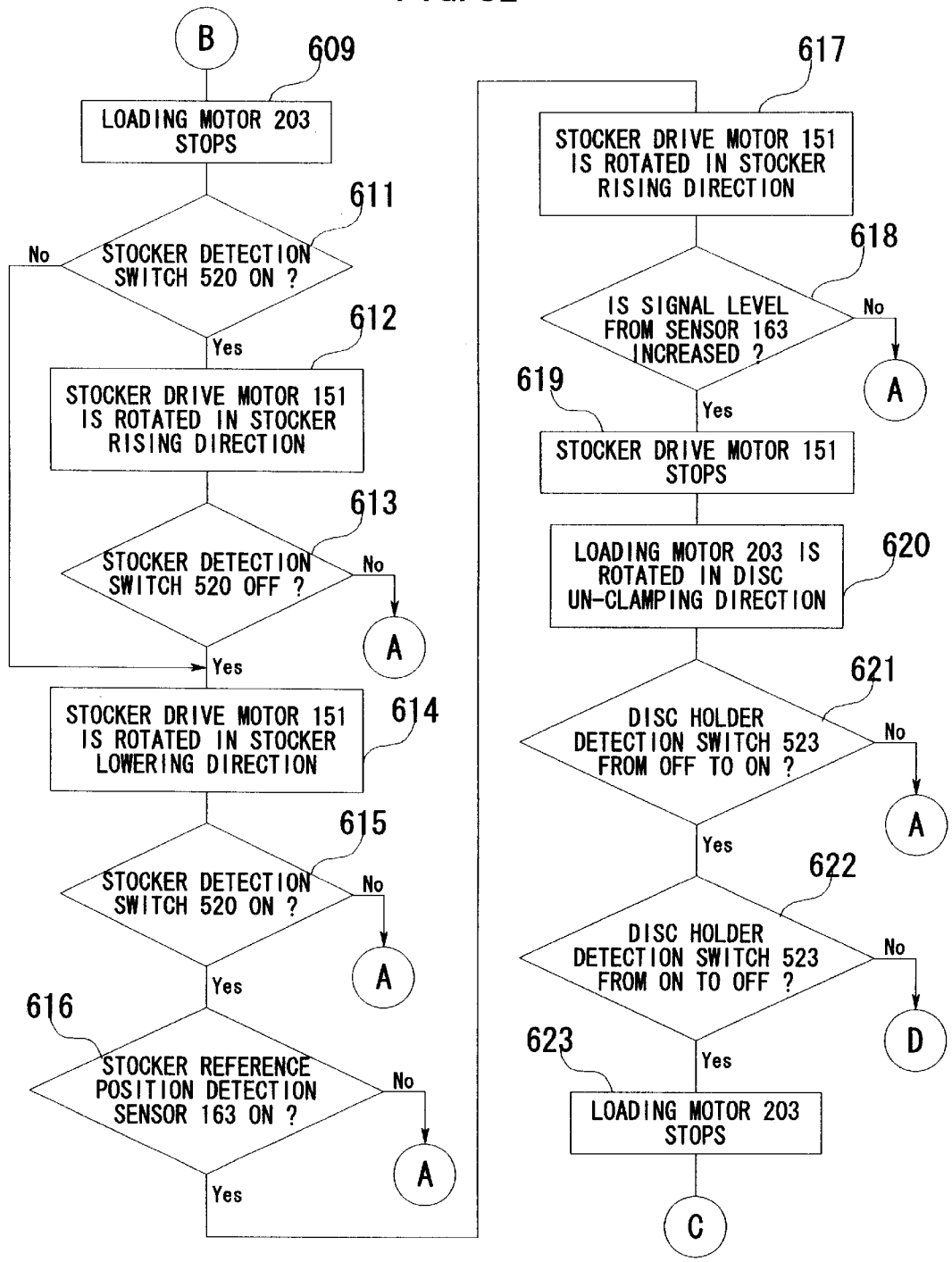

When the disc holder detection switch 523 is turned from the ON state to the OFF state in step 608, in other words, when the disc holder 25 is positioned at the playback position and the player 34 moves up to complete the preparation for the playback operation, the loading motor 203 stops as shown in FIG. 52 (in step 609). When the disc holder detection switch 523 is not turned from the ON state to the OFF state, a determination is made whether or not the disc holder detection switch 523 remains in the OFF state for a predetermined time, in other words, whether or not the disc holder 25 is positioned at the player 34 from the beginning (in step 610). When it remains in the OFF state for the predetermined time, the loading motor 203 stops (in step 609).

In step 607, the loading motor 203 is rotated in the disc clamping direction for the following reason. If the loading motor 203 is rotated in the disc clamping direction in step 607, the following operation is required. When the disc holder 25 is positioned on the player 34 and another disc holder 25 is already stored in the storage position of the stocker 22, the movement of the disc holder 25 on the player 34 must be detected using the disc holder detection switch 523, the loading motor 203 must be rotated in the opposite direction (the disc clamping direction), and the clamping of the player 34 must be detected with the disc holder detection switch 523.

When the disc holder detection switch 523 does not remain in the OFF state for the predetermined time, it will stay in the ON state from the beginning because the dual gear 201 cannot be rotated or because the disc holder detection switch 523 is broken for some reason, and a message indicating the abnormal situation is made as in step 606.

When the loading motor 203 stops in step 609, a determination is made whether or not the stocker detection switch 520 is turned on, in other words, whether or not the stocker 22 is positioned at the lowest level (in step 611). When the stocker detection switch 520 is turned on, the stocker drive motor 151 is rotated in the stocker rising direction (in step 612), and a determination is made whether or not the stocker detection switch 520 is turned off (in step 613). When the stocker detection switch 520 is not turned off, the stocker 22 is not able to move up for some reason, and a message indicating the abnormal situation is made.

When the stocker detection switch 520 is turned off in step 613, the stocker drive motor 151 is rotated in the stocker lowering direction (in step 614). When the stocker detection switch 520 is not turned on in step 611, the stocker 22 is not positioned at the lowest level, and the stocker drive motor 151 is rotated in the stocker lowering direction in step 614.

After the stocker drive motor 151 is rotated in the stocker lowering direction in step 614, a determination is made whether or not the stocker detection switch 520 is turned on (in step 615). When it is turned on, a determination is made whether or not the stocker reference position detection sensor 163 (FIG. 20) is turned on (in step 616). When the stocker detection switch 520 is not turned on in step 615, or when the stocker reference position detection sensor 163 is turned on in step 616, something is wrong and a message indicating the abnormal situation is made.

When the stocker reference position detection sensor 163 is turned on in step 616, the stocker drive motor 151 is rotated in the stocker rising direction (in step 617), and a determination is made whether or not the level (voltage) of the signal from the stocker reference position detection sensor 163 is increased (in step 618). Because the stocker reference position detection sensor 163 remains in the ON state for a long time, the reference position of the stocker 22 is accurately determined by detecting an increase of the level of the signal. When an increase of the level of the signal is not detected, something is wrong and a message indicating the abnormal situation is made.

When the increase of the level of the ON signal from the stocker reference position detection sensor 163 is detected, the stocker drive motor 151 stops (in step 619). The loading motor 203 is rotated in the disc un-clamping direction (in step 620). A determination is made whether or not the disc holder detection switch 523 is turned from the OFF state to the ON state (in step 621), and when it is turned from the OFF state to the ON state, a determination is made whether or not the disc holder detection switch 523 is turned from the ON state to the OFF state (in step 622). When it is turned from the ON state to the OFF state, the dual gear 201 stops rotating and a message indicating the abnormal situation is made.

Figure 53:
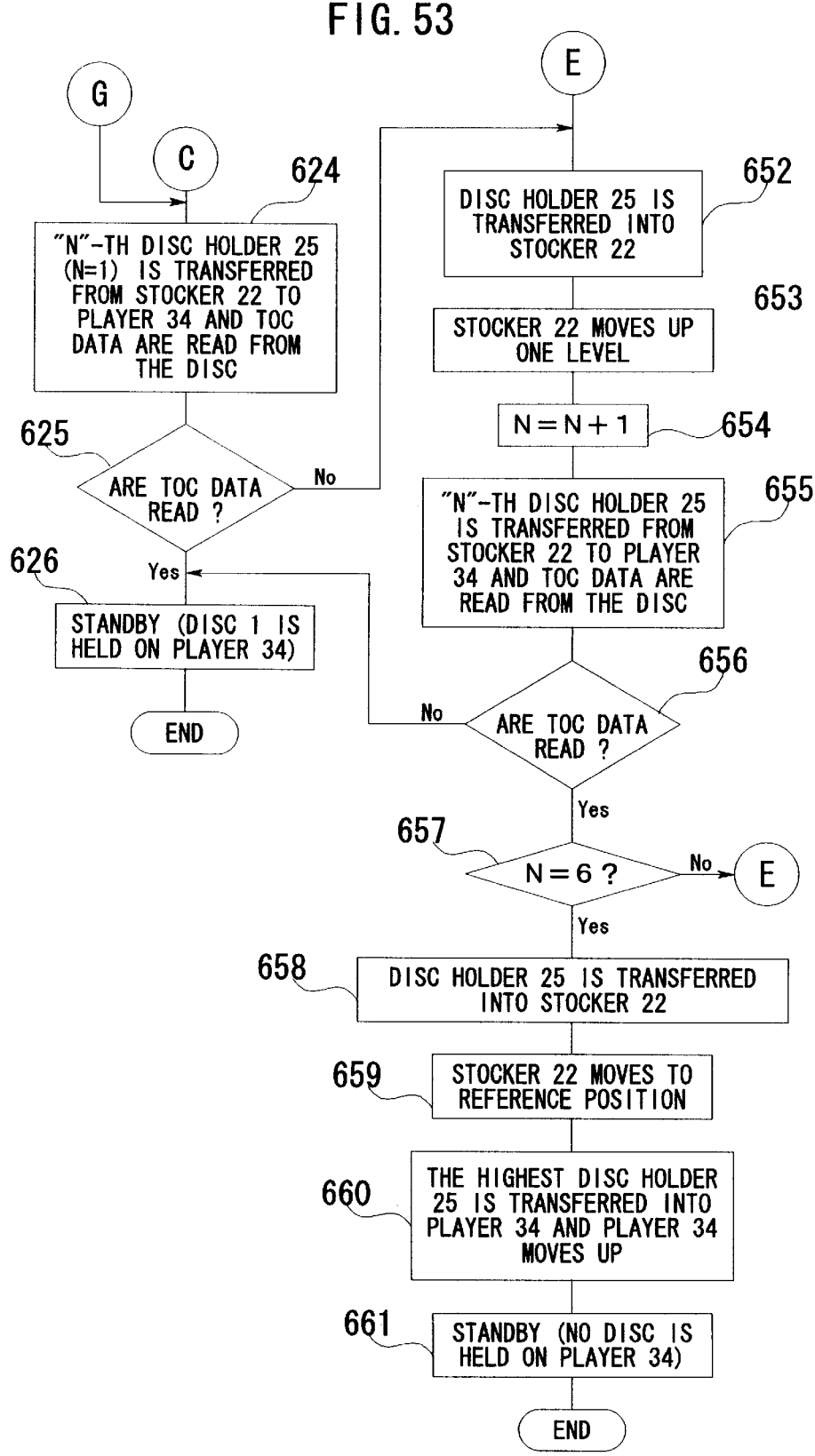
Figure 54:
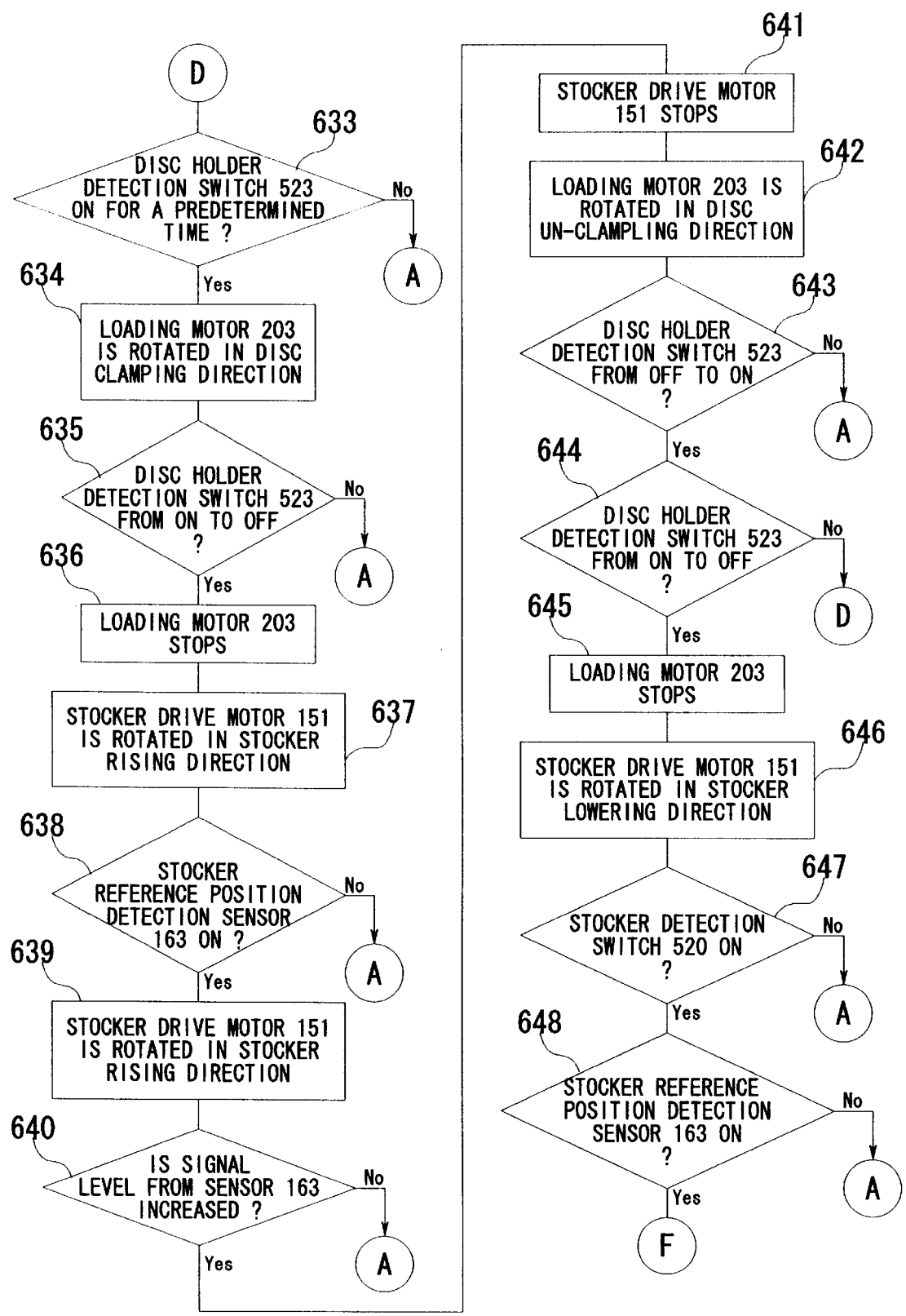

When the disc holder detection switch 523 is turned from the ON state to the OFF state in step 622, the loading motor 203 stops (in step 623), a certain disc holder 25, (the "N"-th), for example, the highest disc holder 25, is transferred to the playback position as shown in FIG. 53, and the TOC (table of contents) data of the disc 1 are read (in step 624). A determination is made whether or not the TOC data are recorded (in step 625), and when the TOC data is recorded, the changer 20 remains on standby (in step 626), at which point the initializing operation 600 is completed.

When the stocker detection switch 520 is not turned on, in other words, when the stocker 22 is not positioned at the lowest level, the tray drive motor 524 is rotated in the tray opening direction (in step 627), and a determination is made whether or not the tray detection switch 265 remains in the OFF state for more than a predetermined time (in step 628). When it has not been in the OFF state for more than the predetermined time, a message indicating the abnormal situation is made.

When the tray detection switch 265 remains in the OFF state for a predetermined time in step 628, the tray drive motor 524 is rotated in the tray closing direction (in step 629), and a determination is made whether or not the disc detection signals (FIG. 48 to FIG. 50) are normal, in other words, whether or not a disc is slipping or double-loaded (in step 630). When the disc detection signals are abnormal, a message indicating the abnormal situation is made.

When the disc detection signals are normal in step 630, a determination is made whether or not the tray detection switch 265 is turned off, in other words, whether or not the tray 33 is closed (in step 631). When it is not turned off, in other words, when the tray 33 is not closed, a message indicating the abnormal situation is made. When the tray detection switch 265 is turned off in step 631, in other words, when the tray 33 is closed, the tray drive motor 524 stops (in step 632), the loading motor 203 is rotated in the disc clamping direction in step 607, and the operations described above is performed.

When the disc holder detection switch 523 is not turned from the ON state to the OFF state in step 622, a determination is made whether or not the disc holder detection switch 523 remains in the ON state for a predetermined time (in step 633). When the disc holder detection switch 523 remains in the ON state for the predetermined time, it means the other disc holder 25 is already stored in the compartment of the stocker 22, which compartment corresponds to the playback position. The loading motor 203 is rotated in the disc clamping direction (in step 634), and a determination is made whether or not the disc holder detection switch 523 is turned from the ON state to the OFF state (in step 635).

When it is turned from the ON state to the OFF state in step 635, the message described above is made in step 606. When it is turned from the ON state to the OFF state in step 635, in other words, when the disc holder 25 is transferred to the playback position and the player 34 moves up, the loading motor 203 stops (in step 636), and the stocker drive motor 151 is rotated in the stocker rising direction (in step 637).

A determination is made whether or not the stocker reference position detection sensor 163 is turned on (in step 638). When it is not turned on, the message described above is made in step 606. When the stocker reference position detection sensor 163 is turned on in step 638, the stocker drive motor 151 is rotated in the stocker lowering direction (in step 639), and a determination is made whether or not the ON signal from the stocker reference position detection sensor 163 is increased (in step 640). When the increasing of the ON signal is not detected, the message described above is made in step 606.

When the increasing of the level of the ON signal is detected in step 640, the stocker drive motor 151 stops (in step 641), and the loading motor 203 is rotated in the disc un-clamping direction (in step 642). A determination is made whether or not the disc holder detection switch 523 is turned from the OFF state to the ON state (in step 643). When it is turned from the OFF state to the ON state, a determination is made whether or not the disc holder detection switch 523 is turned from the ON state to the OFF state (in step 644).

When the disc holder detection switch 523 is not turned from the OFF state to the ON state in step 643 and is not turned from the ON state to the OFF state in step 644, the message indicating the abnormal situation is made in step 606. When it is turned from the ON state to the OFF state in step 644, the disc holder 25 is transferred from the player 34 to the stocker 22. The loading motor 203 stops (in step 645), at which point all disc holders 25 are already stored in the stocker 22.

When the highest disc tray 25 corresponds to the tray 33 and the initializing operation is performed, the stocker detection switch 520 may generate an ON/OFF signal although no disc holder 25 is transferred to the player 34, because no disc holder 25 is positioned at the level corresponding to the player 34, and it may be determined by mistake that the disc holder 25 has been transferred to the player 34. In this situation, it is determined that disc holders 25 are already stored in all of the seven storage positions of the stocker 22 and no disc holder 25 is placed on the player 34. The stocker 22 moves up one level, and the loading motor 203 is rotated in the disc un-clamping direction so as to store the disc holder 25, which is not in fact set on the player 34, into the stocker 22. Accordingly, it is determined that the disc holders 25 are all in the storage positions in the stocker 22.

The stocker drive motor 151 is rotated in the stocker lowering direction (in step 646), and a determination is made whether or not the stocker detection switch 520 is turned on (in step 647). When the stocker detection switch 520 is turned on, a determination is made whether or not the stocker reference position detection sensor 163 is turned on (in step 648).

Figure 55:
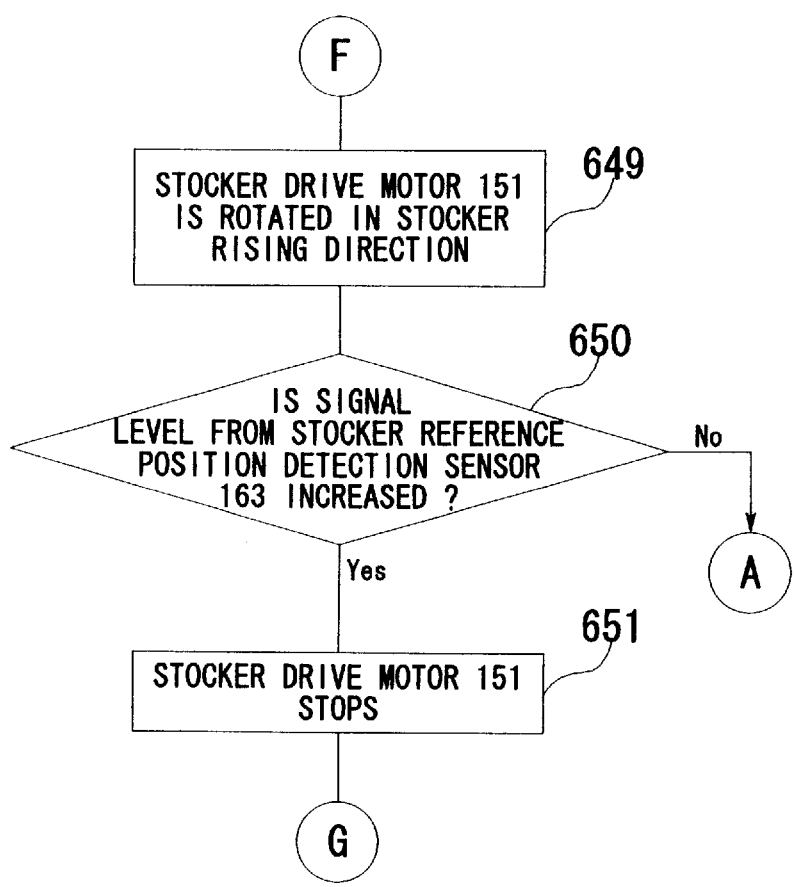

When the stocker detection switch 520 is not turned on in step 647 and when the stocker reference position detection sensor 163 is not turned on in step 648, the message indicating the abnormal situation is made in step 606. When the stocker reference position detection sensor 163 is turned on in step 648, the stocker drive motor 151 is rotated in the stocker rising direction as shown in FIG. 55 (in step 649), and a determination is made whether or not the level of the ON signal from the stocker reference position detection sensor 163 is increased (in step 650). When the increasing of the level of the ON signal is not detected, the message indicating the abnormal situation is made in step 606.

When the increasing of the level of the ON signal from the stocker reference position detection sensor 163 is detected, the stocker drive motor 151 stops (in step 651), the highest disc holder 25 in the stocker 22 is transferred to the playback position in step 624 (FIG. 53), the TOC data of the disc 1 is read, and the message described above is made.

As shown in FIG. 53, when the TOC data are not read in step 625, the disc holder 25 is transferred to the stocker 22 (in step 652), and the stocker moves up one level (in step 653). 1 is added to "N" (in step 654), the "N"-th disc holder 25 is transferred to the playback position, and the TOC data is read (in step 655).

A determination is made whether or not the TOC data are read (in step 656), and when the TOC data are read, the auto disc changer 20 remains on standby and the initializing operation 600 is completed. When the TOC data are not read in step 656, a determination is made whether or not "N" is "6" (in step 657). In this step, it is determined whether or not the disc 1 from which the TOC data was read in step 655 was the one which was stored in the lowest, seventh, level of the stocker 22.

When "N" is not "6" in step 657, the disc holder 25 is transferred into the stocker 22 in step 652, and the operation described above is repeated. When "N" is "6" in step 657, the disc holder 25 is transferred (in step 658). The stocker 22 is positioned at the reference position (in step 659). The highest disc holder 25 in the stocker 22 is transferred to the playback position (in step 660). The auto disc changer 20 remains on standby, at which point the initializing operation is completed.

As described above, the auto disc changer 20 detects the opening and closing operation of the tray 33 through the tray detection switch 265, detects the position of the stocker 22 through the stocker detection switch 520 and the stocker reference position detection sensor 163, and detects the clamping of the disc 1 through the disc holder detection switch 523, reducing the number of the detection switches and sensors required and simplifying the construction.

Other Operations

Figure 56:
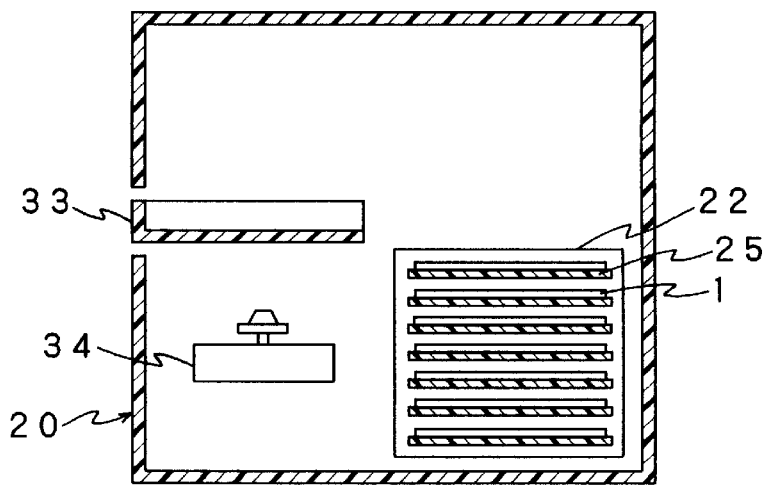
FIG. 56 to FIG. 58 are cross-sectional views showing an order of a playback mode according to the present invention.
Figure 57:
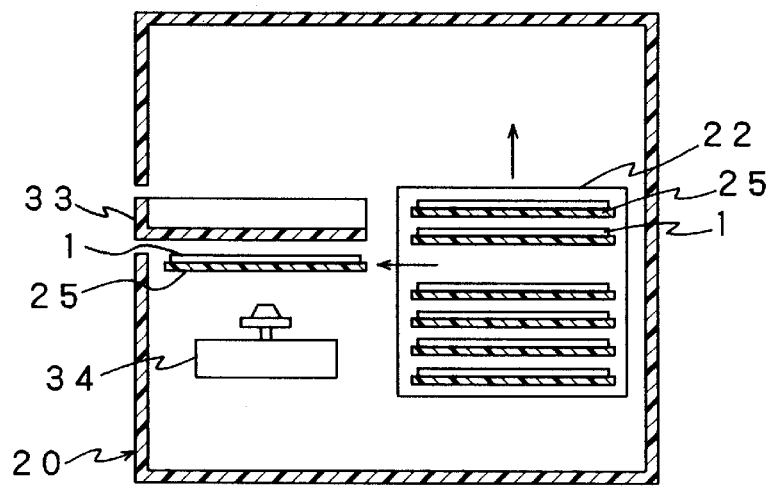
Figure 58:
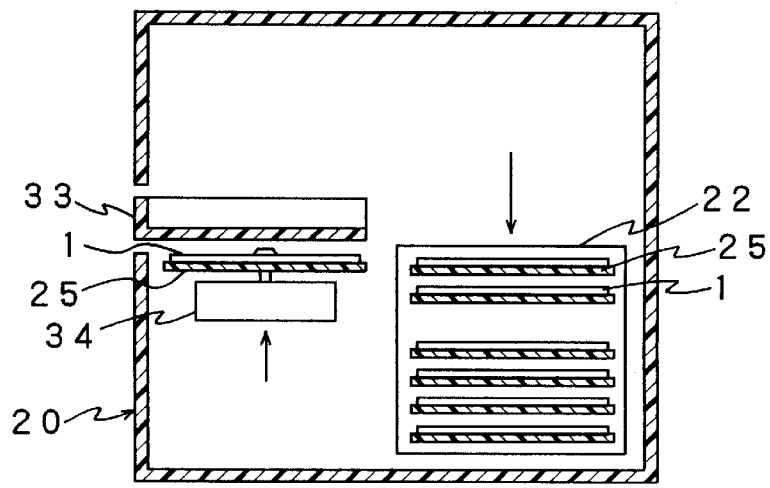

A playback mode is described below. In the playback mode, as shown in FIG. 56, the user selects a disc number, for example, "No. 3" when the stocker is positioned at the reference position and remains on standby. As shown in FIG. 57, the stocker 22 moves up in order to transfer the third compartment to the level corresponding to the playback position, the disc holder stored at the third compartment is transferred to the playback position, and the player 34 moves up in order to clamp the disc 1 as shown in FIG. 58. The stocker 22 moves to the lowest level and the disc 1 is played back.

Figure 59:
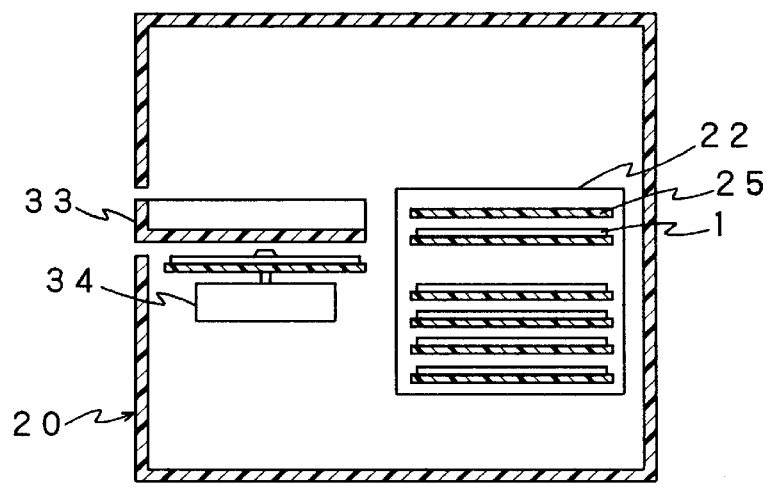
FIG. 59 to FIG. 65 are cross-sectional views showing an order of a disc change mode according to the present invention.
Figure 60:
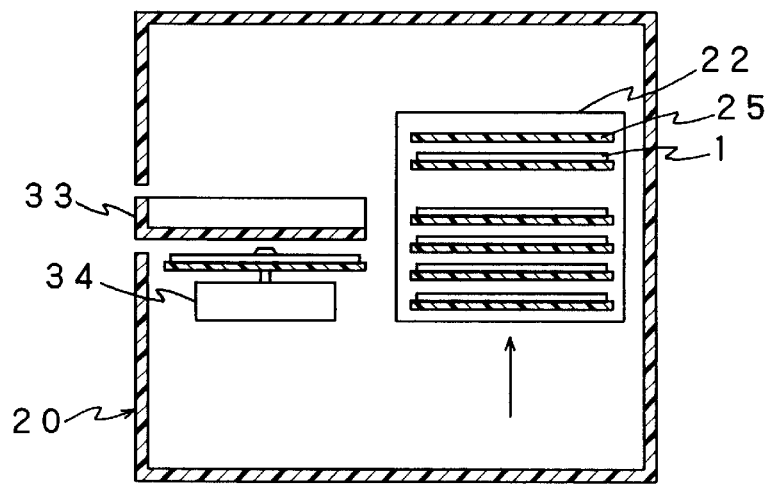

In a disc change mode, even when a disc 1 is being played back, an other disc 1 can be stored or exchanged. For example, when the third disc 1 from the top is being played back as shown in FIG. 59 and the disc change mode is specified by the user, the playback operation continues, and the stocker 22 moves up to transfer the fourth disc holder 25 from the top just under the disc holder 25 for the disc 1 which is being played back, to the level of the tray 33 (FIG.

Figure 61:
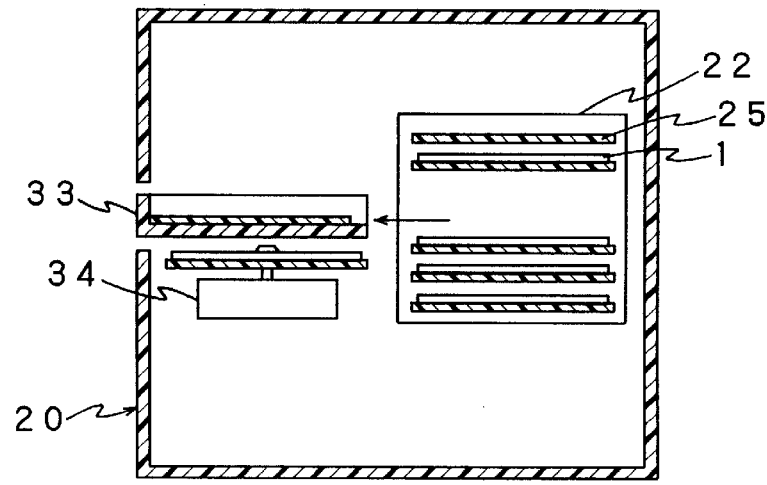
Figure 62:
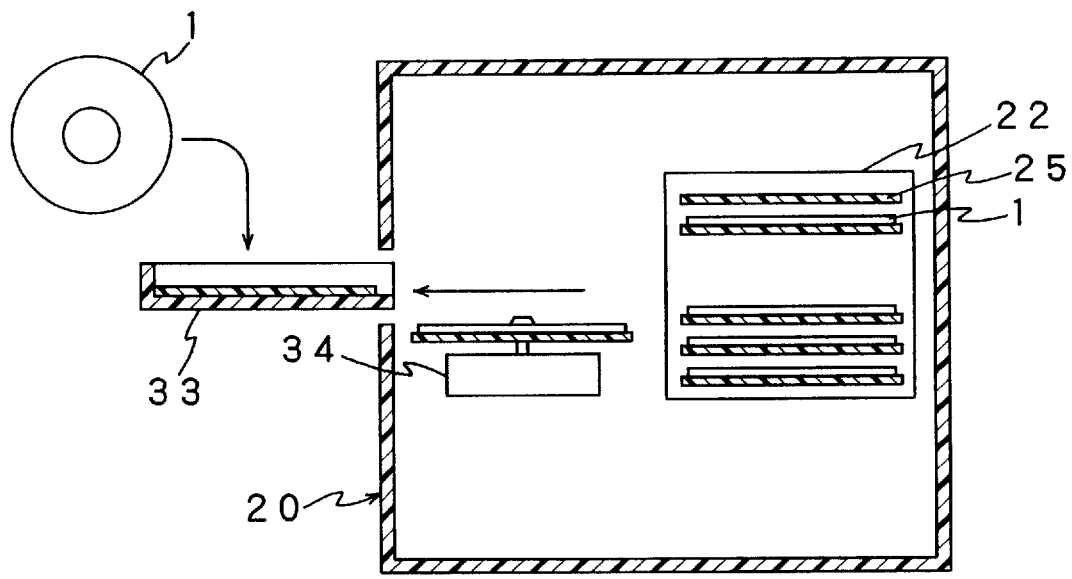
Figure 63:
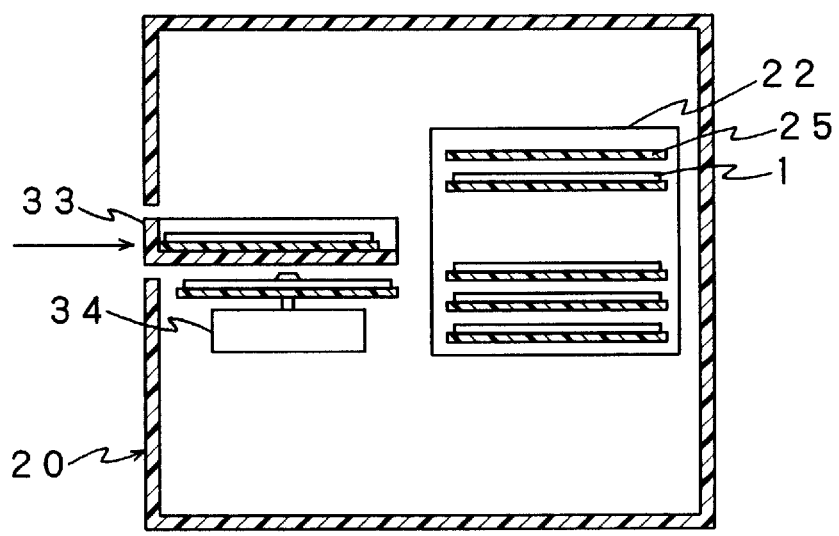
Figure 64:
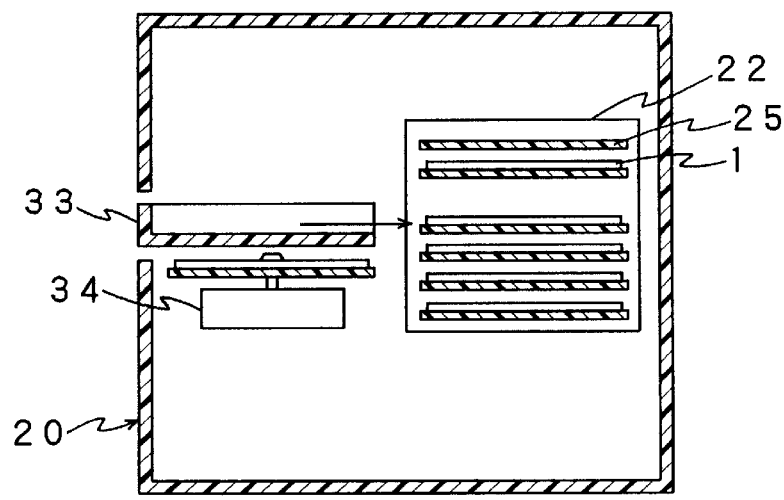
Figure 65:
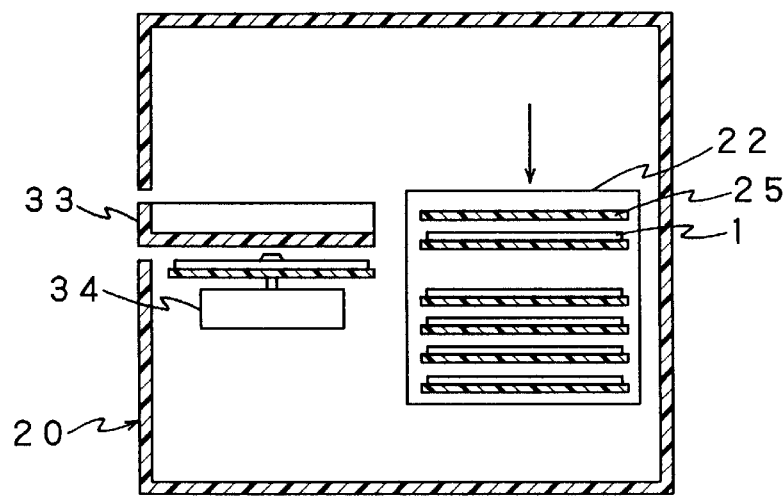

60). The fourth disc holder 25 is transferred to the tray 33 (FIG. 61), and the tray 33 is opened (FIG. 62). The user places another disc 1 on the fourth disc holder 25. The tray 33 is closed (FIG. 63), and the fourth disc holder 25 on which the new disc 1 is placed is transferred into the stocker 22 (FIG. 64), and the stocker 22 moves down to the lowest level (FIG. 65). In such disc change mode, when no disc number is specified, a disc holder 25 which is positioned one level just under the disc holder 25 for the disc 1 which is being played back, is opened. When the user specifies a disc holder 25 through a button (not shown) on the front panel of the cabinet 21, the specified disc holder 25 is opened.

As described above, with this auto disc changer 20, when the player 34 is operated, the tray 33 can be opened and closed and it is possible to store or exchange a disc 1 in the stocker 22.

Further, the stocker 22 is always positioned at the stable, lowest position during the playback mode, other than when the disc change operation is in progress, preventing the stocker 22 and the disc 1 from accidentally falling and being damaged due to a shock or a vibration.

Figure 66:
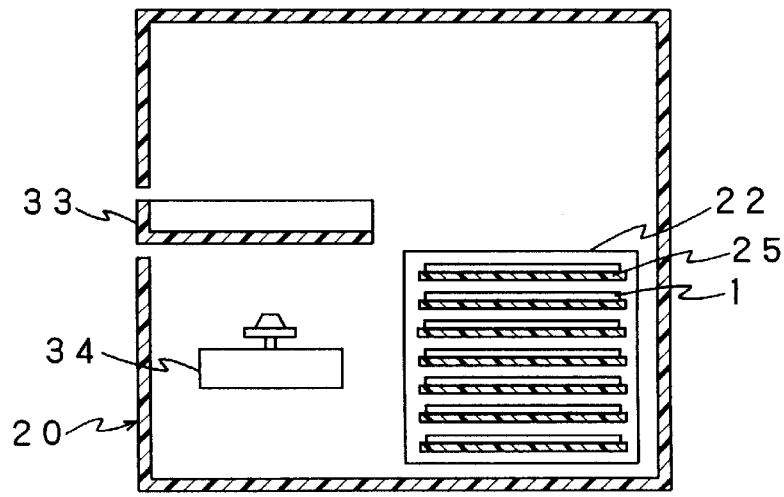
FIG. 66 to FIG. 69 are cross-sectional views showing an order of an open mode after the initializing operation according to the present invention.
Figure 67:
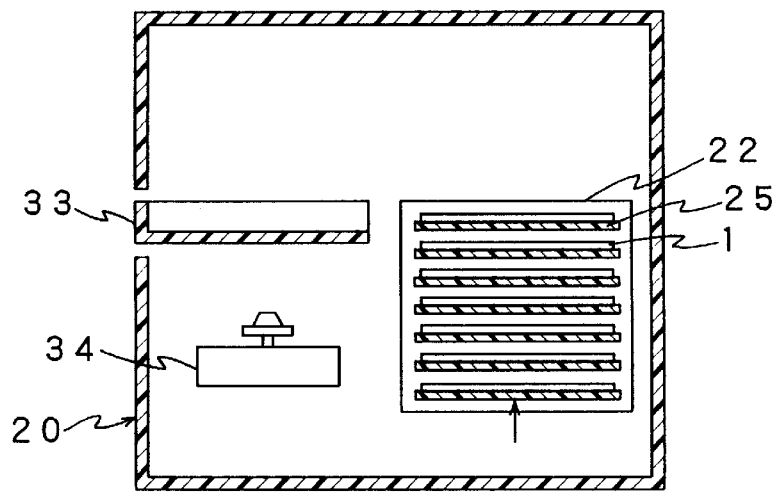
Figure 68:
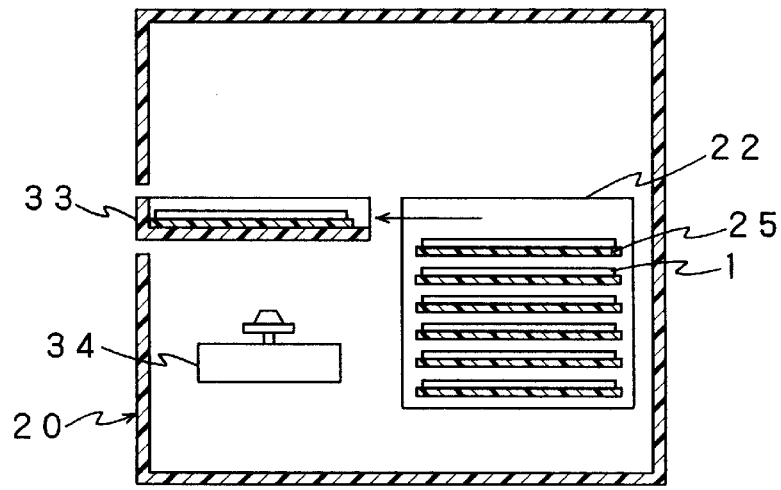
Figure 69:
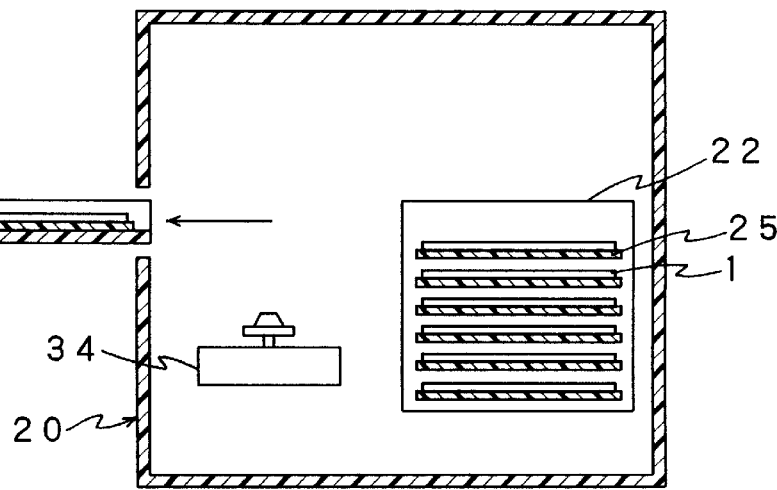
Figure 70:
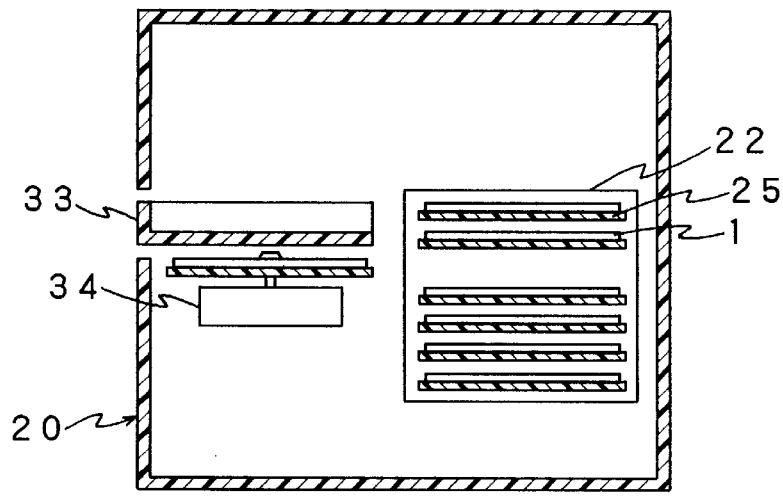
FIG. 70 to FIG. 75 are cross-sectional views showing an order of an open mode after a disc 1 is clamped onto the player 34 according to the present invention.
Figure 71:
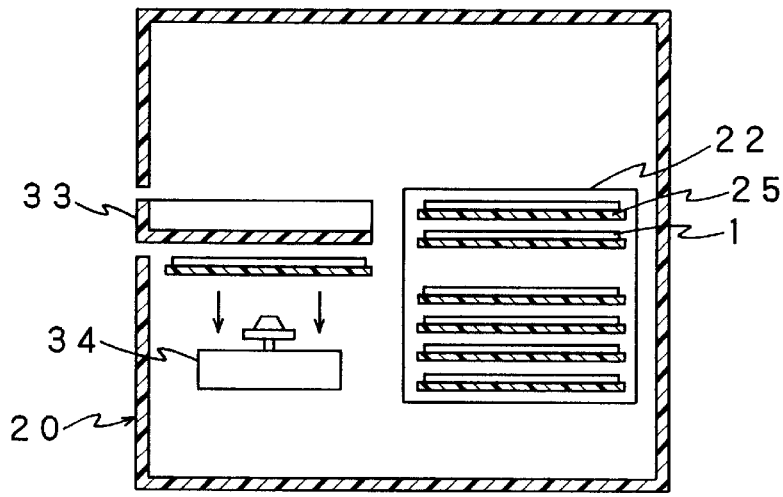
Figure 72:
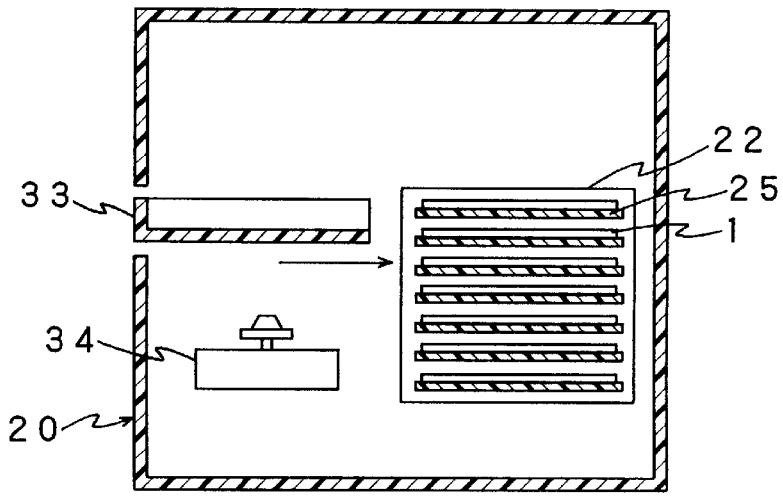
Figure 73:
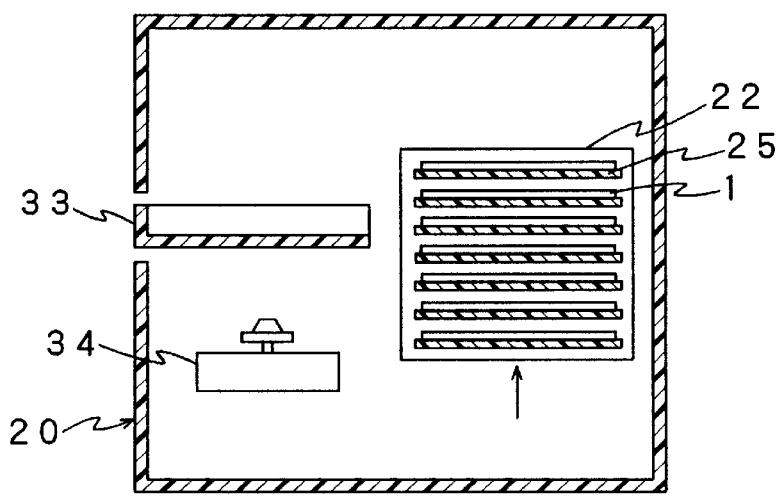
Figure 74:
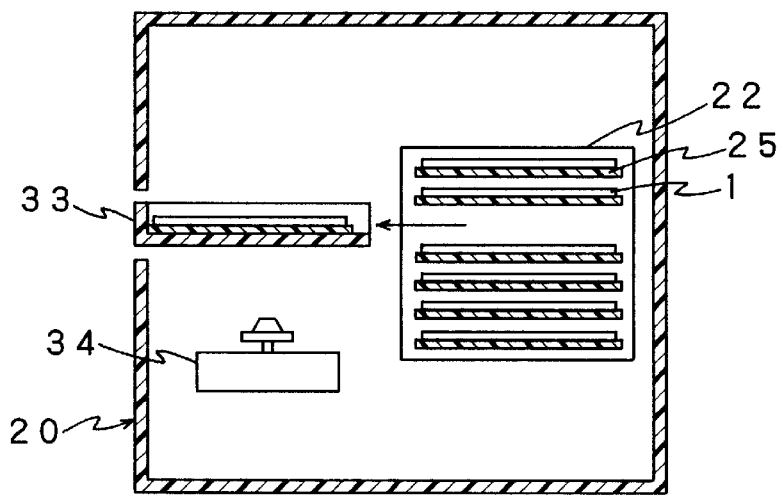
Figure 75:
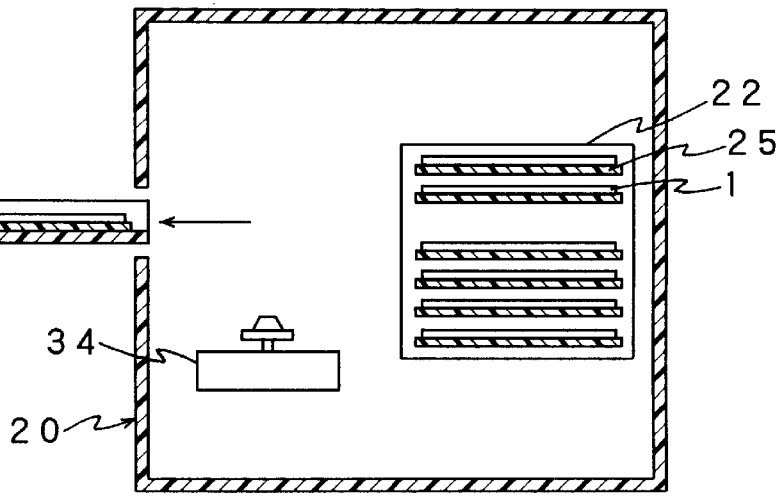

In a tray opening mode, after the initializing operation is completed as shown in FIG. 66, the stocker 22 moves up to transfer a disc holder 25, on which a specified disc 1 is placed, for example, the highest disc holder 25 to the level of the tray 33 (FIG. 67), the disc 1 and the disc holder 25 are transferred into the tray 33 (FIG. 68), and the tray 33 is opened (FIG. 69). As shown in FIG. 70, for example, when the third disc 1 from the top is held on the player 34, the player 34 moves down (FIG. 71), the disc holder 25 on which the disc 1 is placed is transferred to the stocker 22 (FIG. 72), and the stocker 22 moves up to transfer the disc 1 to the level of the tray 33 (FIG. 73). The disc 1 and the disc holder 25 are transferred to the tray 33 (FIG. 74), and the tray 33 is opened (FIG. 75).

Figure 76:
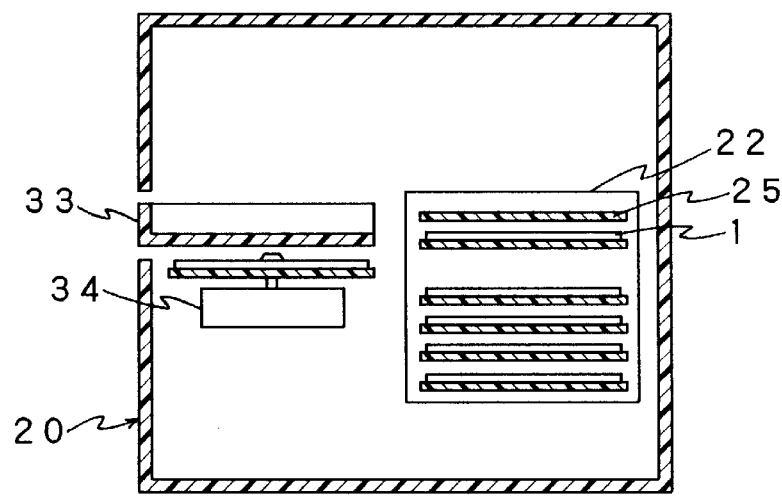
FIG. 76 to FIG. 81 are cross-sectional views showing an order of an specified holder open mode according to the present invention.
Figure 77:
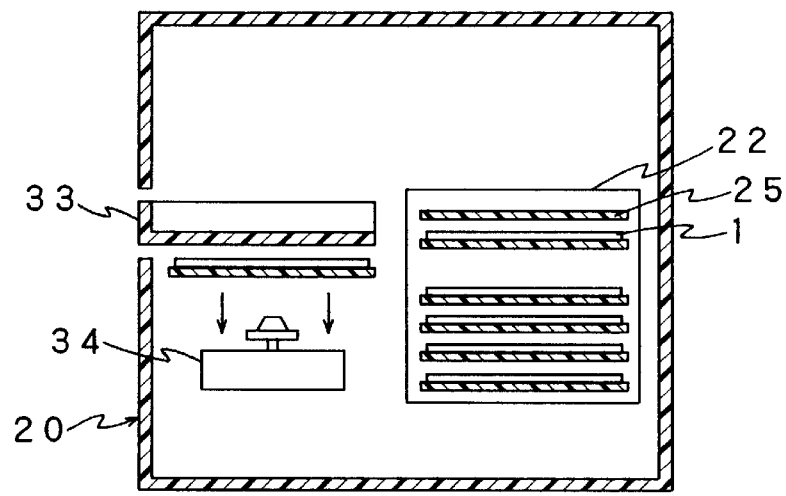
Figure 78:
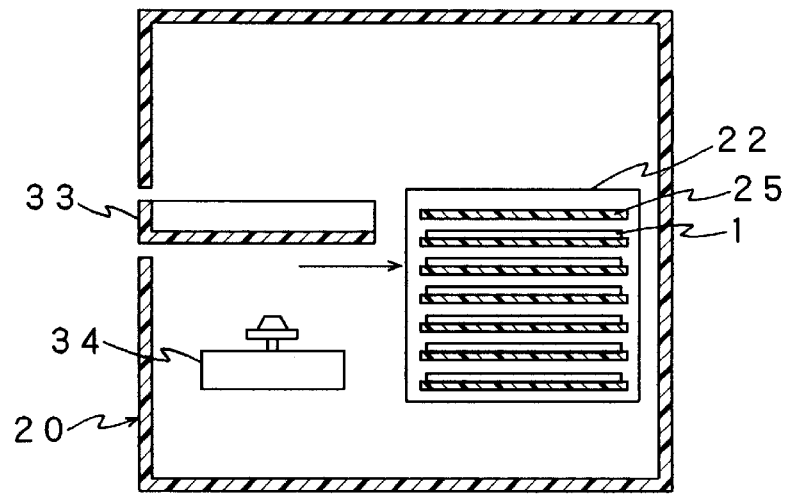
Figure 79:
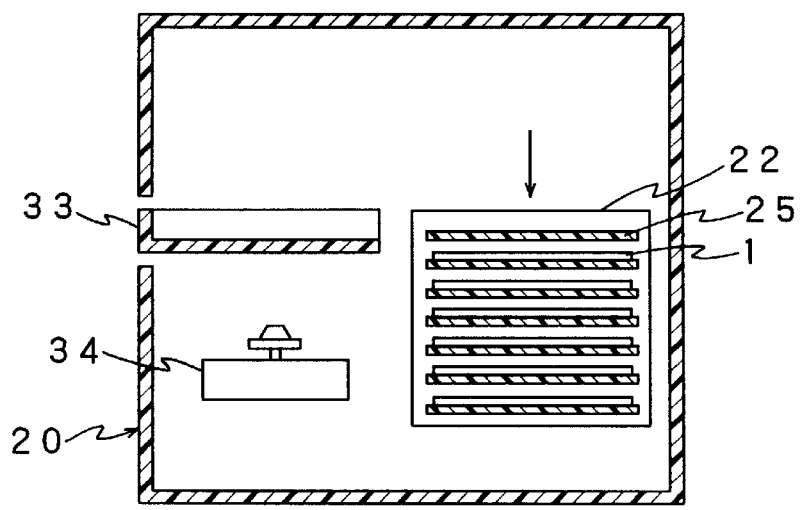
Figure 80:
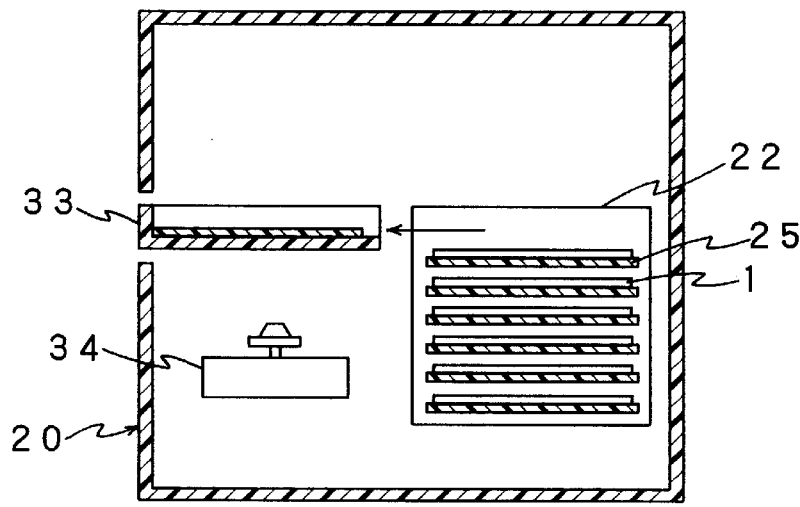
Figure 81:
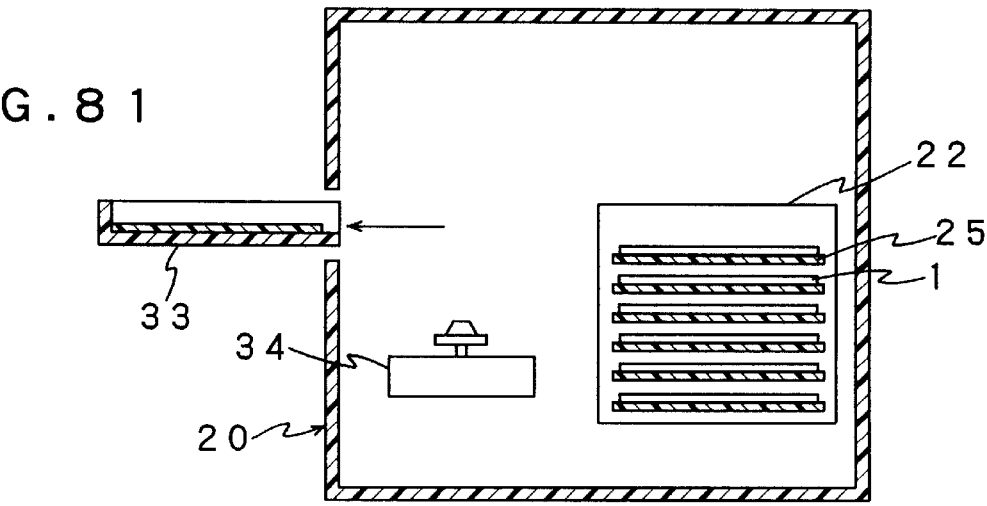

In a specified holder open mode, the disc holder 25 which a user specifies is opened. For example, when the third disc 1 from the top is held on the player 34 as shown in FIG. 76 and the highest disc holder 25 is specified, the player 34 is lowered (FIG. 77), the disc holder 25 on which the disc 1 is placed is transferred into the stocker 22 (FIG. 78), and the stocker 22 moves up to transfer the highest disc holder 25 to the level of the tray 33 (FIG. 79). The highest disc holder 25 is transferred to the tray 33 (FIG. 80), and the tray 33 is opened (FIG. 81).

Figure 82:
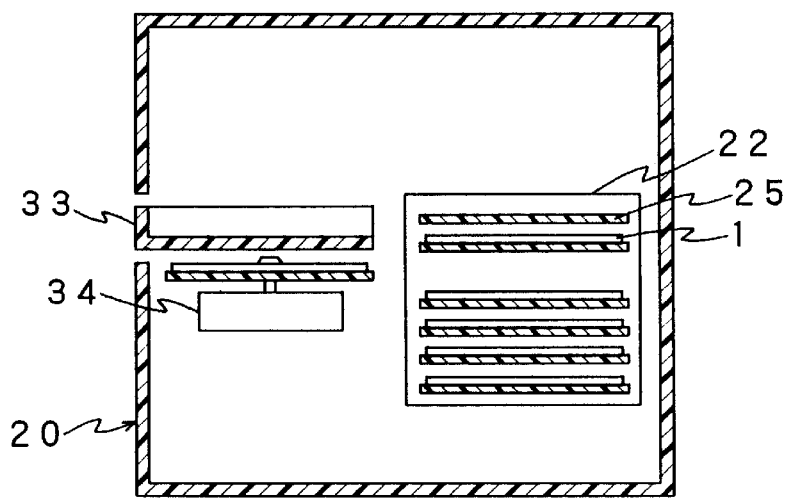
FIG. 82 to FIG. 87 are cross-sectional views showing an order of an direct playback mode according to the present invention.
Figure 83:
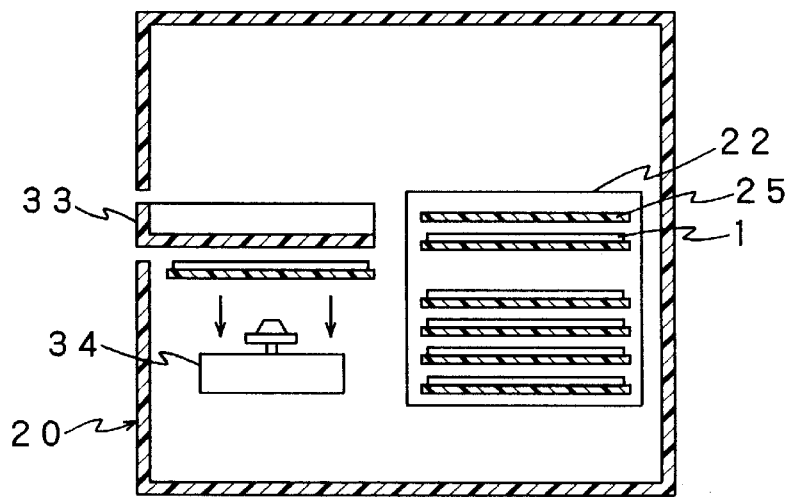
Figure 84:
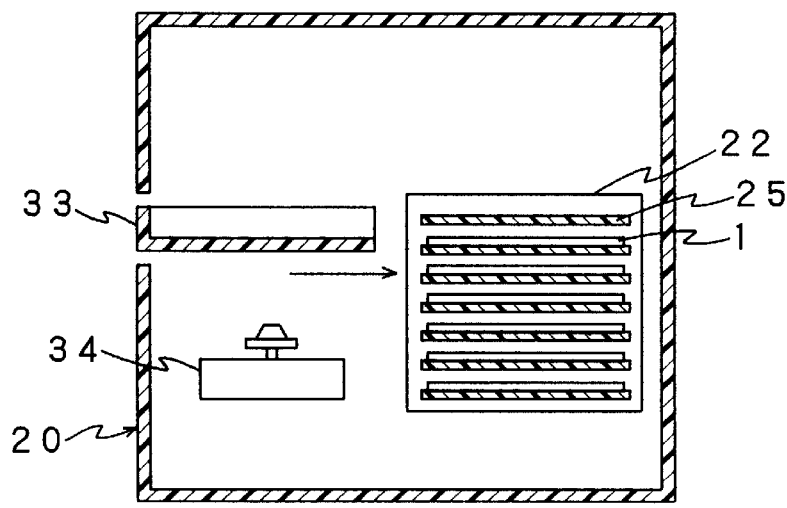
Figure 85:
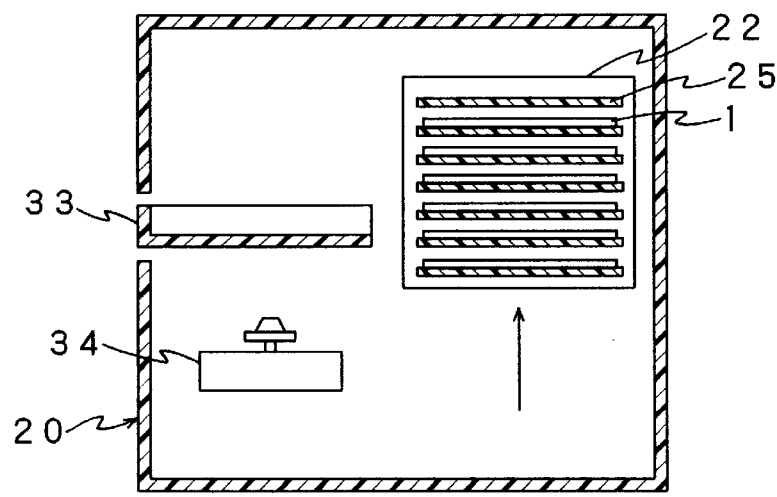
Figure 86:
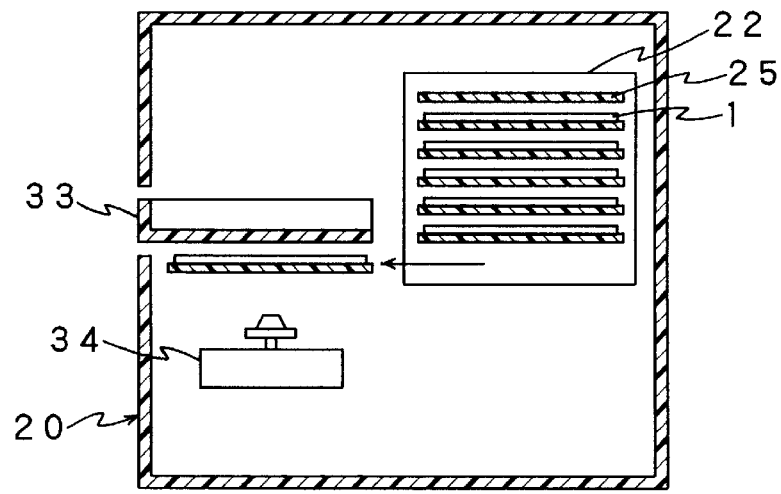
Figure 87:
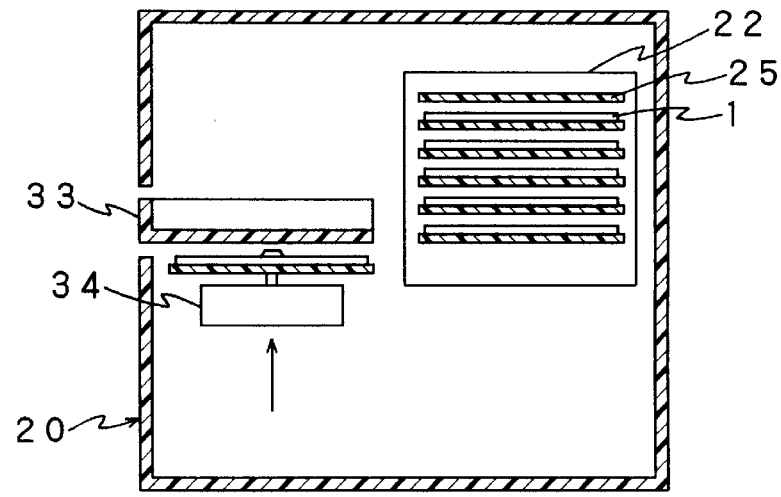

In a direct playback mode, even when a disc 1 is held on the player 34, an other disc 1 specified by the user can be played back. For example, when the user specifies the seventh (lowest) disc 1 while the third disc 1 from the top is being held on the player 34 (FIG. 82), the player 34 moves down (FIG. 83), and the disc holder on which the third disc 1 is placed is transferred into the stocker 22 (FIG. 84). The stocker 22 moves up to transfer the lowest disc 1 and its disc holder 25 to the level of the playback position (FIG. 85), the seventh disc 1 and its disc holder 25 are transferred to the playback position (FIG. 86), and the player 34 moves up and plays back the seventh disc 1 (FIG. 87).

Figure 88:
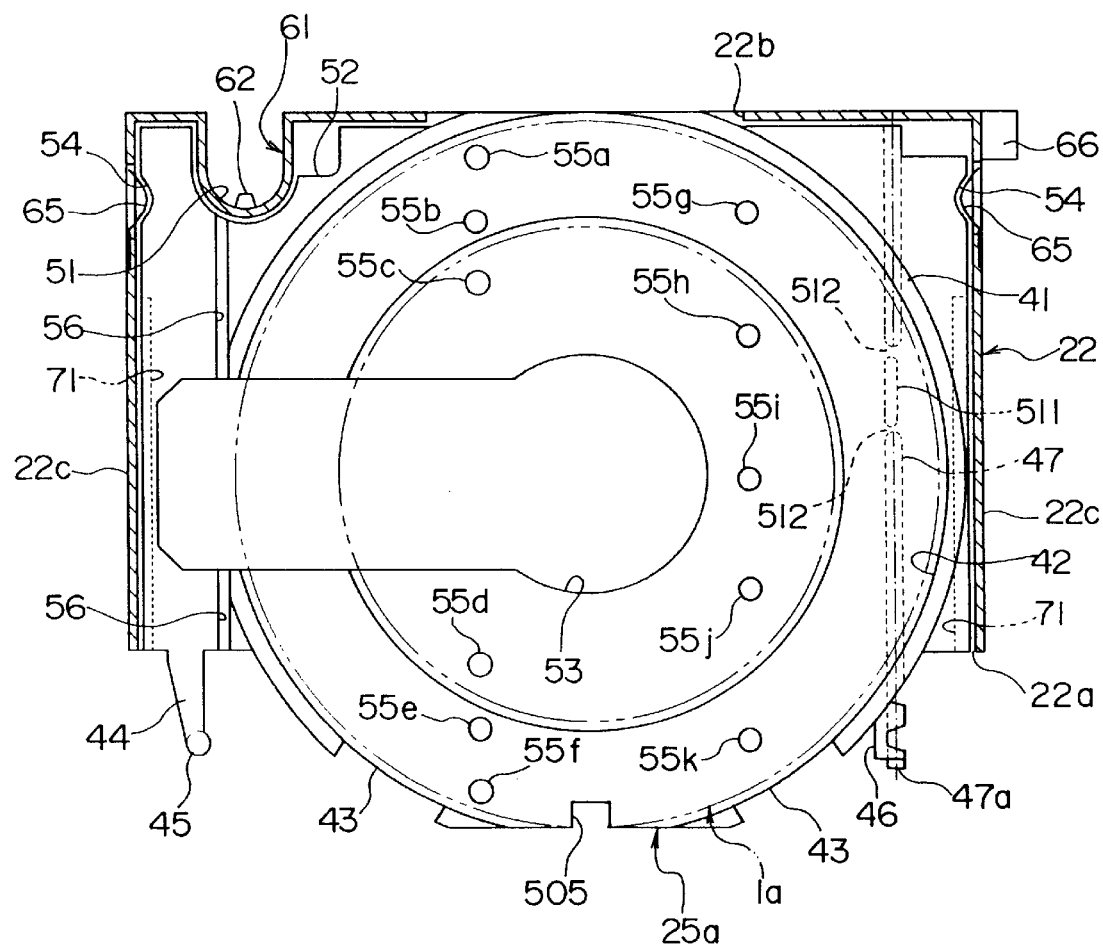
FIG. 88 is a top cut-away view of a common-type third disc holder 25c according to the present invention.

In the embodiment above described, although the first disc 1a, with a diameter of 12 cm, or the second disc 1b, with a diameter of 8 cm, is placed on the dedicated first or second disc holder 25a or 25b, when the auto disc changer is fixed and it is unnecessary to hold the second disc 1b, it is feasible to use a common third disc holder 25c, as shown in FIG. 88, on which either the first or second disc 1a or 1b can be placed.

Another Embodiment

With the third disc holder 25c as shown in FIG. 88, a second disc area 251 on which the second disc 1b is placed, is positioned in the center of the disc area 41 of the first disc holder 25a. The second disc area 1b is lower than the disc area 41 of the first disc holder 25a. The other parts are constructed in a fashion similar to the first disc holder 25a.

Figure 89:
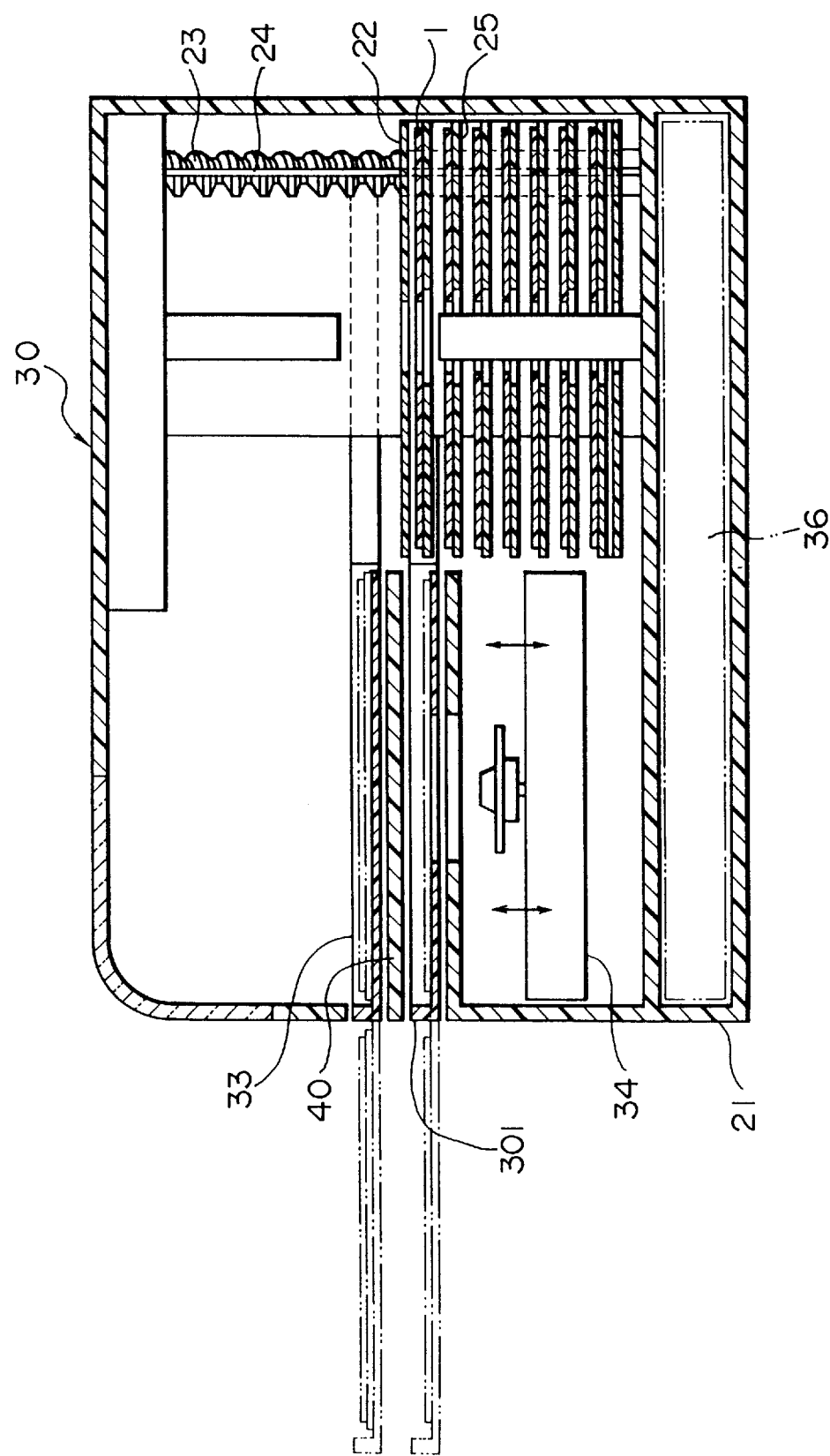
FIG. 89 is a cross-sectional view illustrating a construction of an auto disc changer 20 of a second embodiment according to the present invention.

FIG. 89 shows a construction of a second embodiment of an auto disc changer 30 according to the present invention. The auto disc changer 30 is constructed in a fashion similar to the first embodiment of the auto disc changer 20, and further has a sub-tray 301 for directly loading discs into and removing discs from the player 34. In a fashion different from the tray 33, the sub-tray 301 on which a disc 1 is directly placed without the disc holder 25, is opened or closed.

Figure 90:
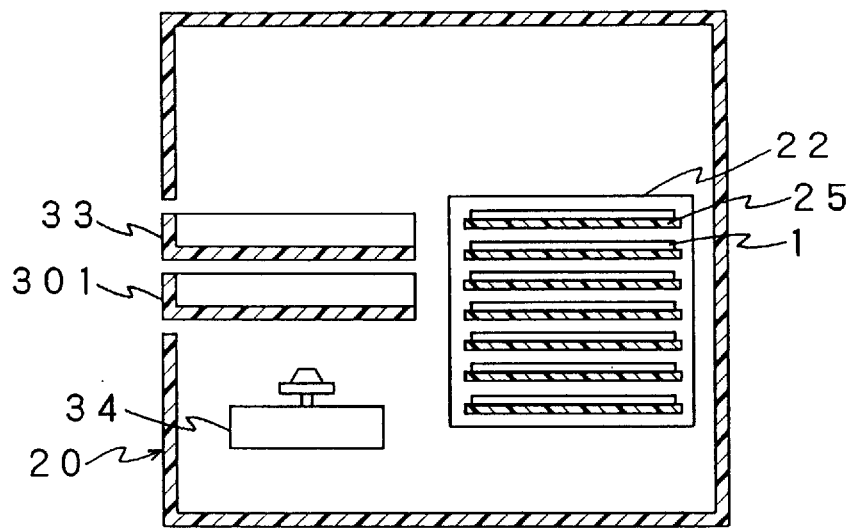
FIG. 90 to FIG. 93 are cross-sectional views showing an order of a temporary playback mode of the second embodiment according to the present invention.
Figure 91:
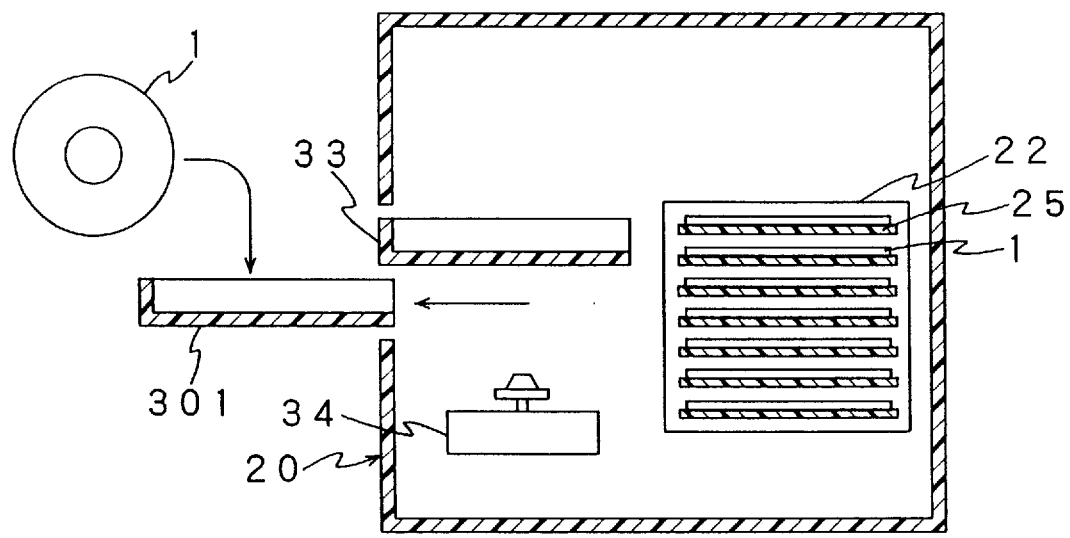
Figure 92:
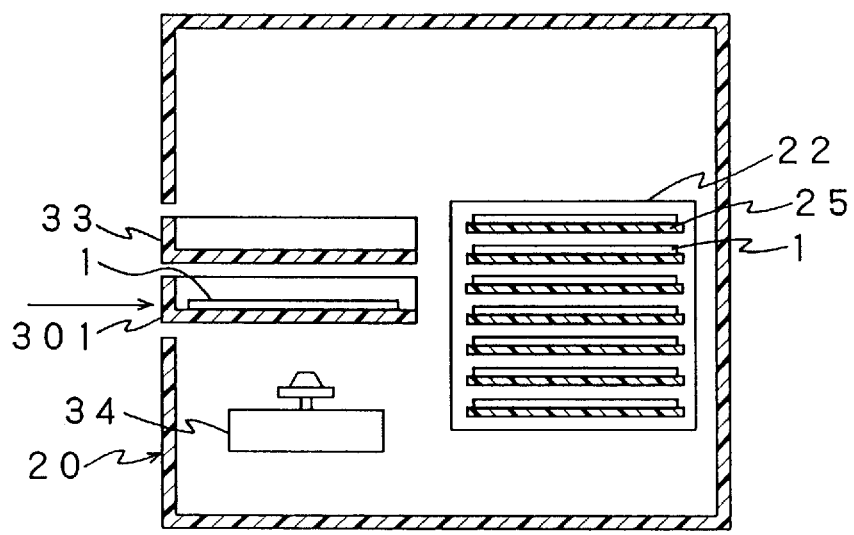
Figure 93:
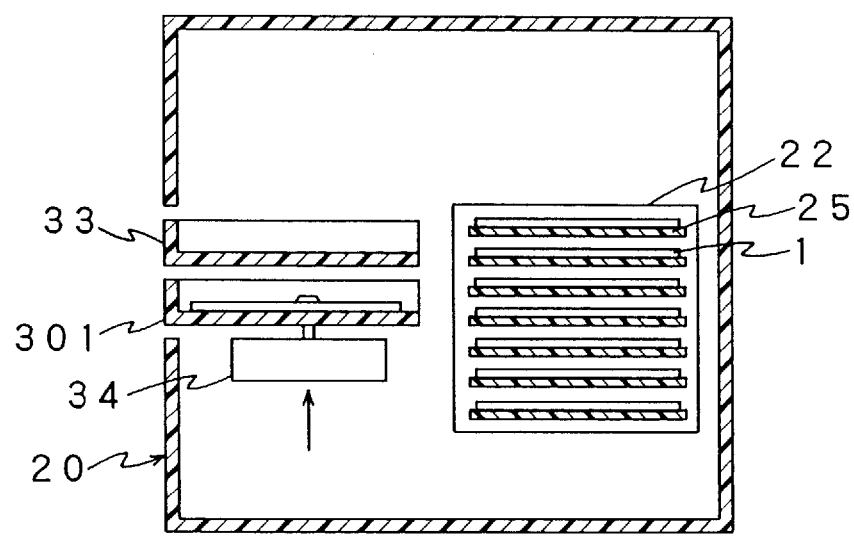
Figure 94:
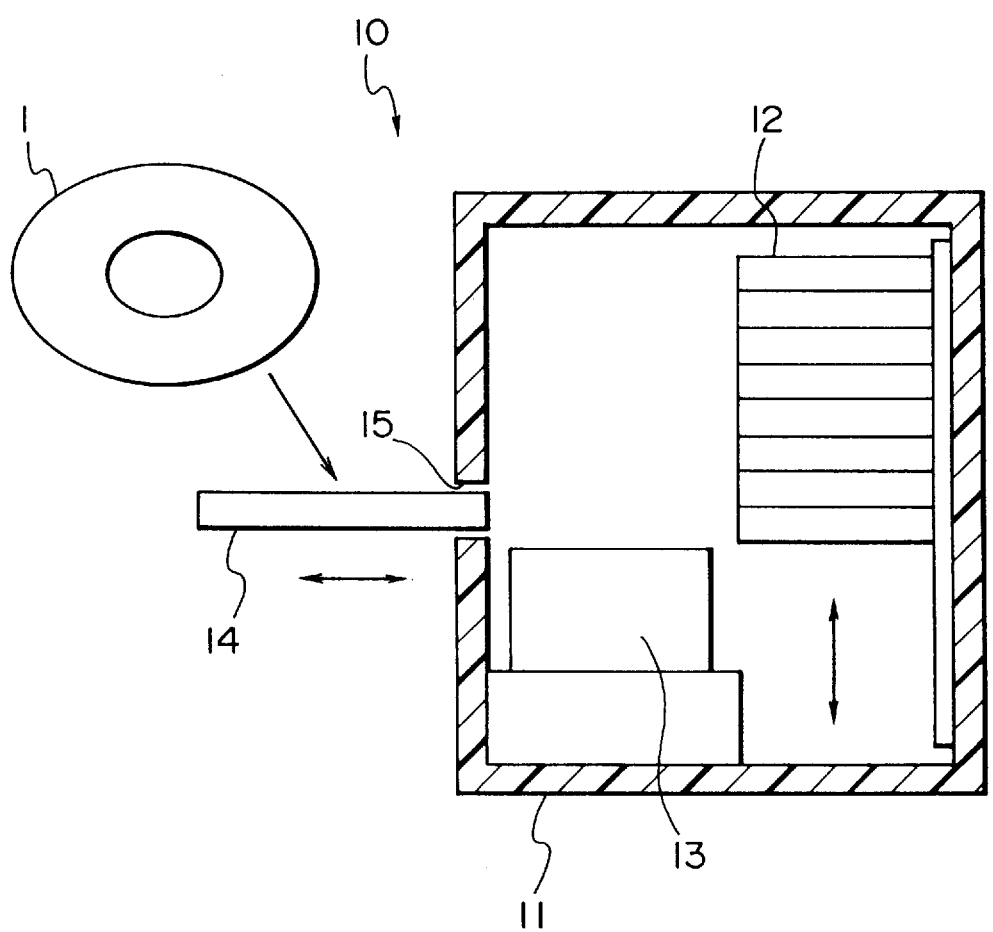
FIG. 94 is a cross-sectional view illustrating a construction of an auto disc changer currently in use.
Figure 95:
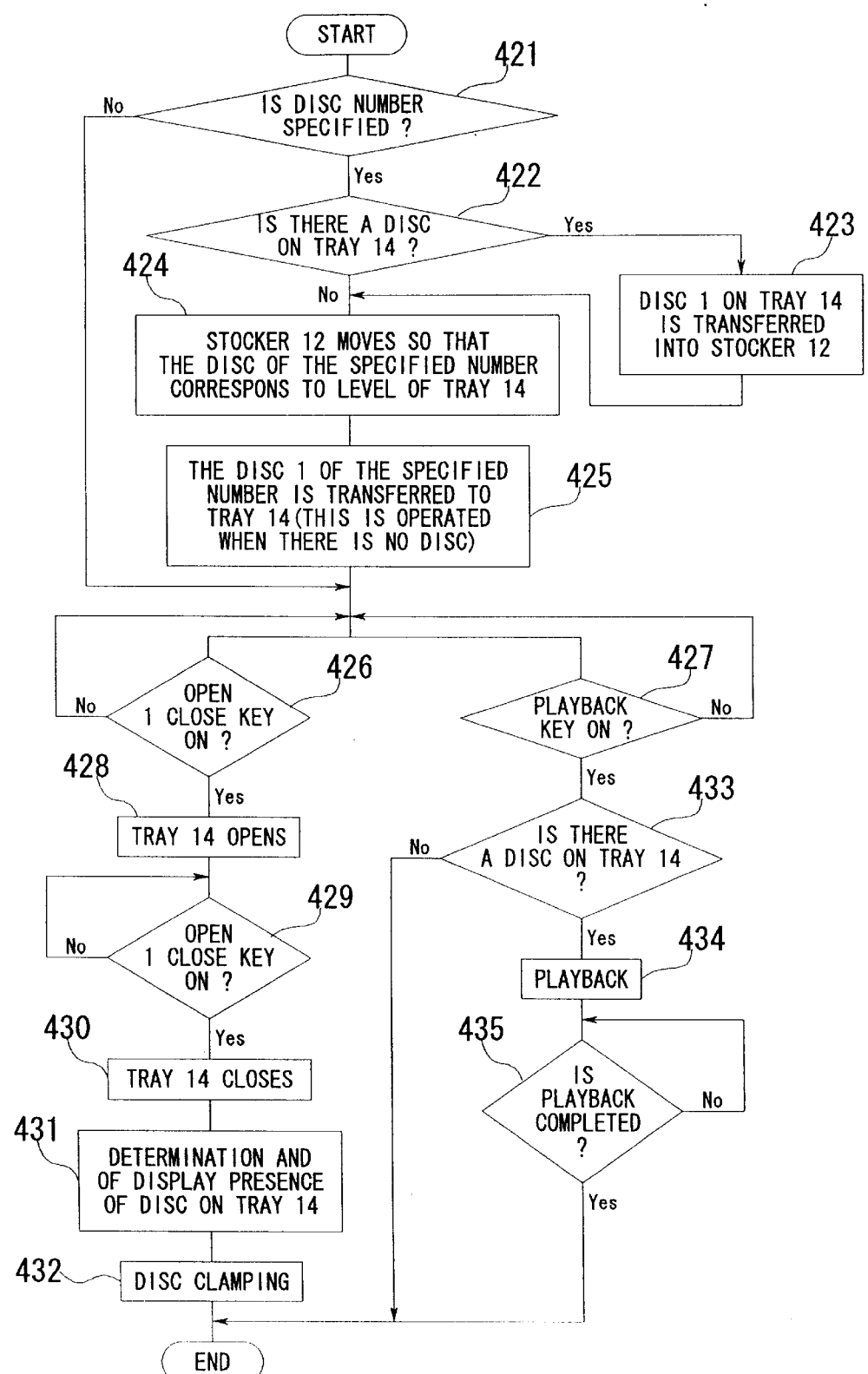
FIG. 95 is a flow chart showing an order of a disc storage and playback operation in the prior art.

The auto disc changer 30 can perform a temporary playback mode in addition to the operation modes in the auto disc changer 20 described above. In the temporary playback mode, the sub-tray 301 in FIG. 90 is opened, and the user places a disc 1 on the sub-tray 301 (FIG. 91). The sub-tray 301 is closed to transfer the disc 1 to the playback position (FIG. 92), and the player 34 moves up and performs the playback operation (FIG. 93). In the temporary playback mode, the user can directly play back an external disc 1 without the troublesome storage or exchange operation.

As described above, in the auto disc changer 30, a disc 1 can directly be loaded to or removed from the player 34 without being stored or exchanged into the stocker 22, and the user can easily operate the temporary playback for an external disc 1.

It will be obvious to those having skill in the art that many changes may be made in the above-described details of the preferred embodiment of the present invention. The scope of the present invention, therefore, should be determined according to the following claims.

What is claimed is:

1. An auto changer comprising:

a frame, a storage means mounted in the frame, a plurality of holders storable in the storage means, each holder either being occupied, and holding a storage medium having a central axis, or being vacant, and not holding a storage medium, the central axes of storage media held by holders in the storage means being substantially coincident, a tray movable relative to the frame between an inside position in which a holder can be transferred between the storage means and the tray and an outside position in which a storage medium can be placed on or removed from a holder in the tray, a playback means for playing back a storage medium held in an occupied holder, said playback means including a means defining a chucking location for receiving an occupied holder, said chucking location being vertically spaced from the tray, and a playback unit for engaging the storage medium in the occupied holder at the chucking location, a first transfer means for transferring a holder along a first path between the storage means and the tray when the tray is in the inside position, said first transfer means being independent of the playback means, and a second transfer means for transferring an occupied holder along a second path from the storage means to the chucking location, for playback of the storage medium that is held by the holder, and back to the storage means, while the storage medium remains in the holder, at least a part of the second path being vertically spaced from the first path.

2. An auto changer according to claim 1, wherein the central axis of a storage medium in a holder at the chucking location is substantially coincident with the central axis of a storage medium in a holder in the tray at its inside position.

3. An auto changer according to claim 1, wherein the storage means defines a plurality of storage positions for receiving respective holders, the storage positions are spaced apart vertically in the storage means, and the storage means is movable relative to the frame along a vertical axis for aligning any selected storage position with the tray, whereby a holder can then be transferred between the tray and the selected storage position.

4. An auto changer according to claim 1, wherein the storage means defines a plurality of storage positions for receiving respective holders, the storage positions are spaced apart vertically in the storage means, and the storage means is movable relative to the frame along a vertical axis for aligning any selected storage position either with the chucking location or with the tray, whereby a holder can be transferred between the tray and the selected storage position or between the chucking location and the selected storage position.

5. An auto changer according to claim 1, wherein the chucking location is below the tray and the playback unit is below the chucking location for engaging from below the storage medium in the occupied holder at the chucking location.

6. An auto changer comprising:

a frame, a storage means mounted in the frame, a plurality of holders storable in the storage means, each holder either being occupied, and holding a storage medium having a central axis, or being vacant, and not holding a storage medium, the central axes of storage media held by holders in the storage means all being substantially vertical and being substantially coincident, a tray movable relative to the frame between an inside position in which a holder can be transferred between the storage means and the tray and an outside position in which a storage medium can be placed on or removed from a holder in the tray, a playback means for playing back a storage medium held in an occupied holder, said playback means including a means defining a chucking location for receiving an occupied holder, the holder in said chucking location being vertically spaced from the tray, and a playback unit positioned below the chucking location for engaging from below the storage medium in the occupied holder at the chucking location, a first transfer means for transferring a holder between the storage means and the tray when the tray is in the inside position, said first transfer means being independent of the playback means, and a second transfer means for transferring an occupied holder from the storage means to the chucking location, for playback of the storage medium that is held by the holder, and back to the storage means, while the storage medium remains in the holder.

7. An auto changer according to claim 6, wherein the storage means defines a plurality of storage positions for receiving respective holders, the storage positions are spaced apart vertically in the storage means, and the storage means is movable relative to the frame along a vertical axis for aligning any selected storage position with the tray, whereby a holder can then be transferred between the tray and the selected storage position.

8. An auto changer according to claim 6, wherein the storage means defines a plurality of storage positions for receiving respective holders, the storage positions are spaced apart vertically in the storage means, and the storage means is movable relative to the frame along a vertical axis for aligning any selected storage position either with the chucking location or with the tray, whereby a holder can be transferred between the tray and the selected storage position or between the chucking location and the selected storage position.

9. An auto changer comprising:

a frame, a storage means mounted in the frame for movement therein along a vertical axis, a plurality of holders storable in the storage means, each holder either being occupied, and holding a storage medium having a central axis, or being vacant, and not holding a storage medium, the central axes of storage media held by holders in the storage means all being substantially vertical and being substantially coincident, a tray movable relative to the frame between an inside position in which a holder can be transferred between the storage means and the tray and an outside position in which a storage medium can be placed on or removed from a holder in the tray, a playback means for playing back a storage medium held in an occupied holder, said playback means including a means defining a chucking location for receiving an occupied holder, said chucking location being below the tray, and a playback unit positioned below the chucking location or engaging from below the storage medium in the occupied holder at the chucking location, a first transfer means for transferring a holder between the storage means and the tray when the tray is in the inside position, said first transfer means being independent of the playback means, and a second transfer means for transferring an occupied holder from the storage means to the chucking location, for playback of the storage medium that is held by the holder, and back to the storage means, while the storage medium remains in the holder.

* * * * *